(12) United States Patent
Laroia et al.

(10) Patent No.: US 8,503,938 B2
(45) Date of Patent: Aug. 6, 2013

(54) METHODS AND APPARATUS FOR DETERMINING, COMMUNICATING AND USING INFORMATION INCLUDING LOADING FACTORS WHICH CAN BE USED FOR INTERFERENCE CONTROL PURPOSES

(75) Inventors: Rajiv Laroia, Far Hills, NJ (US); Junyi Li, Bedminster, NJ (US); Sundeep Rangan, Jersey City, NJ (US); Murari Srinivasan, Palo Alto, CA (US); Prashanth Hande, Jersey City, NJ (US); Arnab Das, Summit, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1322 days.

(21) Appl. No.: 11/487,017

(22) Filed: Jul. 14, 2006

(65) Prior Publication Data

US 2007/0104164 A1 May 10, 2007

Related U.S. Application Data

(63) Continuation-in-part of application No. 11/302,729, filed on Dec. 14, 2005, and a continuation-in-part of application No. 11/251,069, filed on Oct. 14, 2005.

(60) Provisional application No. 60/792,128, filed on Apr. 14, 2006, provisional application No. 60/618,773, filed on Oct. 14, 2004.

(51) Int. Cl.
*H04B 15/00* (2006.01)
(52) U.S. Cl.
USPC .... 455/63.1; 455/452.2; 455/525; 455/435.2; 455/453; 455/436; 370/232; 370/230; 370/237
(58) Field of Classification Search
USPC ................. 455/422.1, 456.1, 450, 453, 522, 455/525, 552, 524; 370/310, 311, 328, 330, 370/338, 320, 335, 342, 389, 355, 468, 46
See application file for complete search history.

(56) References Cited

U.S. PATENT DOCUMENTS 4,631,720 A 12/1986 Koeck
4,660,196 A 4/1987 Gray et al.
(Continued)

FOREIGN PATENT DOCUMENTS

CN 1265792 9/2000
CN 1316140 10/2001
(Continued)

OTHER PUBLICATIONS

Gunnarson et al.; "Uplink Admission Control in WCDMA Based on Relative Load Estimates"; 2002 IEEE International Conference on Communications; Apr. 28, 2002; pp. 3091-3095; vol. 1; IEEE, New York, NY, USA.

(Continued)

*Primary Examiner* — Vladimir Magloire
*Assistant Examiner* — Babar Sarwar
(74) *Attorney, Agent, or Firm* — John J. Ketchum

(57) ABSTRACT

A wireless terminal receives and measures broadcast reference signals, e.g., beacon and/or pilot signals, transmitted from a plurality of base station attachment points. The wireless terminal monitors for and attempts to recover broadcast loading factor information corresponding to attachment points. The wireless terminal generates and transmits an interference report to a current attachment point, the report based on the results of a measured received reference signal from the current attachment point, a measured received reference signal from each of one or more different attachment points, and uplink loading factor information. In the absence of a successfully recovered broadcast uplink loading factor corresponding to an attachment point, the wireless terminal uses a default value for that loading factor. Generated interference reports are based on beacon signal measurements and uplink loading factors, pilot signal measurements and uplink loading factors, or a mixture of beacon and pilot signal measurements and uplink loading factors.

36 Claims, 32 Drawing Sheets

U.S. PATENT DOCUMENTS

| | | | |
|---|---|---|---|
| 4,679,244 A | 7/1987 | Kawasaki et al. | |
| 4,833,701 A | 5/1989 | Comroe et al. | |
| 5,128,938 A | 7/1992 | Borras | |
| 5,203,013 A | 4/1993 | Breeden et al. | |
| 5,387,905 A | 2/1995 | Grube et al. | |
| 5,461,645 A | 10/1995 | Ishii | |
| 5,506,865 A | 4/1996 | Weaver, Jr. | |
| 5,537,414 A | 7/1996 | Takiyasu et al. | |
| 5,579,307 A | 11/1996 | Richetta et al. | |
| 5,732,328 A | 3/1998 | Mitra et al. | |
| 5,835,847 A | 11/1998 | Gilmore et al. | |
| 5,867,478 A | 2/1999 | Baum et al. | |
| 5,898,925 A | 4/1999 | Honkasalo et al. | |
| 5,914,950 A | 6/1999 | Tiedemann, Jr. et al. | |
| 5,915,221 A | 6/1999 | Sawyer et al. | |
| 5,933,421 A | 8/1999 | Alamouti et al. | |
| 5,940,771 A * | 8/1999 | Gollnick et al. | 455/517 |
| 5,966,657 A | 10/1999 | Sporre | |
| 5,966,662 A * | 10/1999 | Murto | 455/458 |
| 6,002,676 A * | 12/1999 | Fleming | 370/328 |
| 6,004,276 A | 12/1999 | Wright et al. | |
| 6,026,081 A | 2/2000 | Hamabe | |
| 6,035,000 A | 3/2000 | Bingham | |
| 6,069,871 A * | 5/2000 | Sharma et al. | 370/209 |
| 6,070,072 A | 5/2000 | Dorenbosch et al. | |
| 6,073,025 A | 6/2000 | Chheda et al. | |
| 6,075,025 A | 6/2000 | Bishop et al. | |
| 6,122,270 A | 9/2000 | Whinnett et al. | |
| 6,128,506 A * | 10/2000 | Knutsson et al. | 455/522 |
| 6,131,016 A | 10/2000 | Greenstein et al. | |
| 6,141,565 A * | 10/2000 | Feuerstein et al. | 455/560 |
| 6,169,896 B1 | 1/2001 | Sant et al. | |
| 6,173,005 B1 | 1/2001 | Kotzin et al. | |
| 6,181,948 B1 * | 1/2001 | Kondo | 455/517 |
| 6,205,129 B1 * | 3/2001 | Esteves et al. | 370/331 |
| 6,236,646 B1 | 5/2001 | Beming et al. | |
| 6,256,478 B1 | 7/2001 | Allen et al. | |
| 6,259,927 B1 * | 7/2001 | Butovitsch et al. | 455/522 |
| 6,263,392 B1 | 7/2001 | McCauley et al. | |
| 6,298,233 B1 | 10/2001 | Souissi et al. | |
| 6,308,080 B1 | 10/2001 | Burt et al. | |
| 6,311,065 B1 * | 10/2001 | Ushiki et al. | 455/440 |
| 6,374,085 B1 | 4/2002 | Saints et al. | |
| 6,377,955 B1 | 4/2002 | Hartmann et al. | |
| 6,405,047 B1 | 6/2002 | Moon et al. | |
| 6,414,946 B1 | 7/2002 | Satou et al. | |
| 6,445,917 B1 | 9/2002 | Bark et al. | |
| 6,453,151 B1 | 9/2002 | Kiang et al. | |
| 6,493,539 B1 | 12/2002 | Falco et al. | |
| 6,526,281 B1 | 2/2003 | Gorsuch et al. | |
| 6,538,986 B2 | 3/2003 | Isaksson et al. | |
| 6,545,999 B1 | 4/2003 | Sugita et al. | |
| 6,549,780 B2 | 4/2003 | Schiff et al. | |
| 6,553,336 B1 | 4/2003 | Johnson et al. | |
| 6,590,890 B1 | 7/2003 | Stolyar et al. | |
| 6,597,914 B1 | 7/2003 | Silventoinen et al. | |
| 6,600,903 B1 | 7/2003 | Lilja et al. | |
| 6,609,007 B1 | 8/2003 | Eibling et al. | |
| 6,621,808 B1 | 9/2003 | Sadri | |
| 6,625,133 B1 | 9/2003 | Balachandran et al. | |
| 6,662,024 B2 | 12/2003 | Walton et al. | |
| 6,671,512 B2 | 12/2003 | Laakso | |
| 6,680,909 B1 | 1/2004 | Bansal et al. | |
| 6,697,417 B2 | 2/2004 | Fernandez-Corbaton et al. | |
| 6,710,651 B2 | 3/2004 | Forrester et al. | |
| 6,728,551 B2 | 4/2004 | Chang | |
| 6,745,003 B1 | 6/2004 | Maca et al. | |
| 6,751,187 B2 | 6/2004 | Walton et al. | |
| 6,771,934 B2 | 8/2004 | Demers et al. | |
| 6,788,963 B2 | 9/2004 | Laroia et al. | |
| 6,798,761 B2 | 9/2004 | Cain et al. | |
| 6,804,289 B2 | 10/2004 | Takahashi | |
| 6,804,521 B2 | 10/2004 | Tong et al. | |
| 6,816,476 B2 | 11/2004 | Kim et al. | |
| 6,836,673 B1 | 12/2004 | Trott et al. | |
| 6,865,168 B1 | 3/2005 | Sekine et al. | |
| 6,889,056 B2 | 5/2005 | Shibutani et al. | |
| 6,892,071 B2 | 5/2005 | Park et al. | |
| 6,895,005 B1 | 5/2005 | Malin et al. | |
| 6,895,364 B2 | 5/2005 | Banfer | |
| 6,901,268 B2 | 5/2005 | Chang | |
| 6,904,016 B2 | 6/2005 | Kuo et al. | |
| 6,912,405 B2 | 6/2005 | Hiramatsu et al. | |
| 6,917,607 B1 | 7/2005 | Yeom et al. | |
| 6,940,827 B2 | 9/2005 | Li et al. | |
| 6,954,643 B2 | 10/2005 | Petrus | |
| 6,957,072 B2 | 10/2005 | Kangras et al. | |
| 6,967,937 B1 | 11/2005 | Gormley | |
| 6,968,156 B2 | 11/2005 | Sugaya et al. | |
| 7,006,841 B2 | 2/2006 | Monogioudis et al. | |
| 7,024,460 B2 | 4/2006 | Koopmas et al. | |
| 7,027,782 B2 | 4/2006 | Moon et al. | |
| 7,031,983 B2 | 4/2006 | Israni et al. | |
| 7,034,254 B2 | 4/2006 | Grabowski et al. | |
| 7,039,029 B2 | 5/2006 | Lee et al. | |
| 7,043,254 B2 | 5/2006 | Chawla et al. | |
| 7,047,009 B2 | 5/2006 | Laroia et al. | |
| 7,054,643 B2 | 5/2006 | Trossen et al. | |
| 7,061,885 B2 | 6/2006 | Kurtz et al. | |
| 7,092,672 B1 | 8/2006 | Pekonen et al. | |
| 7,120,123 B1 | 10/2006 | Quigley et al. | |
| 7,120,448 B2 | 10/2006 | Brouwer | |
| 7,123,910 B2 | 10/2006 | Lucidarme et al. | |
| 7,139,536 B2 | 11/2006 | Chiu et al. | |
| 7,142,548 B2 | 11/2006 | Fong et al. | |
| 7,146,172 B2 | 12/2006 | Li et al. | |
| 7,158,796 B2 | 1/2007 | Tiedemann, Jr. et al. | |
| 7,162,203 B1 | 1/2007 | Brunner | |
| 7,164,883 B2 | 1/2007 | Rappaport et al. | |
| 7,197,025 B2 | 3/2007 | Chuah et al. | |
| 7,203,493 B2 | 4/2007 | Fujii et al. | |
| 7,218,948 B2 | 5/2007 | Laroia et al. | |
| 7,245,935 B2 | 7/2007 | Lin et al. | |
| 7,260,054 B2 | 8/2007 | Olszewski | |
| 7,269,406 B2 | 9/2007 | Qi et al. | |
| 7,277,709 B2 * | 10/2007 | Vadgama | 455/453 |
| 7,277,737 B1 | 10/2007 | Vollmer et al. | |
| 7,280,814 B2 | 10/2007 | Austin et al. | |
| 7,283,559 B2 | 10/2007 | Cho et al. | |
| 7,283,836 B2 | 10/2007 | Hwang et al. | |
| 7,299,277 B1 | 11/2007 | Moran et al. | |
| 7,317,921 B2 * | 1/2008 | Mueckenheim et al. | 455/452.1 |
| 7,319,680 B2 | 1/2008 | Cho et al. | |
| 7,321,563 B2 | 1/2008 | Kim et al. | |
| 7,340,267 B2 | 3/2008 | Budka et al. | |
| 7,349,667 B2 | 3/2008 | Magee et al. | |
| 7,356,635 B2 | 4/2008 | Woodings et al. | |
| 7,362,702 B2 | 4/2008 | Terrell et al. | |
| 7,382,755 B2 | 6/2008 | Dugad et al. | |
| 7,395,058 B1 | 7/2008 | Kalofonos et al. | |
| 7,397,803 B2 | 7/2008 | Love et al. | |
| 7,400,901 B2 | 7/2008 | Kostic et al. | |
| 7,412,265 B2 | 8/2008 | Chen et al. | |
| 7,418,260 B2 | 8/2008 | Lucidarme et al. | |
| 7,430,206 B2 | 9/2008 | Terry et al. | |
| 7,430,207 B2 | 9/2008 | Wu et al. | |
| 7,430,420 B2 | 9/2008 | Derakhshan et al. | |
| 7,447,148 B2 | 11/2008 | Gao et al. | |
| 7,463,577 B2 | 12/2008 | Sudo et al. | |
| 7,486,620 B2 | 2/2009 | Seol et al. | |
| 7,486,638 B2 | 2/2009 | Ofuji et al. | |
| 7,502,614 B2 | 3/2009 | Uchida et al. | |
| 7,508,792 B2 | 3/2009 | Petrovic et al. | |
| 7,510,828 B2 | 3/2009 | Lynn et al. | |
| 7,512,076 B2 | 3/2009 | Kwon et al. | |
| 7,512,185 B2 | 3/2009 | Sharon et al. | |
| 7,519,013 B2 | 4/2009 | Destino et al. | |
| 7,519,033 B2 | 4/2009 | Soomro et al. | |
| 7,522,544 B2 | 4/2009 | Cheng et al. | |
| 7,525,971 B2 | 4/2009 | Carroll et al. | |
| 7,526,091 B2 | 4/2009 | Jeong et al. | |
| 7,539,475 B2 | 5/2009 | Laroia et al. | |
| 7,558,235 B2 | 7/2009 | Lester et al. | |
| 7,558,572 B2 | 7/2009 | Anigstein | |
| 7,561,893 B2 | 7/2009 | Moulsley et al. | |
| 7,668,573 B2 | 2/2010 | Laroia et al. | |
| 7,743,284 B1 | 6/2010 | Taylor et al. | |

| | | | |
|---|---|---|---|
| 8,437,251 B2 | 5/2013 | Das et al. | |
| 2001/0036181 A1 | 11/2001 | Rogers | |
| 2001/0046878 A1 | 11/2001 | Chang et al. | |
| 2002/0031105 A1 | 3/2002 | Zeira et al. | |
| 2002/0037729 A1 | 3/2002 | Kitazawa et al. | |
| 2002/0045448 A1 | 4/2002 | Park et al. | |
| 2002/0049040 A1 | 4/2002 | Sugaya et al. | |
| 2002/0077140 A1 | 6/2002 | Monogioudis et al. | |
| 2002/0080967 A1 | 6/2002 | Abdo et al. | |
| 2002/0082011 A1 | 6/2002 | Fujii et al. | |
| 2002/0085516 A1 | 7/2002 | Bridgelall | |
| 2002/0093953 A1 | 7/2002 | Naim et al. | |
| 2002/0107028 A1 | 8/2002 | Rantalainen et al. | |
| 2002/0122431 A1 | 9/2002 | Cho et al. | |
| 2002/0136195 A1 | 9/2002 | Kurtz et al. | |
| 2002/0142788 A1 | 10/2002 | Chawla et al. | |
| 2002/0147017 A1 | 10/2002 | Li et al. | |
| 2002/0177452 A1 | 11/2002 | Ruutu et al. | |
| 2002/0186678 A1 | 12/2002 | Averbuch et al. | |
| 2003/0003921 A1 | 1/2003 | Laakso | |
| 2003/0027587 A1 | 2/2003 | Proctor et al. | |
| 2003/0028606 A1 | 2/2003 | Koopmans et al. | |
| 2003/0064737 A1 | 4/2003 | Eriksson et al. | |
| 2003/0078067 A1 | 4/2003 | Kim et al. | |
| 2003/0095519 A1 | 5/2003 | Kuo et al. | |
| 2003/0114180 A1 | 6/2003 | Black et al. | |
| 2003/0123396 A1 | 7/2003 | Seo et al. | |
| 2003/0123410 A1 | 7/2003 | Youm | |
| 2003/0139197 A1 | 7/2003 | Kostic et al. | |
| 2003/0157899 A1 | 8/2003 | Trossen et al. | |
| 2003/0169705 A1 | 9/2003 | Knisely et al. | |
| 2003/0185224 A1 | 10/2003 | Ramanan et al. | |
| 2003/0185285 A1 | 10/2003 | Talwar | |
| 2003/0193915 A1 | 10/2003 | Lee et al. | |
| 2003/0198206 A1 | 10/2003 | Cain et al. | |
| 2003/0206541 A1 | 11/2003 | Yun et al. | |
| 2003/0207691 A1 | 11/2003 | Chen | |
| 2003/0207693 A1 | 11/2003 | Roderique | |
| 2003/0214906 A1 | 11/2003 | Hu et al. | |
| 2003/0214928 A1 | 11/2003 | Chuah et al. | |
| 2003/0223354 A1 | 12/2003 | Olszewski et al. | |
| 2004/0001429 A1 | 1/2004 | Ma et al. | |
| 2004/0004954 A1 | 1/2004 | Terry et al. | |
| 2004/0013103 A1 | 1/2004 | Zhang et al. | |
| 2004/0057402 A1 | 3/2004 | Ramos et al. | |
| 2004/0081089 A1 | 4/2004 | Ayyagari et al. | |
| 2004/0082344 A1 | 4/2004 | Moilanen et al. | |
| 2004/0085936 A1 | 5/2004 | Gopalakrishnan et al. | |
| 2004/0091026 A1 | 5/2004 | Nakayama | |
| 2004/0111640 A1 | 6/2004 | Baum | |
| 2004/0120411 A1 | 6/2004 | Walton et al. | |
| 2004/0127226 A1 | 7/2004 | Dugad et al. | |
| 2004/0141466 A1 | 7/2004 | Kim et al. | |
| 2004/0147262 A1 | 7/2004 | Lescuyer et al. | |
| 2004/0160922 A1 | 8/2004 | Nanda et al. | |
| 2004/0166869 A1* | 8/2004 | Laroia et al. | 455/450 |
| 2004/0166886 A1 | 8/2004 | Laroia et al. | |
| 2004/0166887 A1* | 8/2004 | Laroia et al. | 455/522 |
| 2004/0180658 A1 | 9/2004 | Uchida et al. | |
| 2004/0184410 A1 | 9/2004 | Park | |
| 2004/0192371 A1 | 9/2004 | Zhao et al. | |
| 2004/0196802 A1 | 10/2004 | Bae et al. | |
| 2004/0203717 A1 | 10/2004 | Wingrowicz et al. | |
| 2004/0203981 A1 | 10/2004 | Budka et al. | |
| 2004/0223455 A1 | 11/2004 | Fong et al. | |
| 2004/0224677 A1 | 11/2004 | Kuchibhotla et al. | |
| 2004/0228313 A1 | 11/2004 | Cheng et al. | |
| 2004/0233838 A1 | 11/2004 | Sudo et al. | |
| 2004/0235510 A1 | 11/2004 | Elicegui et al. | |
| 2004/0248518 A1 | 12/2004 | Kashiwase | |
| 2004/0248568 A1 | 12/2004 | Lucidarme et al. | |
| 2004/0252662 A1 | 12/2004 | Cho et al. | |
| 2004/0253996 A1 | 12/2004 | Chen et al. | |
| 2004/0259546 A1 | 12/2004 | Balachandran et al. | |
| 2004/0264414 A1 | 12/2004 | Dorenbosch | |
| 2004/0266474 A1 | 12/2004 | Petrus et al. | |
| 2005/0003847 A1 | 1/2005 | Love et al. | |
| 2005/0008892 A1 | 1/2005 | Yamamoto et al. | |
| 2005/0037775 A1 | 2/2005 | Moeglein et al. | |
| 2005/0047344 A1 | 3/2005 | Seol et al. | |
| 2005/0047393 A1 | 3/2005 | Liu et al. | |
| 2005/0047416 A1 | 3/2005 | Heo et al. | |
| 2005/0053099 A1 | 3/2005 | Spear et al. | |
| 2005/0058637 A1 | 3/2005 | Lynn et al. | |
| 2005/0068922 A1 | 3/2005 | Jalali | |
| 2005/0099987 A1 | 5/2005 | Lester et al. | |
| 2005/0111361 A1 | 5/2005 | Hosein et al. | |
| 2005/0122900 A1 | 6/2005 | Tuulos et al. | |
| 2005/0124345 A1 | 6/2005 | Laroia et al. | |
| 2005/0128999 A1 | 6/2005 | Kwon et al. | |
| 2005/0136937 A1 | 6/2005 | Qian et al. | |
| 2005/0143084 A1 | 6/2005 | Cheng et al. | |
| 2005/0143114 A1 | 6/2005 | Moulsley et al. | |
| 2005/0152320 A1 | 7/2005 | Marinier et al. | |
| 2005/0157803 A1 | 7/2005 | Kim et al. | |
| 2005/0157876 A1 | 7/2005 | Jeong et al. | |
| 2005/0170782 A1 | 8/2005 | Rong et al. | |
| 2005/0181732 A1 | 8/2005 | Kang et al. | |
| 2005/0195765 A1 | 9/2005 | Sharon et al. | |
| 2005/0201331 A1* | 9/2005 | Gaal et al. | 370/332 |
| 2005/0207335 A1 | 9/2005 | Schmidl et al. | |
| 2005/0207359 A1 | 9/2005 | Hwang et al. | |
| 2005/0243938 A1 | 11/2005 | Armstrong et al. | |
| 2005/0249118 A1 | 11/2005 | Terry et al. | |
| 2005/0250509 A1 | 11/2005 | Choksi et al. | |
| 2005/0250529 A1 | 11/2005 | Funnell et al. | |
| 2005/0259662 A1 | 11/2005 | Kim et al. | |
| 2005/0265301 A1 | 12/2005 | Heo et al. | |
| 2005/0281232 A1 | 12/2005 | Kim et al. | |
| 2005/0289256 A1 | 12/2005 | Cudak et al. | |
| 2006/0003767 A1 | 1/2006 | Kim et al. | |
| 2006/0015357 A1 | 1/2006 | Cagan | |
| 2006/0019694 A1 | 1/2006 | Sutivong et al. | |
| 2006/0040696 A1 | 2/2006 | Lin et al. | |
| 2006/0056346 A1 | 3/2006 | Vadgama et al. | |
| 2006/0073836 A1 | 4/2006 | Laroia et al. | |
| 2006/0079257 A1 | 4/2006 | Iochi et al. | |
| 2006/0079267 A1* | 4/2006 | Kim et al. | 455/522 |
| 2006/0083161 A1 | 4/2006 | Laroia et al. | |
| 2006/0089104 A1 | 4/2006 | Kaikkonen et al. | |
| 2006/0092881 A1 | 5/2006 | Laroia et al. | |
| 2006/0104240 A1 | 5/2006 | Sebire et al. | |
| 2006/0128410 A1 | 6/2006 | Derryberry et al. | |
| 2006/0135193 A1 | 6/2006 | Ratasuk et al. | |
| 2006/0140154 A1 | 6/2006 | Kwak et al. | |
| 2006/0142032 A1 | 6/2006 | Derakhshan et al. | |
| 2006/0164981 A1 | 7/2006 | Olsson et al. | |
| 2006/0176807 A1 | 8/2006 | Wu et al. | |
| 2006/0203765 A1 | 9/2006 | Laroia et al. | |
| 2006/0205356 A1 | 9/2006 | Laroia et al. | |
| 2006/0205396 A1 | 9/2006 | Laroia et al. | |
| 2006/0215604 A1 | 9/2006 | Mueckenheim et al. | |
| 2006/0234722 A1 | 10/2006 | Hanebeck et al. | |
| 2006/0245452 A1 | 11/2006 | Frederiksen et al. | |
| 2006/0246916 A1 | 11/2006 | Cheng et al. | |
| 2006/0270399 A1 | 11/2006 | Qi et al. | |
| 2006/0285481 A1 | 12/2006 | Lane et al. | |
| 2006/0287743 A1 | 12/2006 | Sampath et al. | |
| 2007/0002757 A1 | 1/2007 | Soomro et al. | |
| 2007/0002806 A1 | 1/2007 | Soomro et al. | |
| 2007/0004437 A1 | 1/2007 | Harada et al. | |
| 2007/0015541 A1 | 1/2007 | Dominique et al. | |
| 2007/0026803 A1 | 2/2007 | Malm et al. | |
| 2007/0026808 A1 | 2/2007 | Love et al. | |
| 2007/0030828 A1 | 2/2007 | Vimpari et al. | |
| 2007/0066273 A1 | 3/2007 | Laroia et al. | |
| 2007/0070894 A1 | 3/2007 | Wang et al. | |
| 2007/0081492 A1 | 4/2007 | Petrovic et al. | |
| 2007/0081498 A1 | 4/2007 | Niwano et al. | |
| 2007/0104128 A1 | 5/2007 | Laroia et al. | |
| 2007/0140168 A1 | 6/2007 | Laroia et al. | |
| 2007/0140179 A1 | 6/2007 | Zhang et al. | |
| 2007/0141994 A1 | 6/2007 | Cheng et al. | |
| 2007/0147283 A1 | 6/2007 | Laroia et al. | |
| 2007/0147377 A1 | 6/2007 | Laroia et al. | |
| 2007/0149126 A1 | 6/2007 | Rangan et al. | |
| 2007/0149128 A1 | 6/2007 | Das et al. | |
| 2007/0149129 A1 | 6/2007 | Das et al. | |

| Pub. No. | Date | Inventor |
|---|---|---|
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das et al. |
| 2007/0149238 A1 | 6/2007 | Das et al. |
| 2007/0159969 A1 | 7/2007 | Das et al. |
| 2007/0168326 A1 | 7/2007 | Das et al. |
| 2007/0173208 A1 | 7/2007 | Nishio et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das et al. |
| 2007/0253385 A1 | 11/2007 | Li et al. |
| 2007/0253449 A1 | 11/2007 | Das et al. |
| 2007/0258365 A1 | 11/2007 | Das et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2009/0004983 A1 | 1/2009 | Darabi et al. |
| 2009/0034455 A1 | 2/2009 | Lee et al. |
| 2009/0103507 A1 | 4/2009 | Gu et al. |
| 2009/0106507 A1 | 4/2009 | Skerlj et al. |
| 2010/0220626 A1 | 9/2010 | Das et al. |
| 2011/0090812 A1 | 4/2011 | Aoyama |
| 2011/0149789 A1 | 6/2011 | Edge |

FOREIGN PATENT DOCUMENTS

| | | |
|---|---|---|
| CN | 1507708 | 6/2004 |
| CN | 1545252 A | 11/2004 |
| CN | 1604685 | 4/2005 |
| DE | 10162564 A1 | 7/2003 |
| EP | 1037419 A2 | 9/2000 |
| EP | 1037491 A1 | 9/2000 |
| EP | 1054518 A1 | 11/2000 |
| EP | 1179962 | 2/2002 |
| EP | 1180881 | 2/2002 |
| EP | 1180907 A2 | 2/2002 |
| EP | 1233637 | 8/2002 |
| EP | 1377100 A2 | 1/2004 |
| EP | 1511245 A2 | 3/2005 |
| EP | 1564953 A2 | 8/2005 |
| EP | 1594260 A1 | 11/2005 |
| EP | 1758276 A1 | 2/2007 |
| EP | 1841259 A2 | 10/2007 |
| GB | 2340693 | 2/2000 |
| JP | 8008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 | 4/1999 |
| JP | 2000049689 | 2/2000 |
| JP | 2001007761 A | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 A | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 T | 3/2003 |
| JP | 2003244161 | 8/2003 |
| JP | 2004153585 | 5/2004 |
| JP | 2004533731 | 11/2004 |
| JP | 2004350052 | 12/2004 |
| JP | 2005073276 A | 3/2005 |
| JP | 2005130482 | 5/2005 |
| JP | 2005136773 A | 5/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 2006518578 A | 8/2006 |
| JP | 06268574 A | 10/2006 |
| JP | 2006524966 T | 11/2006 |
| JP | 2006526323 A | 11/2006 |
| JP | 2007509531 A | 4/2007 |
| JP | 2007514364 A | 5/2007 |
| JP | 2007514378 T | 5/2007 |
| JP | 2007521685 A | 8/2007 |
| JP | 2007522692 A | 8/2007 |
| JP | 2007525044 | 8/2007 |
| JP | 2007525045 T | 8/2007 |
| JP | 2011045054 | 3/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 A | 3/2005 |
| KR | 20050023187 A | 3/2005 |
| KR | 20050039376 A | 4/2005 |
| KR | 1020050099633 | 10/2005 |
| KR | 1020050121274 | 12/2005 |
| KR | 20060012282 A | 2/2006 |
| RU | 2149518 | 5/2000 |
| RU | 2181529 | 4/2002 |
| RU | 2188506 | 4/2002 |
| RU | 2202154 | 4/2003 |
| RU | 2202154 C2 | 4/2003 |
| TW | 200423642 | 11/2004 |
| TW | 200539627 | 12/2005 |
| WO | WO9623371 A1 | 8/1996 |
| WO | WO9845967 A2 | 10/1998 |
| WO | WO9856120 A2 | 12/1998 |
| WO | WO9913600 A1 | 3/1999 |
| WO | WO9959254 A2 | 11/1999 |
| WO | WO0101610 A1 | 1/2001 |
| WO | WO0135548 | 5/2001 |
| WO | WO0182504 | 11/2001 |
| WO | 0233841 | 4/2002 |
| WO | WO0232183 A1 | 4/2002 |
| WO | WO0239760 A2 | 5/2002 |
| WO | WO0249305 | 6/2002 |
| WO | WO02073831 A1 | 9/2002 |
| WO | 02104058 | 12/2002 |
| WO | WO02101941 | 12/2002 |
| WO | WO03094544 A1 | 11/2003 |
| WO | WO03105498 A1 | 12/2003 |
| WO | WO2004077685 A2 | 9/2004 |
| WO | WO2004084452 | 9/2004 |
| WO | WO2004084503 A2 | 9/2004 |
| WO | WO2004100450 A1 | 11/2004 |
| WO | WO2004105420 A1 | 12/2004 |
| WO | WO2004110081 A1 | 12/2004 |
| WO | 2005020490 | 3/2005 |
| WO | WO2005034438 | 4/2005 |
| WO | 2005/060277 | 6/2005 |
| WO | 2005060271 | 6/2005 |
| WO | W02005060277 | 6/2005 |
| WO | WO2005057812 A1 | 6/2005 |
| WO | WO2005060132 A1 | 6/2005 |
| WO | WO2005065056 A2 | 7/2005 |
| WO | WO2005069519 | 7/2005 |
| WO | WO2005125049 A1 | 12/2005 |
| WO | 2006044718 | 4/2006 |
| WO | WO2006075293 A1 | 7/2006 |
| WO | WO2007031956 A2 | 3/2007 |

OTHER PUBLICATIONS

International Search Report, PCT/US2005/037115—International Search Authority—US—Sep. 27, 2006.

International Preliminary Report on Patentability, PCT/US2005/037115—International Search Authority—The International Bureau of WIPO—Switzerland, Geneva—Apr. 17, 2007.

Written Opinion, PCT/US2005/037115—International Search Authority—US—Sep. 27, 2006.

Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-Oct. 20, 2004, pp. 654-658.

Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.

Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.

Wada, "Study of an OFDM Cellular System Using a Single Band," 2002 Communication Society Convention, Collection of Lecture Papers 1, Japan, IEEE, Aug. 20, 2002, p. 355, B-5-58.

IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.

IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.

Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.

International Search Report, PCT/US2006/040205—International Search Authority—European Patent Office—Apr. 2, 2007.

International Preliminary Report on Patentability, PCT/US2006/040205—International Search Authority—The International Bureau of WIPO—Geneva, Switzerland—Apr. 16, 2008.

Written Opinion, PCT/US2006/040205—International Search Authority—European Patent Office—Apr. 16, 2008.

3GPP, Radio Resource Control (RRC) protocol specification (3GPP TS 25.331 version 6.3.0 Release 6), ETSI TS 125 331, ETSI, Sep. 2004, V6.3.0, p. 49, 202-209, 220,221,406,579-585, 589, 930.

Ericsson, Discussion on SIR Measurement, TSG-RAN Working Group 4 (Radio) meeting #18, 3GPP, Jul. 9, 2001, R4-010895, URL, http://www.3gpp.org/ftp/tsg_ran/WG4_Radio/TSGR4_18/Docs/R4-010895.zip.

Taiwanese Search report—095137980—TIPO—Oct. 13, 2010.

Tim/Tilab, Biu, Mobilkom Austria, One2one, Telefonica, Re-introduction of SIR measurement, 3GPP TSG-RAN4 Meeting #17, 3GPP, May 21, 2001, R4-010647, URL, http://www.3gpp.org/ftp/tsg_ran/WG4_Radio/TSGR4_17/Docs/R4-010647.Zip.

Translation of Office Action in Chinese application 200680047991.2 corresponding to U.S. Appl. No. 11/608,785, citing CN1604685 dated Dec. 31, 2010.

Translation of Office Action in Japan application 2008-547460 corresponding to U.S. Appl. No. 11/333,771, citing WO2005125049 and JP2001007761 dated Mar. 15, 2011.

Translation of Office Action in Japan application 2010-275603 corresponding to U.S. Appl. No. 11/251,069, citing JP2003018641A, 3GPP_ETSI_TS_125_331_year_2004, Tim/Tilab_R4-010647_year_2001 and Ericsson_R4_010895_year_2001 dated Feb. 8, 2011.

Translation of Office Action in Japanese application 2008-535738 corresponding to U.S. Appl. No. 11/486,714, citing JP2007514378, JP2003510887 and WO9623371 dated Nov. 16, 2010.

Translation of Office Action in Japanese application 2008-535789 corresponding to U.S. Appl. No. 11/549,611, citing JP2003244161, JP200277992 and JP2001016152 dated Jan. 18, 2011.

Translation of Office Action in Ukraine application 200508984 corresponding to U.S. Appl. No. 11/748,433, citing US20020160802, WO0232183, RU2181529, WO9845967, EP1377100, US5867478, US20010007552, US6035000 and US5933421 dated Dec. 9, 2010.

Translation of Office Action in Ukraine Application 201010406 corresponding to U.S. Appl. No. 11/748,433, citing US5867478, US20010007552, US6035000, US5933421, WO02073831, WO02032183, RU2181529 and EP1377100 dated Feb. 22, 2011.

European Search Report—EP11159855—Search Authority—Berlin—Apr. 26, 2011.

European Search Report—EP11165270, Search Authority—Berlin Patent Office, Jun. 6, 2011.

Qualcomm, Scheduling Information Contents, #3GPP TSG-RAW WG2 meeting #48, 3GPP, Aug. 29, 2005, R2-051957, URL: http://3gpp.org/ftp/tsg_ran/WG2_RL2/TSGR2_48/Docments/R2-095517.zip.

Sumsung, EDCH Buffer Status Reporting. 3GPP TSG RAN2#45bis, 3GPP, Jan. 10, 2005, R2-050026, URL: http://www.3gpp.org/ftp/tsg_ran/WG2_RL2/TSGR2_45bis/Dcs/R2-050026.zip.

Sumsung, Uplink control signaling structure (Revision of R1-041086), 3GPP TSG-RAN WG1 Meeting #38bis, 3GPP, Sep. 20, 2004, R1-041222, URL: http://www.3gpp.org/ftp/tsg_ran/WG1_RL1/TSGR1_38bis/Dcs/R1-041222.zip.

Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.

Gunnarsson, G. et al.,"Location Trial System for Mobile Phones," Global Telecommunications Conference, 1998. GLOBECOM 98. The Bridge to Global Integration. IEEE, vol. 4, pp. 2211-2216, Nov. 8-12, 1998.

Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.

LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.

* cited by examiner

900 → 902 ↓ 904 ↓

| Power scaling factor: | |
|---|---|
| Use of the tone block | Scaling factor |
| Tier 0 tone block | 1 |
| Tier 1 tone block | bssPowerBackoff01 |
| Tier 2 tone block | bssPowerBackoff02 |

| UL loading factor: | |
|---|---|
| UL loading factor in DL.BCH.BST of BSS i | $b_i$, in dB |
| 0 | 0 |
| 1 | -1 |
| 2 | -2 |
| 3 | -3 |
| 4 | -4 |
| 5 | -6 |
| 6 | -9 |
| 7 | -infinity |

FIGURE 10

| FIGURE 25A |
| --- |
| FIGURE 25B |

METHODS AND APPARATUS FOR DETERMINING, COMMUNICATING AND USING INFORMATION INCLUDING LOADING FACTORS WHICH CAN BE USED FOR INTERFERENCE CONTROL PURPOSES

RELATED APPLICATIONS

The present application claims the benefit of the filing date of U.S. Provisional Patent Application Ser. No. 60/792,128, filed on Apr. 14, 2006 titled "METHODS AND APPARATUS FOR DETERMINING, COMMUNICATING AND USING INFORMATION WHICH CAN BE USED FOR INTERFERENCE CONTROL PURPOSES" and is a continuation in part of U.S. patent application Ser. No. 11/251,069 filed Oct. 14, 2005, which claims priority to Provisional Application No. 60/618,773 filed Oct. 14, 2004, and is a continuation in part of U.S. patent application Ser. No. 11/302,729 filed Dec. 14, 2005, each of which is hereby expressly incorporated by reference.

FIELD OF THE INVENTION

The present invention relates to wireless communications system and, more particularly, to method and apparatus for collecting, measuring, reporting and/or using information which can be used for interference control purposes in a wireless communications system.

BACKGROUND

In a wireless multiple access communication system, wireless terminals contend for system resources in order to communicate with a common receiver over an uplink channel. An example of this situation is the uplink channel in a cellular wireless system, in which wireless terminals transmit to a base station receiver. When a wireless terminal transmits on the uplink channel, it typically causes interference to the entire system, e.g., neighboring base station receivers. Since wireless terminals are distributed, controlling the interference generated by their transmission is a challenging problem.

Many cellular wireless systems adopt simple strategies to control uplink interference. For example CDMA voice systems (e.g., IS-95) power control wireless terminals in such a manner that their signals are received at the base station receiver at approximately the same power. State-of-the-art CDMA systems such as 1xRTT and 1xEV-DO allow for wireless terminals to transmit at different rates, and be received at the base station at different powers. However, interference is controlled in a distributed manner which lowers the overall level of interference without precisely controlling those wireless terminals that are the worst sources of interference in the system.

This existing body of interference-control approaches limits the uplink capacity of wireless systems.

It would be useful if a base station could be provided with information that could be used in determining the amount of signal interference that will be created in neighboring cells and/or sectors when a transmission occurs and/or determining the amount of interference a wireless terminal is likely to encounter due to signal interference. It would be particularly desirable if information which can be used for interference determination purposes could be supplied by one or more wireless terminals to a base station.

Loading affects interference considerations in a wireless communications system. It would be beneficial if wireless terminals and/or base stations communicated such information. It would also be beneficial if wireless terminals and/or base stations utilized such loading information in determining interference levels.

Various received different types of downlink broadcast reference signals may be usable at different times to a wireless terminal which is to communicate interference information to a base station. It would be beneficial if methods and apparatus supported utilizing different types of broadcast reference signals in determining interference information and/or tailoring the reporting calculations to accommodate a current set of conditions.

SUMMARY

Various embodiments are directed to methods and apparatus for collecting, measuring, reporting and/or using information which can be used for interference control purposes.

In accordance with various embodiments, wireless terminals, e.g., mobile nodes, measure reference signals transmitted from one or more base stations, e.g., base station sector attachment point transmitters. The measured reference signals may be, e.g., beacon signals and/or pilot signals. The beacon signals may be narrowband signals, e.g., a single tone. The beacon signals may have a duration of one, two or more symbol transmission time periods, e.g., OFDM symbol transmission time periods. However, other types of beacon signals may be used and the particular type of beacon signal is not critical to the invention. From the measured reference signals, the wireless terminal generates, in some embodiments, one or more gain ratios which provide information about the relative gain of the communications channels from different base station sectors to the wireless terminal. Uplink base station attachment point loading factor information corresponding to one or more different base station attachment points is, in some embodiments, also used in determining interference information.

Based on the signal energy measurements, relative gains generated from the energy measurements, and uplink loading factor information reports are generated and sent to one or more base stations, e.g., a beacon ratio report is generated and sent to current serving connection base station attachment point using a dedicated control channel. The reports, e.g. uplink interference reports such as beacon ratio reports, may be in a plurality of different formats and may provide information relating a current serving base station attachment point to a single one additional base station attachment point or to multiple additional base station attachment points. A current serving base station sector attachment point may request from a wireless terminal transmission of an interference report providing interference information relating to a specific different base station sector attachment point, e.g., an adjacent cell and/or sector base station sector attachment point. This is done, in some embodiments, by the current serving base station sector attachment point transmitting a request for a specific interference report to the wireless terminal. The request normally identifies, either directly or indirectly, the interfering BS sector attachment point for which the specific report is sought. The wireless terminal will respond to such a request by transmitting the requested report.

In addition to responding to requests for specific interference reports, wireless terminals, in some embodiments, transmit interference reports generated according to a reporting schedule. In such embodiments, a base station sector attachment point having an active connection with a wireless terminal will receive interference reports on a predictable, e.g., predetermined, schedule, e.g., as part of a recurring dedicated control channel reporting schedule.

Depending on the embodiment, generation of gain ratios and/or reports may be a function of various factors indicative of relative transmission power levels used by different base station sector attachment points and/or for different signals which may be measured. In this manner, signals which are transmitted at different power levels, e.g., pilots and beacon signals, can be measured and used in generating reliable relative channel gain estimates by taking into consideration the different relative transmission power levels of the various signals being measured.

As discussed above, a wireless terminal receives and measures broadcast reference signals, e.g., beacon and/or pilot signals, transmitted from a plurality of base station attachment points. The wireless terminal monitors for and attempts to recover broadcast loading factor information corresponding to base station attachment points. In some embodiments, uplink loading factor information corresponding to a base station attachment point is communicated in a downlink broadcast report which conveys one of at least 4 different loading levels. In one such embodiment the uplink loading factor corresponding to a base station attachment point is communicated in a 3 bit report communicating one of eight loading levels. In some embodiments an uplink loading factor report corresponding to a particular base station attachment point is communicated via a downlink broadcast from the same particular base station attachment point to which the uplink loading factor report corresponds. In some embodiments, a base station sector attachment point, e.g., a current serving connection base station sector attachment point broadcasts uplink loading factor information corresponding to a plurality of local base station sector attachment points. In such an embodiment, a wireless terminal synchronized with respect to its current serving base station attachment point is able to recover and use uplink loading factor information corresponding to other local base station sector attachment points of interest, even though the wireless terminal may not be timing synchronized with respect to those additional base station attachment points and/or the broadcast control signals communicating uplink load factor information transmitted from those additional base station attachments points may be too weak from the wireless terminal's perspective to be otherwise recovered.

The wireless terminal generates and transmits an interference report to a current base station attachment point, the report based on the results of a measured received reference signal from the current base station attachment point, a measured received reference signal from each of one or more different base station attachment points, and uplink loading factor information. In the absence of a successfully recovered broadcast uplink loading factor corresponding to a base station attachment point to be used in the interference report, the wireless terminal uses a default value for the loading factor corresponding to the base station attachment point.

Generated interference reports, in various embodiments, are based on beacon signal measurements and uplink loading factors, pilot signal measurements and uplink loading factors, or a mixture of beacon and pilot signal measurements and uplink loading factors. Transmission gain factors relating one reference signal to another are used, in some embodiments, by the wireless terminal in generating an interference report. For example, in one exemplary embodiment, beacon signals are transmitted at the same power levels throughout the system, and pilot signals are transmitted at different levels in the system, with the pilot signals from a particular attachment point being transmitted at one of a plurality of predetermined power tier levels. A wireless terminal utilizes transmission gain adjustment factors, when needed, in comparing received reference signals of different types and/or sourced from different attachment points. In addition, the wireless terminal uses received and/or default base station attachment point uplink loading factors in scaling received reference signal power levels and generating an interference report.

One type of interference report, e.g., a specific interference report, sometimes otherwise referred to as a special interference report, relates a current serving base station attachment point to a single additional base station attachment point, and, in various embodiments, multi-level uplink loading factors are used in generating the report. In some such embodiments, the single additional base station attachment point is selected by the current serving base station attachment point. Another type of interference report, e.g., a generic interference report, relates a current serving base station attachment point to one or more additional base station attachment points, is generated using one of a summing function and a maximum function and, in some embodiments, is generated utilizing multi-level uplink loading factor information.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

BRIEF DESCRIPTION OF THE FIGURES

FIG. 9 includes exemplary power scaling factor table, implemented in accordance with the present invention.

FIG. 10 includes an exemplary uplink loading factor table used in various embodiments in the generation of interference reports.

DETAILED DESCRIPTION

Methods and apparatus for collecting, reporting and using information which can be used for interference control purposes in accordance with various embodiments will now be described. The methods and apparatus of the present invention are well suited for use with wireless multiple access, e.g., multi-user, communications systems. Such systems may be implemented as OFDM systems, CDMA systems or other types of wireless systems where signal interference from transmission from one or more transmitters, e.g., adjacent base stations, is of concern.

An exemplary embodiment of the invention is described below in the context of a cellular wireless data communication system 100 of the present invention shown in FIG. 1. While an exemplary cellular wireless system is used for purposes of explaining the invention, the invention is broader in scope than the example and can be applied in general to many other wireless communication systems as well.

In a wireless data communication system, the air link resource generally includes bandwidth, time or code. The air link resource that transports user data and/or voice traffic is called the traffic channel. Data is communicated over the traffic channel in traffic channel segments (traffic segments for short). Traffic segments may serve as the basic or minimum units of the available traffic channel resources. Downlink traffic segments transport data traffic from the base station to the wireless terminals, while uplink traffic segments transport data traffic from the wireless terminals to the base station. One exemplary system in which the present invention may be used is the spread spectrum OFDM (orthogonal frequency division multiplexing) multiple-access system in which a traffic segment includes a number of frequency tones defined over a finite time interval.

Figure 1:
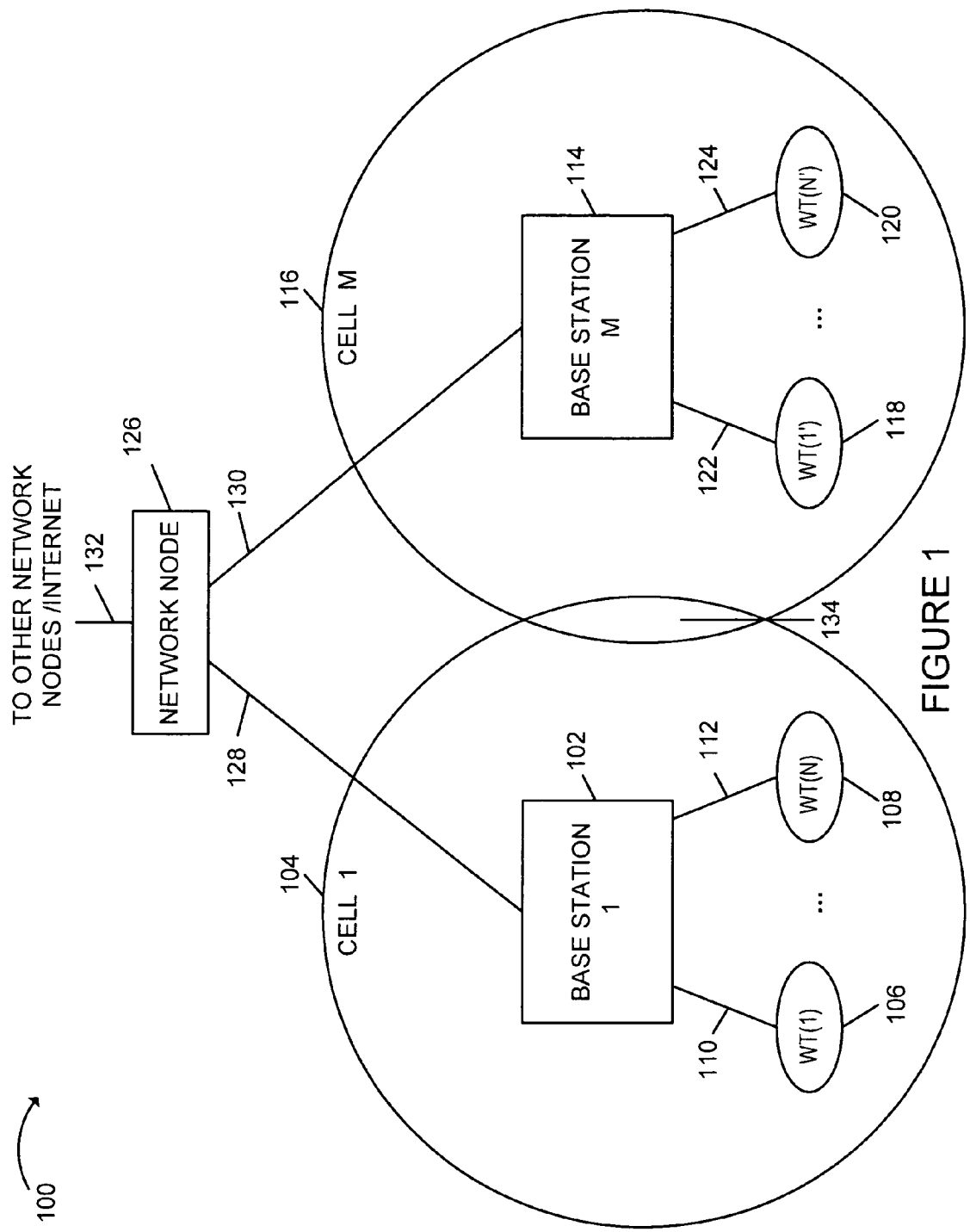
FIG. 1 is a drawing of an exemplary wireless communications system implemented in accordance with various embodiments.

FIG. 1 is an illustration of an exemplary wireless communications system 100, implemented in accordance with various embodiments. Exemplary wireless communications system 100 includes a plurality of base stations (BSs): base station 1 102, base station M 114. Cell 1 104 is the wireless coverage area for base station 1 102. BS 1 102 communicates with a plurality of wireless terminals (WTs): WT(1) 106, WT(N) 108 located within cell 1 104. WT(1) 106, WT(N) 108 are coupled to BS 1 102 via wireless links 110, 112, respectively. Similarly, Cell M 116 is the wireless coverage area for base station M 114. BS M 114 communicates with a plurality of wireless terminals (WTs): WT(1') 118, WT(N') 120 located within cell M 116. WT(1') 118, WT(N') 120 are coupled to BS M 114 via wireless links 122, 124, respectively. WTs (106, 108, 118, 120) may be mobile and/or stationary wireless communication devices. Mobile WTs, sometimes referred to as mobile nodes (MNs), may move throughout the system 100 and may communicate with the base station corresponding to the cell in which they are located. Region 134 is a boundary region between cell 1 104 and cell M 116. In the FIG. 1 system, the cells are shown as single sector cells. Multi-sectors cells are also possible and are supported. The transmitter of a base station sector can be identified based on transmitted information, e.g., beacon signals, which communicate a base station identifier and/or sector identifier.

Network node 126 is coupled to BS 1 102 and BS M 114 via network links 128, 130, respectively. Network node 126 is also coupled to other network nodes/Internet via network link 132. Network links 128, 130, 132 may be, e.g., fiber optic links. Network node 126, e.g., a router node, provides connectivity for WTs, e.g., WT(1) 106 to other nodes, e.g., other base stations, AAA server nodes, Home agents nodes, communication peers, e.g., WT(N'), 120, etc., located outside its currently located cell, e.g., cell 1 104.

Figure 2:
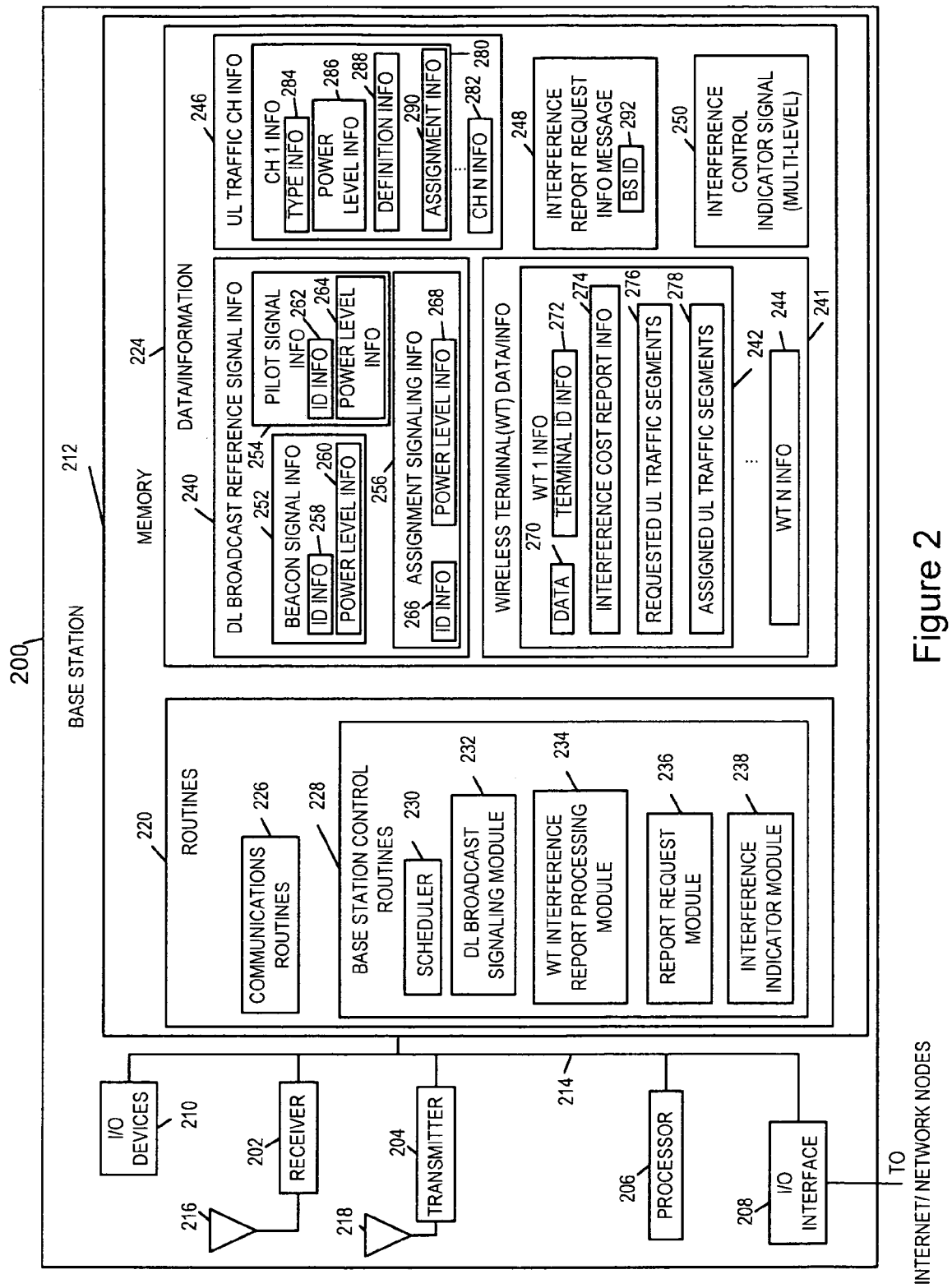
FIG. 2 shows an example of a base station implemented in accordance with various embodiments.

FIG. 2 illustrates an exemplary base station 200, implemented in accordance with various embodiments. Exemplary BS 200 may be a more detailed representation of any of the BSs, BS 1 102, BS b 114 of FIG. 1. BS 200 includes a receiver 202, a transmitter 204, a processor, e.g., CPU, 206, an I/O interface 208, I/O devices 210, and a memory 212 coupled together via a bus 214 over which the various elements may interchange data and information. In addition, the base station 200 includes a receiver antenna 216 which is coupled to the receiver 202 and a transmitter antenna 218 which is coupled to transmitter 204. Transmitter antenna 218 is used for transmitting information, e.g., downlink traffic channel signals, beacon signals, pilot signals, assignment signals, interference report request messages, interference control indicator signals, etc., from BS 200 to Wts 300 (see FIG. 3) while receiver antenna 216 is used for receiving information, e.g., uplink traffic channel signals, WT requests for resources, WT interference reports, etc., from WTs 300.

The memory 212 includes routines 220 and data/information 224. The processor 206 executes the routines 220 and uses the data/information 224 stored in memory 212 to control the overall operation of the base station 200 and implement methods. I/O devices 210, e.g., displays, printers, keyboards, etc., display system information to a base station administrator and receive control and/or management input from the administrator. I/O interface 208 couples the base station 200 to a computer network, other network nodes, other base stations 200, and/or the Internet. Thus, via I/O interface 208 base stations 200 may exchange customer information and other data as well as synchronize the transmission of signals to Wts 300 if desired. In addition I/O interface 208 provides a high speed connection to the Internet allowing WT 300 users to receive and/or transmit information over the Internet via the base station 300. Receiver 202 processes signals received via receiver antenna 216 and extracts from the received signals the information content included therein. The extracted information, e.g., data and channel interference report information, is communicated to the processor 206 and stored in memory 212 via bus 214. Transmitter 204 transmits information, e.g., data, beacon signals, pilot signals, assignment signals, interference report request messages, interference control indicator signals, to Wts 300 via antenna 218.

As mentioned above, the processor 206 controls the operation of the base station 200 under direction of routines 220 stored in memory 212. Routines 220 include communications routines 226, and base station control routines 228. The base station control routines 228 include a scheduler 230, a downlink broadcast signaling module 232, a WT report processing module 234, a report request module 236, and an interference indicator module 238. The report request module 236 can generate requests for specific interference reports concerning a particular BS sector identified in the report request. Generated report requests are transmitted to one or more wireless terminals when the BS seeks interference information at a time other than that provided for by a predetermined or fixed reporting schedule. Data/Information 224 includes downlink broadcast reference signal information 240, wireless terminal data/information 241, uplink traffic channel information 246, interference report request information messages 248, and interference control indicator signals 250.

Downlink broadcast reference signal information 240 includes beacon signal information 252, pilot signal information 254, and assignment signal information 256. Beacon signals are relatively high power OFDM broadcast signals in which the transmitter power is concentrated on one or a few tones for a short duration, e.g., two symbol times. Beacon signal information 252 includes identification information 258 and power level information 260. Beacon identification information 258 may include information used to identify and associate the beacon signal with specific BS 200, e.g., a specific tone or set of tones which comprise the beacon signal at a specific time in a repetitive downlink transmission interval or cycle. Beacon power level information 260 includes information defining the power level at which the beacon signal is transmitted. Pilot signals may include known signals broadcast to WTs at moderately high power levels, e.g., above ordinary signaling levels, which are typically used for identifying a base station, synchronizing with a base station, and obtaining a channel estimate. Pilot signal information 254 includes identification information 262 and power level information 264. Pilot identification information 262 includes information used to identify and associate the pilot signals with specific base station 200. Pilot power level information 264 includes information defining the power level at which the pilot signals are transmitted. Various signals providing information about signal transmission power levels, e.g., pilot and beacon signal transmission pilot levels, may be broadcast for use by wireless terminals in determining gain ratios and/or interference reports. Assignment signals includes broadcast uplink and downlink traffic channel segment assignment signals transmitted typically at power levels above ordinary signaling levels so as to reach WTs within its cell which have poor channel quality conditions. Assignment signaling information 256 includes identification information 266 and power level information 268. Assignment signaling identification information 266 includes information associating specific tones at specific times in the downlink timing cycle with assignments for the specific BS 200. Assignment power level information 268 includes information defining the power level at which the assignment signals are transmitted.

Wireless terminal data/information 241 includes a plurality of sets of WT data/information, WT 1 information 242, WT N info 244. WT 1 information 242 includes data 270, terminal identification information 272, interference cost report information 274, requested uplink traffic segments 276, and assigned uplink traffic segments 278. Data 270 includes user data associated with WT 1, e.g., data and information received from WT 1 intended to be communicated by BS 200 either directly or indirectly to a peer node of WT 1, e.g., WT N, in which WT 1 is participating in a communications session. Data 270 also includes received data and information originally sourced from a peer node of WT 1, e.g., WT N. Terminal identification information 272 includes a BS assigned identifier associating WT 1 to the BS and used by the BS to identify WT 1. Interference cost report information 274 includes information which has been forwarded in a feedback report from WT 1 to BS 200 identifying interference costs of WT 1 transmitting uplink signaling to the communications system. Requested uplink traffic segments 276 include requests from WT 1 for uplink traffic segments which are allocated by the BS scheduler 230, e.g., number, type, and/or time constraint information. Assigned uplink traffic segments 278 includes information identifying the uplink traffic segments which have been assigned by the scheduler 230 to WT 1.

Uplink traffic channel information 246 includes a plurality of uplink traffic channel segment information sets including information on the segments that may be assigned by BS scheduler 230 to WTs requesting uplink air link resources. Uplink traffic channel information 246 includes channel segment 1 information 280 and channel segment N information 282. Channel segment 1 information 280 includes type information 284, power level information 286, definition information 288, and assignment information 290. Type information 284 includes information defining the characteristics of the segment 1, e.g., the frequency and time extent of the segment. For example, the BS may support multiple types of uplink segments, e.g., a segment with a large bandwidth but a short time durations and a segment with a small bandwidth but a long time duration. Power level information 286 includes information defining the specified power level at which the WT is to transmit when using uplink segment 1. Definition information 288 includes information defining specific frequencies or tones and specific times which constitute uplink traffic channel segment 1. Assignment information 290 includes assignment information associated with uplink traffic segment 1, e.g., the identifier of the WT being assigned the uplink traffic channel segment 1, a coding and/or a modulation scheme to be used in uplink traffic channel segment 1.

Interference report request information messages 248, used in some embodiments, are messages to be transmitted, e.g., as a broadcast messages or as messages directed to specific WTs. The BS 200 may transmit to Wts 300 on a common control channel instructing the WTs to determine and report the interference information with respect to a particular base station transmitter, e.g., base station sector transmitter, in the communications system. Interference report request information messages 248 normally include base station transmitter identification information 292 which identifies the particular base station sector being currently designated for the interference report. As discussed above, some base stations are implemented as single sector base stations. Over time BS 200 may change base station identification information 292 to correspond to each of the neighboring transmitters and thereby obtain interference information about multiple neighbors.

Interference control indicator signals 250, used in some embodiments, e.g., where at least some of the uplink traffic segments are not explicitly assigned by the base station, are signals broadcast by BS 200 to Wts 300 to control, in terms of interference, which WTs may use uplink traffic segments. For example, a multi-level variable may be used where each level indicates how tightly the BS 200 would like to control interference. Wts 300 which receive this signal can use this signal in combination with their own measured interference to determine whether or not the WT 300 is allowed to use the uplink traffic segments being controlled.

Communication routines 226 implement the various communications protocols used by the BS 200 and control overall transmission of user data. Base station control routines 228 control the operation of the I/O devices 210, I/O interface 208, receiver 202, transmitter 204, and controls the operation of the BS 200 to implement the methods of the present invention. Scheduler 230 allocates uplink traffic segments under its control to Wts 300 based upon a number of constraints: power requirement of the segment, transmit power capacity of the WT, and interference cost to the system. Thus, the scheduler 230 may, and often does, use information from received interference reports when scheduling downlink transmissions. Downlink broadcast signaling module 232 uses the data/information 224 including the downlink broadcast reference signal information 240 to generate and transmit broadcast signals such as beacons, pilot signals, assignments signals, and/or other common control signal transmitted at known power levels which may be used by Wts 300 in determining downlink channel quality and uplink interference levels. WT interference report processing module 234 uses the data/information 224 including the interference cost report information 274 obtained from the Wts 300 to process, correlate, and forward uplink interference information to the scheduler 230. The report request module 236, used in some embodiments, generates a sequence of interference report request messages 248 to request a sequence of uplink interference reports, each report corresponding to one of its adjacent base stations. Interference indicator module 238, used in some embodiments, generates (multi-level) interference control indicator signals 250 which are transmitted to the Wts 300 to control access to some uplink traffic channel segments.

Figure 3:
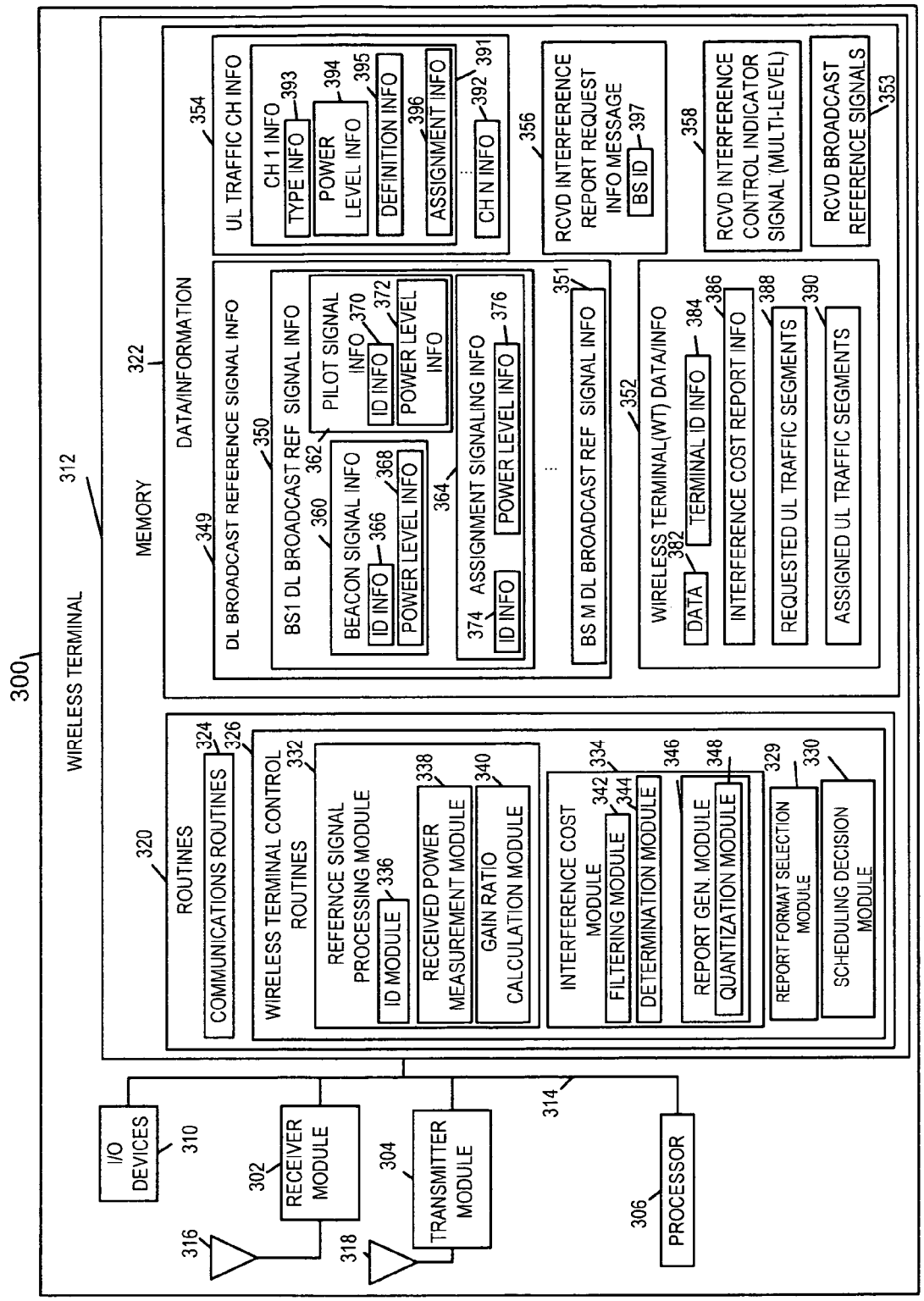
FIG. 3 illustrates a wireless terminal implemented in accordance with various embodiments.

FIG. 3 illustrates an exemplary wireless terminal 300, implemented in accordance with various embodiments. Exemplary wireless terminal 300 may be a more detailed representation of any of the WTs 106, 108, 118, 120 of exemplary system wireless communication system 100 of FIG. 1. WT 300 includes a receiver 302, a transmitter 304, I/O devices 310, a processor 306, e.g., a CPU, and a memory 312 coupled together via bus 314 over which the various elements may interchange data and information. Receiver 302 is coupled to antenna 316; transmitter 304 is coupled to antenna 318.

Downlink signals transmitted from BS 200 are received through antenna 316, and processed by receiver 302. Transmitter 304 transmits uplink signals through antenna 318 to BS 200. Uplink signals includes, e.g., uplink traffic channel signals and interference cost reports. I/O devices 310 include user interface devices such as, e.g., microphones, speakers, video cameras, video displays, keyboard, printers, data terminal displays, etc. I/O devices 310 may be used to interface with the operator of WT 300, e.g., to allow the operator to enter user data, voice, and/or video directed to a peer node and allow the operator to view user data, voice, and/or video communicated from a peer node, e.g., another WT 300.

Memory 312 includes routines 320 and data/information 322. Processor 306 executes the routines 320 and uses the data/information 322 in memory 312 to control the basic operation of the WT 300 and to implement methods. Routines 320 include communications routine 324 and WT control routines 326. WT control routines 326 include a reference signal processing module 332, an interference cost module 334, a report format selection module 329, and a scheduling decision module 330. Reference signal processing module 332 includes an identification module 336, a received power measurement module 338, and a channel gain ratio calculation module 340. Interference cost module 334 includes a filtering module 342, a determination module 344, and a report generation module 346. The report generation module 346 includes a quantization module 348.

Data/information 322 includes downlink broadcast reference signal information 349, wireless terminal data/information 352, uplink traffic channel information 354, received interference report request information message 356, received interference control indicator signal 358, and received broadcast reference signals 353.

Downlink broadcast reference signal information 349 includes a plurality of downlink broadcast reference signal information sets, base station 1 downlink broadcast reference signal information 350, base station M downlink broadcast reference signal information 351. BS 1 downlink broadcast reference signal information includes beacon signal information 360, pilot signal information 362, and assignment signaling information 364. Beacon signal information 360 includes identification information 366, e.g., BS identifier and sector identifier information, and power level information 368. Pilot signal information 362 includes identification information 370 and power level information 372. Assignment signaling information 364 includes identification information 374 and power level information 376.

Wireless terminal data/information 352 includes data 382, terminal identification information 384, interference cost report information 386, requested uplink traffic segments 388, and assigned uplink traffic segments 390.

Uplink traffic channel information 354 includes a plurality of uplink traffic channel information sets, channel 1 information 391, channel N information 392. Channel 1 information 391 includes type information 393, power level information 394, definition information 395, and assignment information 396. The scheduling module 330 controls the scheduling of the transmission interference reports, e.g., according to a predetermined schedule, BS requested interference reports in response to received report requests, and user data.

Received interference report request information message 356 includes a base station identifier 397.

Figure 4:
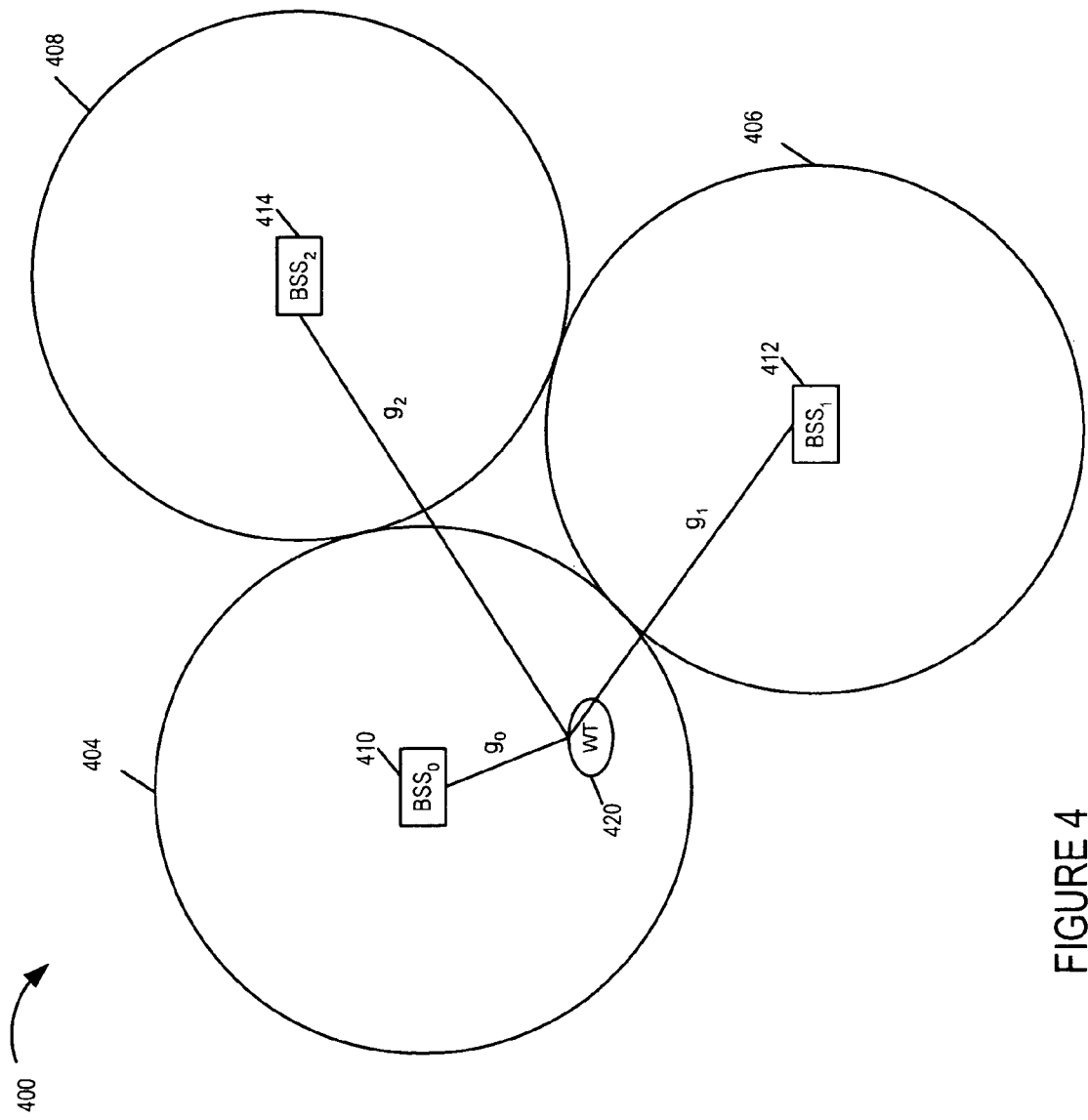
FIG. 4 illustrates a system in which a wireless terminal is connected to a base station sector and measures the relative gains associated with a plurality of interfering base stations in accordance with various embodiments.

FIG. 4 illustrates an exemplary system 400 implemented in accordance with various embodiments which will be used to explain various features of the invention. The system 400 includes first, second and third cells 404, 406, 408 which neighbor each other. The first cell 404 includes a first base station including a first base station sector transmitter ($BSS_0$) 410 and a wireless terminal 420 which is connected to $BSS_0$ 410. The second cell 406 includes a second base station including a second base station sector transmitter ($BSS_1$) 412. The third cell 408 includes a third station base station including a third base station sector transmitter ($BSS_2$) 414. As can be seen, signals transmitted between $BSS_0$ and the WT 420 are subjected to a channel gain $g_0$. Signals transmitted between $BSS_1$ and the WT 420 are subjected to a channel gain $g_1$. Signals transmitted between $BSS_2$ and the WT 420 are subjected to a channel gain $g_2$.

Assume that the WT 420 is connected to $BSS_0$ 410 using $BSS_0$ 410 as its attachment point. A gain ratio $G_i$=ratio of the channel gain from the BSSi to the WT 420 to the channel gain from the $BSS_0$ to the WT 420. That is:

$$G_i = g_i/g_0$$

Assuming that beacon signals are transmitted from the first, second and third BSSs at the same power level, the received power (PB) of the beacon signals received from the base stations $BSS_0$, $BSS_1$, $BSS_2$ can be used to determine the gain ratio's as follows:

$$G_0 = g_0/g_0 = 1 = PB_0/PB_0$$

$$G_1 = g_1/g_0 = PB_1/PB_0$$

$$G_2 = g_2/g_0 PB_2/PB_0$$

Figure 6:
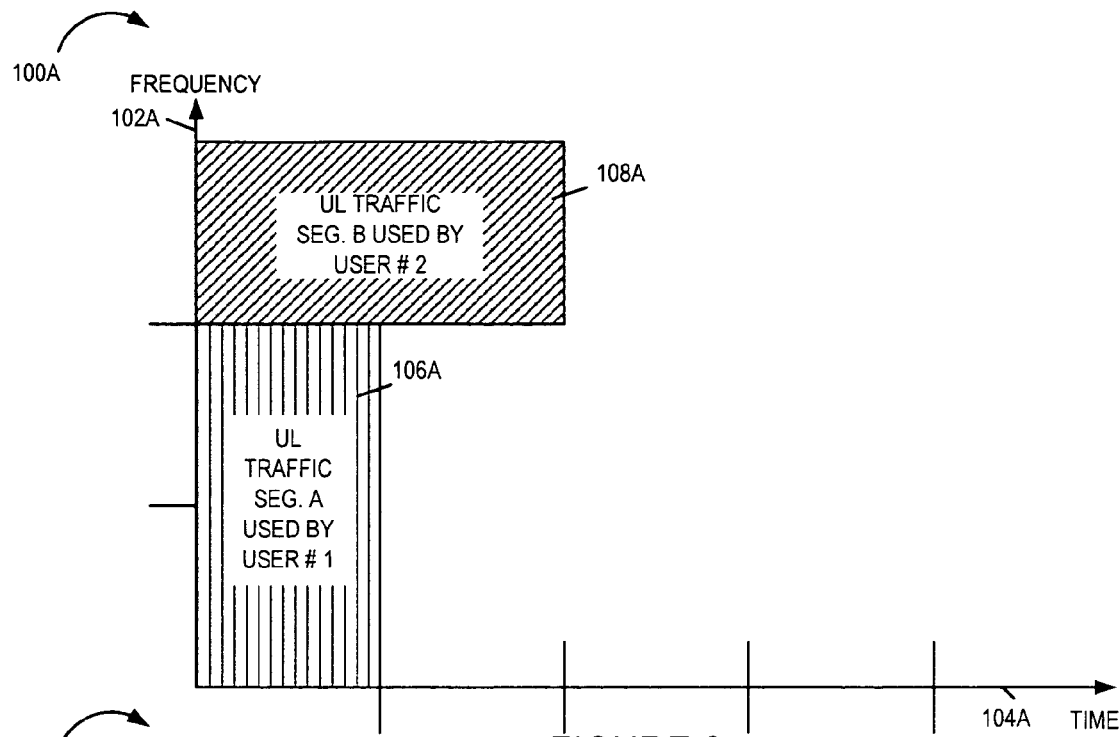
FIG. 6 illustrates an uplink traffic channel and segments included therein.

The following discussion will focus on the operation of the uplink traffic channel in accordance with various embodiments. In the exemplary system, the traffic segments that constitute the uplink traffic channel may be defined over different frequency and time extents in order to suit a broad class of wireless terminals that are operating over a diverse set of wireless channels and with different device constraints. FIG. 6 is a graph 100A of frequency on the vertical axis 102A vs time on the horizontal axis 104A. FIG. 6 illustrates two kinds of traffic segments in the uplink traffic channel. Traffic segment denoted A 106A occupies twice the frequency extent of the traffic segment denoted B 108A. The traffic segments in the uplink traffic channel can be shared dynamically among the wireless terminals that are communicating with the base station. A scheduling module that is part of the base station can rapidly assign the traffic channel segments to different users according to their traffic needs, device constraints and channel conditions, which may be time varying in general. The uplink traffic channel is thus effectively shared and dynamically allocated among different users on a segment-by-segment basis. The dynamic allocation of traffic segments is illustrated in FIG. 6 in which segment A is assigned to user #1 by the base station scheduler and segment B is assigned to user #2.

Figure 7:
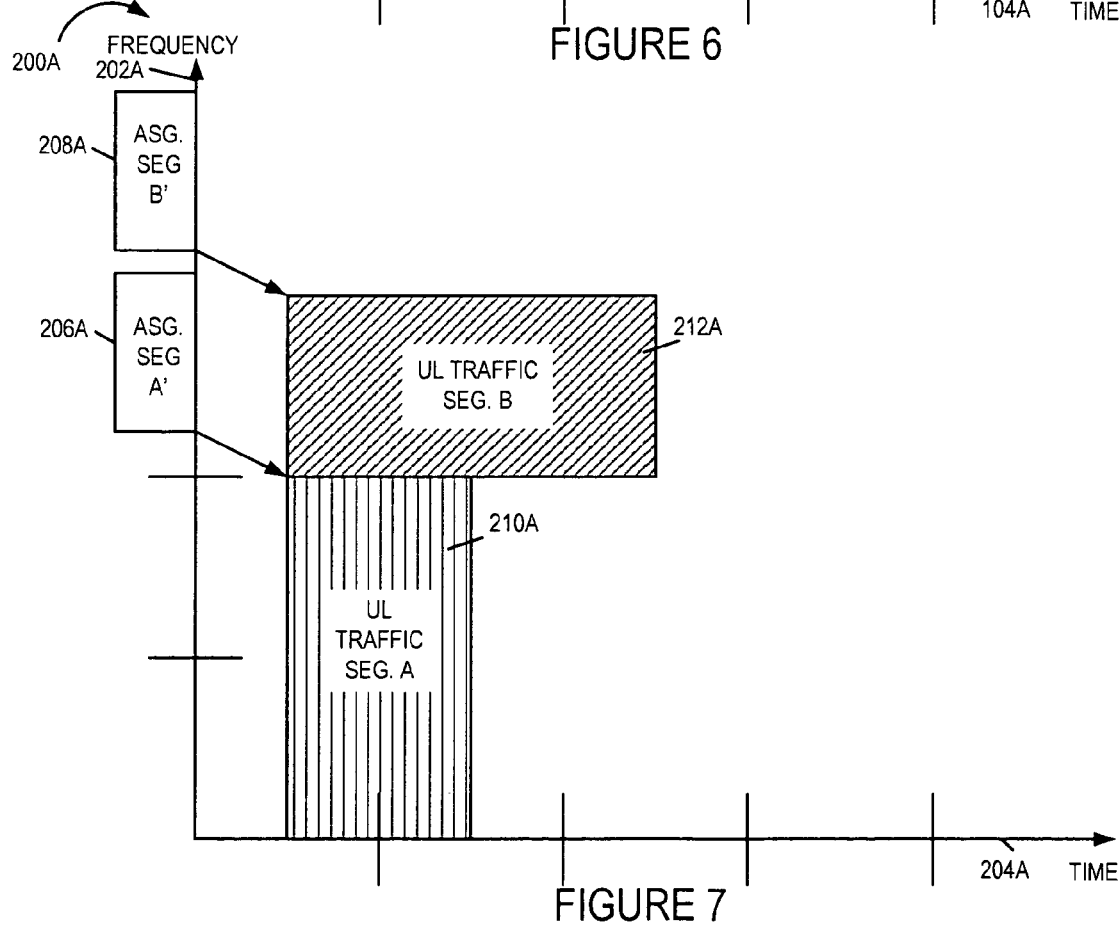
FIG. 7 illustrates assignments which can be used by a base station to assign uplink traffic channel segments to a wireless terminal.

In the exemplary system, the assignment information of traffic channel segments is transported in the assignment channel, which includes a series of assignment segments. Each traffic segment is associated with a corresponding unique assignment segment that conveys the assignment information that may include the identifier of the wireless terminal and also the coding and modulation scheme to be used in that traffic segment. FIG. 7 is a graph 200A of frequency on the vertical axis 202A vs. time on the horizontal axis 204A. FIG. 7 shows two assignment segments, A' 206A and B' 208A, which convey the assignment information of the uplink traffic segments A 210A and B 212A, respectively. The assignment channel is a shared channel resource. The wireless terminals receive the assignment information conveyed in the assignment channel and then transmit on the uplink traffic channel segments according to the assignment information.

The base station scheduler 230 allocates traffic segments based on a number of considerations. One constraint is that the transmit power requirement of the traffic channel should not exceed the transmit power capability of the wireless terminal. Hence, wireless terminals that are operating over weaker uplink channels may be allocated traffic segments that occupy a narrower frequency extent in the exemplary system in order that the instantaneous power requirements are not severely constraining. Similarly, wireless terminals that generate a greater amount of interference may also be allocated traffic segments that include a smaller frequency extent in order to reduce the impact of the instantaneous interference generated by them. The total interference is controlled by scheduling the transmission of the wireless terminals on the basis of their interference costs to the system, which are defined in the following.

The wireless terminals determine their interference costs to the system from the received downlink broadcast signals. In one embodiment, the wireless terminals report their interference costs to the base station, in the form of interference reports, which then makes uplink scheduling decisions to control uplink interference. In another embodiment, the base station broadcasts an interference control indicator, and the wireless terminals compare their interference costs with the received indicator to determine their uplink transmission resources in an appropriate manner, e.g., mobiles have uplink transmission costs below a level indicated by the control indicator may transmit while mobiles with interference costs exceeding the cost level indicated by the control indicator will refrain from transmitting.

Exemplary Interference costs which may be considered will now be described.

Consider a wireless terminal labeled $m_0$. Assume the wireless terminal is connected to base station $B_0$. Denote $G_{0,k}$ the channel gain between this wireless terminal and base station $B_k$, for k=0, 1, ..., N−1, where N is the total number of base stations in the system.

In the exemplary system, the amount of power transmitted by wireless terminal $m_0$ on the uplink traffic segment is usually a function of the condition of the wireless channel from wireless terminal $m_0$ to the base station $B_0$, the frequency extent, and the choice of code rate on the traffic segment. The frequency extent of the segment and the choice of code rate determine the transmit power used by the mobile, which is the quantity that directly causes interference. Assume that the SNR required for the base station receiver to decode the traffic segment necessitates a receive power $P_R$ per tone of the traffic segment (which is a function of the choice of code rate and the channel conditions over which the mobile terminal is operating). This is related to the transmit power per tone of the wireless terminal, $P_T$, as follows:

$$P_R = P_T G_{0,0}$$

The interference per tone produced by this wireless terminal at neighboring base station k can then be computed as follows:

$$P_{I,k} = P_T G_{0,k} = P_R \frac{G_{0,k}}{G_{0,0}}$$

Denote $$r_{0,k} = \frac{G_{0,k}}{G_{0,0}}.$$

From this expression, it is clear that the interference generated by wireless terminal $m_0$ at base station $B_k$ is proportional to its transmit power as well as the ratio of the channel gains to base station k and to its own base station. Hence, $r_{0,k}$ is called the interference cost of wireless terminal $m_0$ to base station $B_k$.

Generalizing this concept, the total interference per tone produced by a wireless terminal to all the neighboring base stations is $$P_I^{total} = P_T(G_{0,1} + G_{0,2} + \ldots + G_{0,N}) = P_R \frac{\sum_{k \neq 0}^{N} G_{0,k}}{G_{0,0}} = P_R \sum_{k=1}^{N} r_{0,k}$$

Therefore, $\{r_{0,1}, \ldots, r_{0,N}\}$ are the interference costs of wireless terminal $m_0$ to the entire system.

It is useful to note that the aggregate instantaneous interference produced by the mobile $m_0$ to base station $B_k$ is actually given by $n_{tones} r_{0,k}$ where $n_{tones}$ is the frequency extent of the traffic segment.

Method of determining interference costs in some embodiments will now be described. In one exemplary embodiment, each base station 102, 114 in the exemplary system 100 broadcasts periodic reference signals at high power that the wireless terminals can detect and decode. The reference signals include beacons, pilots, or other common control signals. The reference signals may have a unique pattern that serves to identify the cell and the sector of the base station.

In the exemplary OFDM system 100, a beacon or pilot signal can be used as the reference signals. A beacon signal is a special OFDM symbol in which most of the transmission power is concentrated on a small number of tones. The frequency location of those high-power tones indicates the identifier of the base station. A pilot signal can have a special hopping pattern, which also uniquely specifies the identifier of the base station 102. Thus, a base station sector can be identified in the exemplary system from beacon and/or pilot signals.

In a CDMA system, a pilot signal can be used as the reference signal. In the IS-95 system, for example, a pilot is a known spreading sequence with a particular time offset as the identifier of the base station.

While the exemplary system 100 described above uses beacon or pilot signals to provide a reference signal for path loss estimation, the invention is applicable in a wide variety of systems that may use other techniques to provide reference signals.

The reference signals are transmitted at known powers. Different reference signals may be transmitted at different powers. Different base stations 102, 114 may use different power levels for the same type of reference signals as long as these powers are known to the mobile terminals.

The wireless terminal 106 first receives the reference signals to get the identifier of the base station 102. Then, the wireless terminal 106 measures the received power of the reference signals, and calculates the channel gain from the base station 102 to the wireless terminal 106. Note that at a given location, the wireless terminal may be able to receive the reference signals from multiple base stations 102, 114. On the other hand, the wireless terminal may not be able to receive the reference signals from all the base stations in the entire system. In the exemplary system, wireless terminal $m_0$ monitors $G_{0,0}$ for its connected base station $B_0$, and $G_{0,k}$ for base station $B_k$ if it can receive the corresponding reference signal. Therefore, wireless terminal $m_0$ maintains an array of interference costs $\{r_{0,k}\}$ for the set of base stations whose reference signals it can receive.

Note that the wireless terminal 106 can derive the interference costs by combining the estimation from multiple reference signals. For example, in the exemplary OFDM system 100, the wireless terminal 106 may use both beacons and pilots to arrive at the estimation of $\{r_{0,k}\}$.

The information of interference costs $\{r_{0,k}\}$ is to be used to control the uplink interference and increase overall system capacity. The uplink traffic channels can be used in two modes and the following describes the use of interference costs in both modes.

It should be pointed out that the wireless terminals 106, 108 measured the channel gain information from the downlink reference signals, while the interference are a measure of the costs the interference will have in terms of impact on the uplink. The channel gains of the downlink and the uplink between a wireless terminal 106 and a base station 102 may not be same at all times. To remove the effect of short-term variations, the estimates of the channel gains from the downlink reference signals may, and in some embodiments are, averaged (using a form of lowpass filtering for example) to obtain the estimates of interference costs $\{r_{0,k}\}$.

Use of determined Interference Costs in a Scheduled Mode of operation will now be discussed. In one particular exemplary mode of operation, each of the uplink traffic segments are explicitly assigned by the base station so that one uplink traffic segment is only used by at most one wireless terminal. In the exemplary OFDM system, as the traffic segments are orthogonal with each other, there is normally no intracell interference in an uplink traffic segment in this mode.

To facilitate scheduling at the base station 102, in accordance with the invention, each wireless terminal 106, 108 sends to the base station 162, which the wireless terminal is connected to, a sequence of interference reports. The reports, in some embodiments are indicative of the calculated interference costs $\{r_{0,k}\}$. In an extreme case, a report is a control message that includes the entire array of interference costs $\{r_{0,k}\}$. To reduce the signaling overhead, however, in an embodiment only a quantized version of the array $\{r_{0,k}\}$ is transmitted. There are a number of ways to quantize $\{r_{0,k}\}$, as listed below.

Report $r_{0,total}$, which is the sum of all $\{r_{0,k}\}$.

Report the maximum of $\{r_{0,k}\}$ and the index k associated with the maximum.

Report $\{r_{0,k}\}$ one-by-one, and the associated index k, periodically.

Use a small number of levels to report $r_{0,k}$. For example, two levels to indicate whether $r_{0,k}$ is strong or weak.

After receiving the one or more interference reports, the base station schedules, e.g., assigns, the traffic segments as a function of the interference information. One scheduling policy is to restrict the total interference produced by all scheduled wireless terminals to a pre-determined threshold.

Another scheduling policy is categorize the wireless terminals according to their reported $\{r_{o,k}\}$ to several groups such that the group with large interference costs is preferably assigned traffic segments that include a smaller frequency extent in order to reduce the impact of the instantaneous interference generated.

Consider one embodiment in which each base station 102 is aware of its neighbor set, i.e., the set of base stations 114, etc. that are determined to be neighbors from the perspective of interference. In a basic embodiment, the base station 102 just attempts to control the total interference to the neighboring base stations. The basic embodiment may be coarse in the sense that almost all the interference may be directed to a particular one of the neighboring base stations (cell X), e.g., because all the scheduled wireless terminals may be close to cell X. In this case, cell X experiences severe interference at this time instant. At another time instant, the interference may be concentrated on a different neighboring base station, in which case cell X experiences little interference. Hence, in the above embodiment of total interference control, the interference to a particular neighboring base station may have large variation. In order to avoid destabilizing the intercell interference, the base station 102 may have to leave sufficient margin in the total generated interference to compensate the large variation.

In an enhanced embodiment, the base station 102 broadcasts a message on a common control channel instructing the wireless terminals 106, 108 to determine and report the interference cost with respect to a particular base station $B_k$. Thus, the wireless terminals, $m_j$, j=0, 1, 2, ... will send the reports of $r_{j,k}$. Over time, the base station 102 repeats this process for each member of its neighbor set and determines the set of wireless terminals 106, 108 that interfere with each of the base stations. Once this categorization is complete, the base station 102 can simultaneously allocate uplink traffic segments to a subset of wireless terminals 106, 108 that interfere with different base stations, thereby reducing the variation of the interference directed to any particular base station. Advantageously, because the interference has less variation, the base station 102 may allow greater total interference to be generated without severely impacting the system stability, thus increasing the system capacity. Wireless terminals 106, 108 in the interior of the cell 104 cause negligible interference to neighboring base stations 114 and therefore may be scheduled at any time.

Use of Interference Costs in a Non-scheduled Mode of operation used in some but not necessarily all implementations will now be discussed.

In this non-scheduled mode, each of the uplink traffic segments are not explicitly assigned by the base station 102. As a result, one uplink traffic segment may be used by multiple wireless terminals 106, 108. In a CDMA system, as the uplink traffic segments are not orthogonal with each other, there is generally intracell interference in an uplink traffic segment in this mode.

In this mode, each wireless terminal 106, 108 makes its own scheduling decision of whether it is to use an uplink traffic segment and if so at what data rate and power. To help reduce excessive interference and maintain system stability, in accordance with various embodiments, the base station broadcasts the interference control indicator. Each wireless terminal 106, 108 compares the reference levels with its interference costs and determines its scheduling decision.

In one embodiment, the interference control indicator can be a multi-level variable and each level is to indicate how tightly the base station 102 would like to control the total interference. For example, when the lowest level is broadcasted, then each of the wireless terminals 106, 108 are allowed to use each of the traffic channel segments at each of the rates. When the highest level is broadcasted, then only the wireless terminals 106, 108 whose interference costs are very low can use the traffic channel segments. When a medium level is broadcasted, then the wireless terminals 106, 108 whose interference costs are low can use all the traffic channel segments, preferably the traffic segments that include a larger frequency extent, while the wireless terminals 106, 108 whose interference costs are high can only use the traffic segments that consist of a smaller frequency extent and at lower data rate. The base station 102 can dynamically change the broadcasted interference control level to control the amount of interference the wireless terminals 106, 108 of the cell 104 generate to other base stations.

Figure 5A:
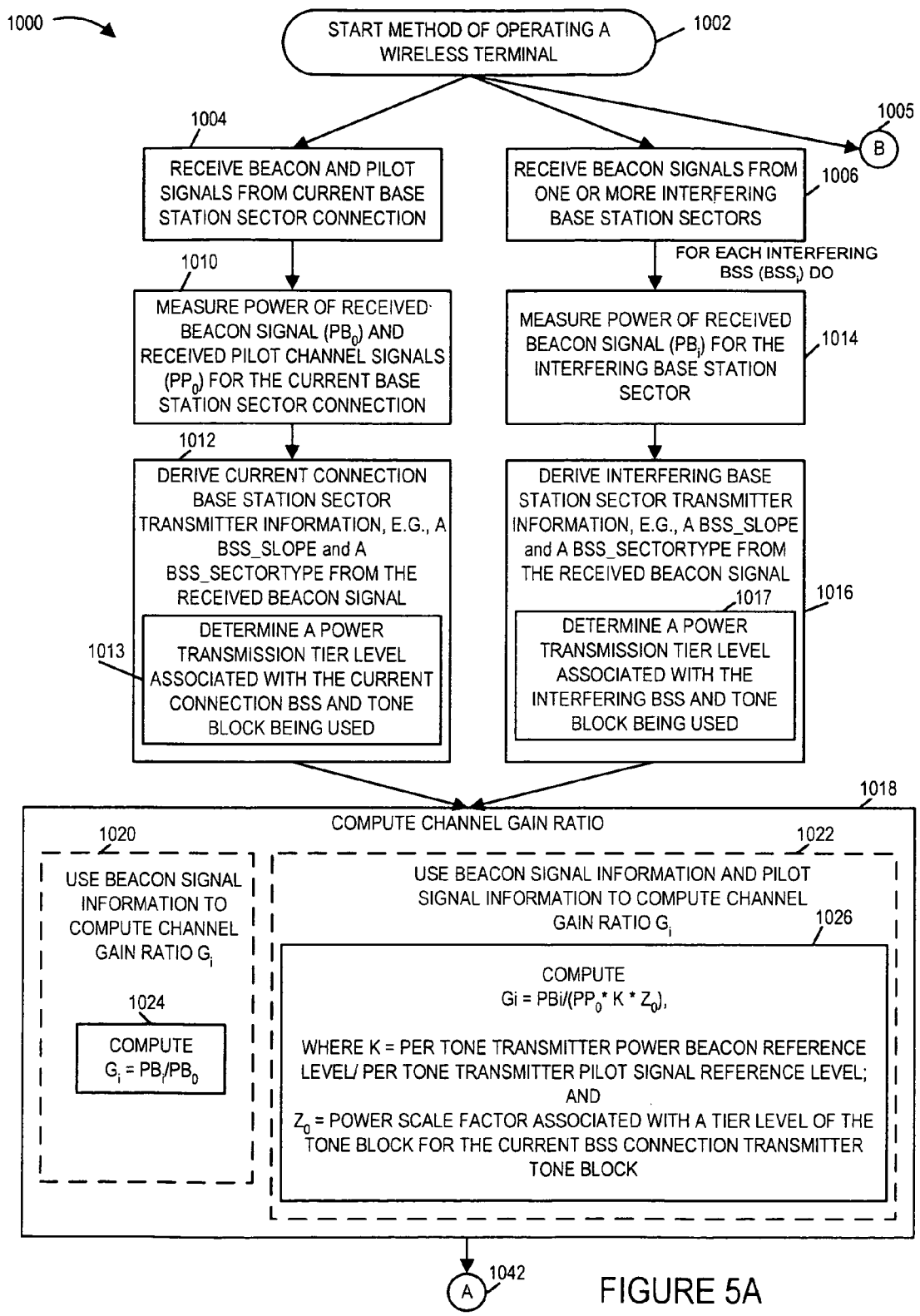
FIG. 5 is a flow chart illustrating a method of measuring signal energy, determining gains and providing interference reports in accordance with various embodiments.
Figure 5B:
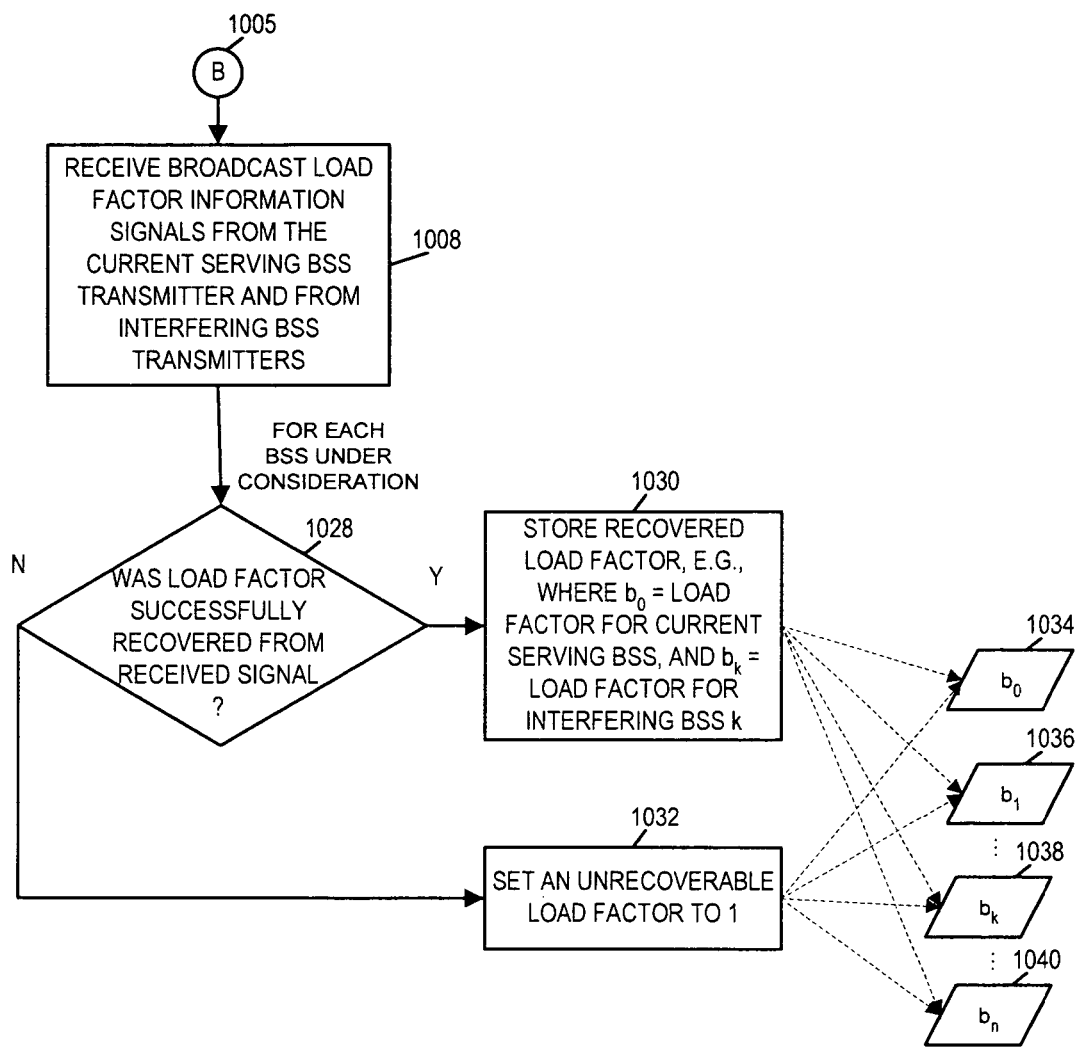
Figure 5C:
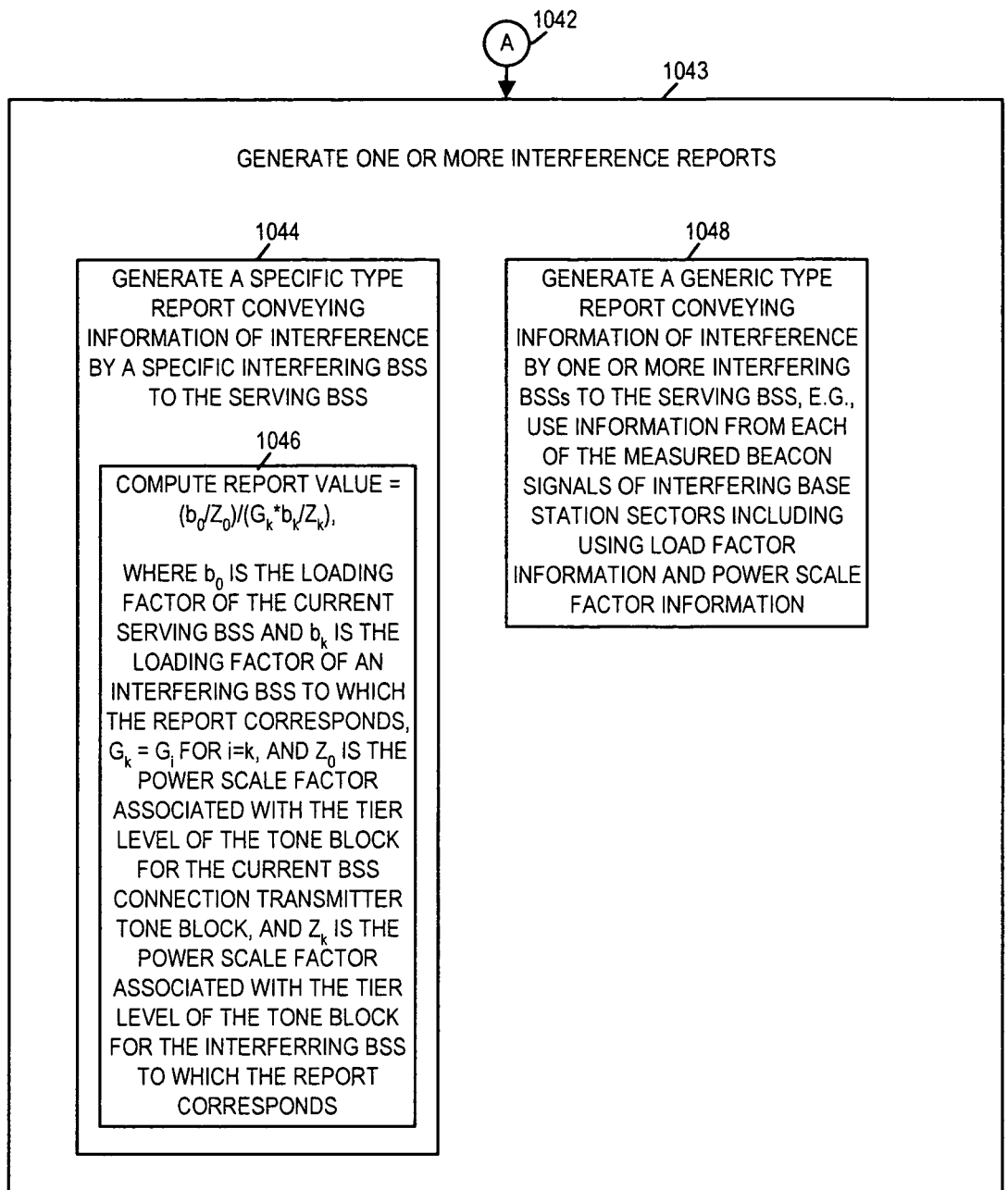

FIG. 5, comprising the combination of FIG. 5A, FIG. 5B, and FIG. 5C is a flowchart 1000 of an exemplary method of operating a wireless terminal, e.g., mobile node, in accordance with various embodiments. Operation starts in step 1002, where the wireless terminal is powered on and initialized. Operation proceeds from step 1002 to step 1004, step 1006 and, via connecting node B 1005 to step 1008.

In step 1004, the wireless terminal is operated to receive beacon and pilot signals from the current base station sector connection. Operation proceeds from step 1004 to step 1010. In step 1010, the wireless terminal measures the power of the received beacon signal ($PB_0$) and received pilot channel signals ($PP_0$) for the current base station sector connection. Operation proceeds from step 1010 to step 1012. In step 1012, the wireless terminal derives current connection base station sector transmitter information, e.g., a BSS_slope and a BSS_sector type from the received beacon signal. Step 1012 includes sub-step 1013. In sub-step 1013, the wireless terminal determines a power transmission tier level associated with the current connection base station sector and tone block being used.

In step 1006, the wireless terminal receives beacon signal from one or more interfering base station sectors 1006. Operation proceeds from step 1006 to step 1014. Subsequent operations 1014, 1016, 1018 are performed for each interfering base station sector, e.g., interfering base station sector $_i$ ($BSS_i$).

In step 1014, the wireless terminal measures the power of received beacon signal ($PB_i$) for the interfering base station sector. Operation proceeds from step 1014 to step 1016. In step 1016, the wireless terminal derives interfering base station sector transmitter information, e.g., a BSS_slope and a BSS_sector type from the received beacon signal. Step 1016 includes sub-step 1017. In sub-step 1017, the wireless terminal determines a power transmission tier level associated with an interfering base station sector and tone block being used.

Operation proceeds from steps 1012 and step 1016 to step 1018. In step 1018 the wireless terminal computes a channel gain ratio using the method of sub-step 1020 or the method of sub-step 1022.

In sub-step 1020, the wireless terminal uses beacon signal information to compute the channel gain ratio, $G_i$. Sub-step 1020 includes sub-step 1024, where the wireless terminal computes $G_i = PB_i/PB_0$.

In sub-step 1022, the wireless terminal uses beacon signal information and pilot signal information to compute the channel gain ratio $G_i$. Sub-step 1022 includes sub-step 1026, where the wireless terminal computes $G_i = PB_i/(PP_0 * K * Z_0)$, where K=per tone transmitter power beacon reference level for a tier 0 tone block/per tone transmitter pilot signal reference level for a tier 0 tone block, and $Z_0$=power scale factor associated with the power transmission tier level of the tone block for the current base station sector connection transmitter tone block.

Operation proceeds from step 1018 via connecting node A 1042 to step 1043, where the wireless terminal generates one or more interference reports.

Returning to step 1008, in step 1008 the wireless terminal is operated to receive broadcast load factor information. Thus, in the exemplary embodiment, the wireless terminal receives the load factor information of the current serving base station sector from the broadcast information sent by the current serving base station sector transmitter. The wireless terminal may receive the load factor information of the interfering serving base station sector from the broadcast information sent by the current or the interfering serving base station sector transmitter. While load factor information is shown as being received from the current serving base station sector, alternatively, load factor information can be received from other nodes and/or pre-stored in the wireless terminal. For each base station sector under consideration, operation proceeds to step 1028. In step 1028 the wireless terminal determines whether or not the load factor was successfully recovered from the received signal. If the load factor was successfully recovered from the received signal operation proceeds to step 1030, where the wireless terminal stores the load factor. For example load factor $b_0$=the load factor for the current serving base station sector, and load factor $b_k$=the load factor for interfering base station section k. If the load factor was not successfully recovered from the received signal, then operation proceeds to step 1032, where the wireless terminal sets the load factor to 1. Load factors ($b_0$ 1032, $b_1$ 1034, ..., $b_k$ 1038, ... bn 1040) are obtained, with each load factor being sourced from one of steps 1030 and step 1032.

Returning to step 1043, in step 1043 the wireless terminal generates one or more interference reports. Step 1043 includes sub-step 1044 and sub-step 1048. In sub-step 1044, the wireless terminal generates a specific type report conveying interference by a specific interfering base station sector to the serving base station sector. Step 1044 includes sub-step 1046. In sub-step 1046, the wireless terminal computes the report value=$(b_0/Z_0)/(G_k^* \ b_k/Z_k)$, where $b_0$ is the loading factor of the current serving BSS and $b_k$ is the loading factor if an interfering BSS to which the report corresponds, $G_k$=$G_i$ for i=k, and $Z_0$ is the power scale factor associated with the power transmission tier level of the tone block for the current BSS connection transmitter tone block, and $Z_k$ is the power scale factor associated with the power transmission tier level of the tone block for the interfering base station sector to which the report corresponds.

In sub-step 1048, the wireless terminal generates a generic type report conveying information of interference by one or more interfering BSSs to the serving BSS, e.g., using information from each of the measured beacon signals of interfering base station sectors including using load factor information and power scale factor information.

In some embodiments, step 1043 includes quantization.

Operation proceeds from step 1043 to step 1050 where the wireless terminal is operated to transmit the report to the current serving base station sector serving as the current attachment point for the wireless terminal. In some embodiments, the transmission of a report is in response to a request from the serving base station sector. In some embodiments, the type of report transmitted, e.g., specific or generic, is in response to received signaling from a base station sector identifying the type of report. In some embodiments, the transmission of a particular specific type report reporting on interference associated with a particular base station sector is in response to a received base station signal identifying the particular base station sector. In various embodiments, interference reports are transmitted periodically in accordance with a reporting schedule being followed by the wireless terminal, e.g., as part of dedicated control channel structure. In some such embodiments, for at least some of the interference reports transmitted, the base station does not signal any report selection information to select the report.

In some embodiments, the system includes a plurality of power transmission tier levels, e.g., three, with a different power scale factor associated with each tier level. For example, in one exemplary embodiment a power scale factor of 0 dB is associated with a tier level 0 tone block, while a power scale factor of 6 dB is associated with a tier 1 level tone block, and a power scale factor of 12 dB is associated with a tier 2 tone block. In some embodiments, each attachment point corresponds to a base station sector transmitter and a tone block, and each attachment point BSS transmitter tone block may be associated with a power transmission tier level. In some embodiments there are a plurality of downlink tones blocks, e.g., three tone block (tone block 0, tone block 1, tone block 2) each having 113 contiguous evenly spaced tones. In some embodiments, the same tone block, e.g., tone block 0, used different base station sector transmitters, has a different power transmission tier level associated with the different base station sector transmitters. A wireless terminal, identifying a particular attachment point, corresponding to a base station sector transmitter and tone block, e.g., from information conveyed via its beacon signal using tone location and/or time position with a recurring transmission pattern, can use stored information to associate the identified attachment point with a particular power transmission tier level and power scale factor for a particular tone block.

In some embodiments, the loading factor, e.g., $b_k$, is a value greater than or equal to 0 and less than or equal to one. In some embodiments, the value is communicated from a base station sector to a wireless terminal represents one of a plurality of levels, e.g., 0 dB, −1 dB, −2 dB, −3 dB, −4 dB, −6 dB, −9 dB, -infinity dB.

In some embodiments, the beacon signals are transmitted at the same power from a base station sector transmitter irrespective of power transmission tier associated with the tone block being used; however, other downlink signals, e.g., pilot signals, are affected by the power transmission tier associated with the tone block for the base station sector transmitter. In some embodiments, the parameter K is at value greater than or equal to 6 dB. For example in one exemplary embodiment the parameter K=23.8 dB −7.2 dB=16.6 dB.

Figure 8:
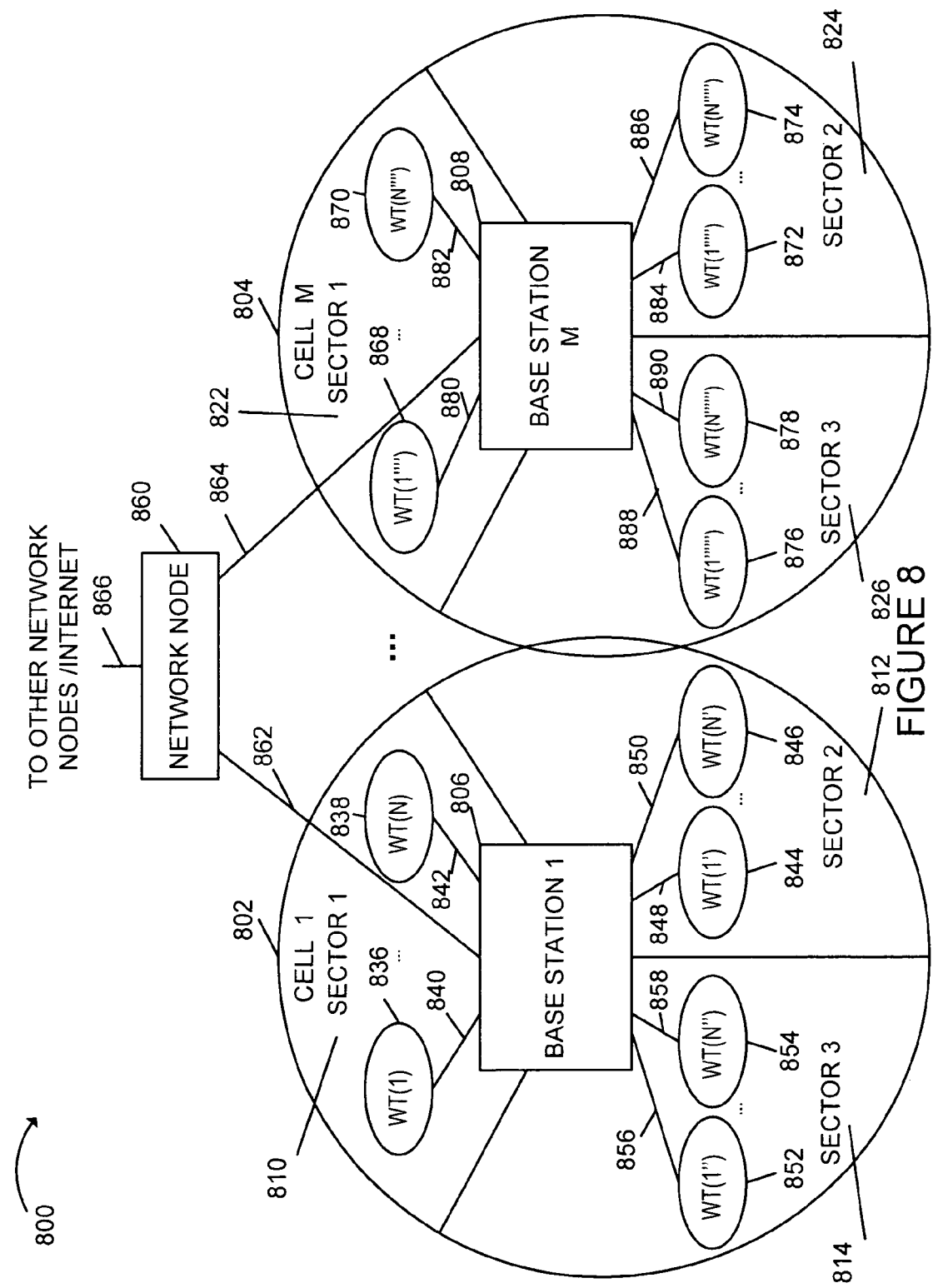
FIG. 8 shows an exemplary communication system implemented in accordance with various embodiments.

FIG. 8 shows an exemplary communication system 800 implemented in accordance with various embodiments. Exemplary communications system 800 includes multiple cells: cell 1 802, cell M 804. Exemplary system 800 is, e.g., an exemplary orthogonal frequency division multiplexing (OFDM) spread spectrum wireless communications system such as a multiple access OFDM system. Each cell 802, 804 of exemplary system 800 includes three sectors. Cells which have not be subdivided into multiple sectors (N=1), cells with two sectors (N=2) and cells with more than 3 sectors (N>3) are also possible in accordance with various embodiments. Each sector supports one or more carriers and/or downlink tones blocks. In some embodiments, each downlink tone block has a corresponding uplink tone block. In some embodiments at least some of the sectors support three downlink tones blocks. Cell 802 includes a first sector, sector 1 810, a second sector, sector 2 812, and a third sector, sector 3 814. Similarly, cell M 804 includes a first sector, sector 1 822, a second sector, sector 2 824, and a third sector, sector 3 826.

Cell 1 802 includes a base station (BS), base station 1 806, and a plurality of wireless terminals (WTs) in each sector 810, 812, 814. Sector 1 810 includes WT(1) 836 and WT(N) 838 coupled to BS 806 via wireless links 840, 842, respectively; sector 2 812 includes WT(1') 844 and WT(N') 846 coupled to BS 806 via wireless links 848, 850, respectively; sector 3 814 includes WT(1") 852 and WT(N") 854 coupled to BS 806 via wireless links 856, 858, respectively. Similarly, cell M 804 includes base station M 808, and a plurality of wireless terminals (WTs) in each sector 822, 824, 826. Sector 1 822 includes WT(1''') 868 and WT(N''') 870 coupled to BS M 808 via wireless links 880, 882, respectively; sector 2 824 includes WT(1'''') 8721 and WT(N'''') 874 coupled to BS M 808 via wireless links 884, 886, respectively; sector 3 826 includes WT(1''''') 876 and WT(N''''') 878 coupled to BS M 808 via wireless links 888, 890, respectively.

System 800 also includes a network node 860 which is coupled to BS1 806 and BS M 808 via network links 862, 864, respectively. Network node 860 is also coupled to other network nodes, e.g., other base stations, AAA server nodes, intermediate nodes, routers, etc. and the Internet via network link 866. Network links 862, 864, 866 may be, e.g., fiber optic cables. Each wireless, e.g. WT 1 836, includes a transmitter as well as a receiver. At least some of the wireless terminals, e.g., WT(1) 836, are mobile nodes which may move through system 800 and may communicate via wireless links with the base station in the cell in which the WT is currently located, e.g., using a base station sector attachment point. The wireless terminals, (WTs), e.g. WT(1) 836, may communicate with peer nodes, e.g., other WTs in system 800 or outside system 800 via a base station, e.g. BS 806, and/or network node 860. WTs, e.g., WT(1) 836 may be mobile communications devices such as cell phones, personal data assistants with wireless modems, laptop computers with wireless modems, data terminals with wireless modems, etc.

An exemplary 4 bit downlink beacon ratio report (DL-BNR4) will now be described. The beacon ratio report provides information which is a function of received measured downlink broadcast signals, e.g., beacon signals and/or pilot signals, from a serving base station sector and from one or more other interfering base station sectors. Qualitatively, the beacon ratio report can be used to estimate the relative proximity of the WT to other base station sectors. The beacon ratio report can be, and in some embodiments is, used at the serving BS sector in controlling the uplink rate of the WT to prevent excessive interference to other sectors. The beacon ratio report, in some embodiments, is based on two factors: (i) estimated channel gain ratios, denoted $G_i$, and (ii) loading factors, denoted $b_i$.

The channel gain ratios are defined, in some embodiments, as follows. In the tone block of the current connection, the WT, in some embodiments, determines an estimate of the ratio of the uplink channel gain from the WT to any interfering Base station sector i (BSS i) to the channel gain from the WT to the serving BSS. This ratio is denoted as $G_i$. Typically, the uplink channel gain ratio is not directly measurable at the WT. However, since the uplink and downlink path gains are typically symmetric, the ratio can be estimated by comparing the relative received power of downlink signals from the serving and interfering BSSs. One possible choice for the reference downlink signal is the downlink beacon signal, which is well-suited for this purpose since it can be detected in very low SNR. In some embodiments, beacon signals have a higher per tone transmission power level than other downlink signals from a base station sector. Additionally, the characteristics of the beacon signal are such that precise timing synchronization is not necessary to detect and measure the beacon signal. For example, the beacon signal is, in some embodiments, a high power narrowband, e.g., single tone, two OFDM symbol transmission time period wide signal. Thus at certain locations, a WT is able to detect and measure a beacon signal from a base station sector, where the detection and/or measurement of other downlink broadcast signals, e.g., pilot signals may not be feasible. Using the beacon signal, the uplink path ratio would be given by $G_i = PB_i/PB_0$, where $PB_i$ and $PB_0$ are, respectively, the measured received beacon power from the interfering and serving base station sectors, respectively.

Since the beacon is typically transmitted rather infrequently, the power measurement of the beacon signal may not provide a very accurate representation of average channel gain, especially in a fading environment where the power changes rapidly. For example, in some embodiments one beacon signal, which occupies 2 successive OFDM symbol transmission time periods in duration and which corresponds to a downlink tone block of a base station sector, is transmitted for every beaconslot of 912 OFDM symbol transmission time periods.

Pilot signals, on the other hand, are often transmitted much more frequently than beacon signals, e.g., in some embodiments pilot signals are transmitted during 896 out of the 912 OFDM symbol transmission time periods of a beaconslot. If the WT can detect the pilot signal from the BS sector, it can estimate the received beacon signal strength from the measured received pilot signal instead of using a beacon signal measurement. For example, if the WT can measure the received pilot power, $PP_i$, of the interfering BS sector, then it can estimate the received beacon power $PB_i$ from estimated $PB_i = KZ_iPP_i$, where K is a nominal ratio of the beacon to pilot power of the interfering sector that is the same for each of the BS sectors, and $Z_i$ is a scaling factor that is sector dependent.

Similarly, if the pilot signal power from the serving BS is measurable at the WT, then the received beacon power $PB_0$ can be estimated from the relation, estimated $PB_0 = KZ_0PP_0$, where $Z_0$ and $PP_0$ are, respectively, the scaling factor and measured received pilot power from the serving base station sector.

Observe that if the received pilot signal strength is measurable corresponding to the serving base station sector, and the received beacon signal strength is measurable corresponding to interfering base station sector, the beacon ratio can be estimated from:

$$G_i = PB_i/(PP_0 K Z_0).$$

Observe that if the pilot strengths are measurable in both the serving and interfering sectors, the beacon ratio can be estimated from:

$$G_i = PP_i K Z_i/(PP_0 K Z_0) = PP_i Z_i/(PP_0 Z_0).$$

The scaling factors K, $Z_i$ and $Z_0$ are either system constants, or can be inferred by the WT, from other information from the BS. In some embodiments, some of the scaling factors (K, $Z_i$, $Z_0$A) are system constants and some of the scaling factors (K, $Z_i$, $Z_0$) are inferred by the WT, from other information form the BS.

In some multicarrier systems with different power levels on different carriers, the scaling factors, $Z_i$ and $Z_0$, are a function of the downlink tone block. For example, an exemplary BSS has three power tier levels, and one of the three power tier levels is associated with each downlink tone block corresponding to a BSS attachment point. In some such embodiments, a different one of the three power tier levels is associated with each of the different tone blocks of the BSS.

Continuing with the example, for the given BSS, each power tier level is associated with a nominal bss power level (e.g., one of bssPowerNominal0, bssPowerNominal1, and bssPowerNominal2) and the pilot channel signal is transmitted at a relative power level with respect to a nominal bss power level for the tone block, e.g., 7.2 dB above the nominal bss power level being used by the tone block; however, the beacon per tone relative transmission power level for the BSS is the same irrespective of the tone block from which the beacon is transmitted, e.g., 23.8 dB above the bss power level used by the power tier 0 block (bssPowerNominal0). Consequently, in this example for a given BSS, the beacon transmit power would be the same in each of the tone blocks, while the pilot transmit power is different, e.g. with the pilot transmit power of different tone blocks corresponding to different power tier levels. One set of scale factors for this example would be, K=23.8−7.2 dB, which is the ratio of the beacon to pilot power for tier 0, and $Z_i$ is set to the relative nominal power of the tier of the interfering sector to the power of a tier 0 sector.

In some embodiments, the parameter $Z_0$ is determined from stored information, e.g., Table 900 of FIG. 9, according to how the tone block of the current connection is used in the serving BSS as determined by the bssSectorType of the serving BSS. For example, if the tone block of the current connection is used as a tier 0 tone block by the serving BSS, the $Z_0$=1; if the tone block of the current connection is used as a tier 1 tone block by the serving BSS, the $Z_0$=bssPowerBackoff01; if the tone block of the current connection is used as a tier 2 tone block by the serving BSS, the $Z_0$=bssPowerBackoff02.

FIG. 9 includes exemplary power scaling factor table 900. First column 902 lists the use of the tone block as either a tier 0 tone block, tier 1 tone block, or tier 2 tone block. Second column 904 lists the scaling factor associated with each tier (0,1,2) tone block, as (1, bssPowerBackoff01, bssPowerBackoff02), respectively. In some embodiments, bssPowerBackoff01 is 6 dBs while bssPowerBackoff02 is 12 dB.

In some embodiments, the DCCH DLBNR4 report can be one of a generic beacon ratio report and a special beacon ratio report. In some such embodiments, a downlink traffic control channel, e.g., a DL.TCCH.FLASH channel, sends a special frame in a beaconslot, the special frame including a "Request for DLBNR4 report field". That field can be used by the serving BSS to control the selection. For example, if the field is set to zero then, the WT reports a generic beacon ratio report; otherwise the WT reports the special beacon ratio report.

A generic beacon ratio report, in accordance with various embodiments, measures the relative interference cost the WT would generate to all the interfering beacons or the "closest" interfering beacon, if the WT were to transmit to the serving BSS in the current connection. A special beacon ratio report, in accordance with some embodiments measures the relative interference cost the WT would generate to a specific BSS, if the WT were to transmit to the serving BSS in the current connection. The specific BSS is the one indicated using information received in the Request for DLBNR4 field of the special downlink frame. For example, in some embodiments, the specific BSS is the one whose bssSlope is equal to the value of the "Request for DLBNR4 report field", e.g., in unsigned integer format, and whose bssSectorType is equal to mod(ulUltraslotBeaconslotIndex,3), where ulUltraslotBeaconslotIndex is the uplink index of the beaconslot within the ultraslot of the current connection. In some exemplary embodiments, there are 18 indexed beaconslots within an ultraslot.

In various embodiments, both the generic and the special beacon ratios are determined from the calculated channel gain ratios G1, G2, . . . , as follows. The WT receives an uplink loading factor sent in a downlink broadcast system subchannel and determines a variable $b_0$ from uplink loading factor table 950 of FIG. 10. Table 950 includes a first column 952 listing eight different values that may be used for the uplink loading factor (0, 1, 2, 3, 4, 5, 6, 7); second column 954 lists the corresponding values for the b value in dB (0, −1, −2, −3, −4, −6, −9−infinity), respectively. For other BSSi, the WT attempts to receive $b_i$ from the uplink loading factor sent in the downlink broadcast system subchannel of the BSS i in the tone block of the current connection. If the WT is unable to receive the UL loading factor $b_i$, the WT sets $b_i$=1.

In some embodiments, in the single carrier operation, the WT calculates the following power ratio as the generic beacon ratio report: $b_0/(G_1b_1+G_2b_2+\ldots)$ when ulUltraslotBeaconslot Index is even or $b_0/\max(G_1b_1, G_2b_2, \ldots)$ when ulUltraslotBeaconslotIndex is odd, where ulUltraslotBeaconslotIndex is the uplink index of the beaconslot within the ultraslot of the current connection and the operation+represents a regular addition. When required to send a specific beacon ratio report, the WT, in some embodiments, calculates $b_0/(G_kB_k)$, where index k represents the specific BSS k. In some embodiments, there are 18 indexed beaconslots within an ultraslot.

Figure 11:
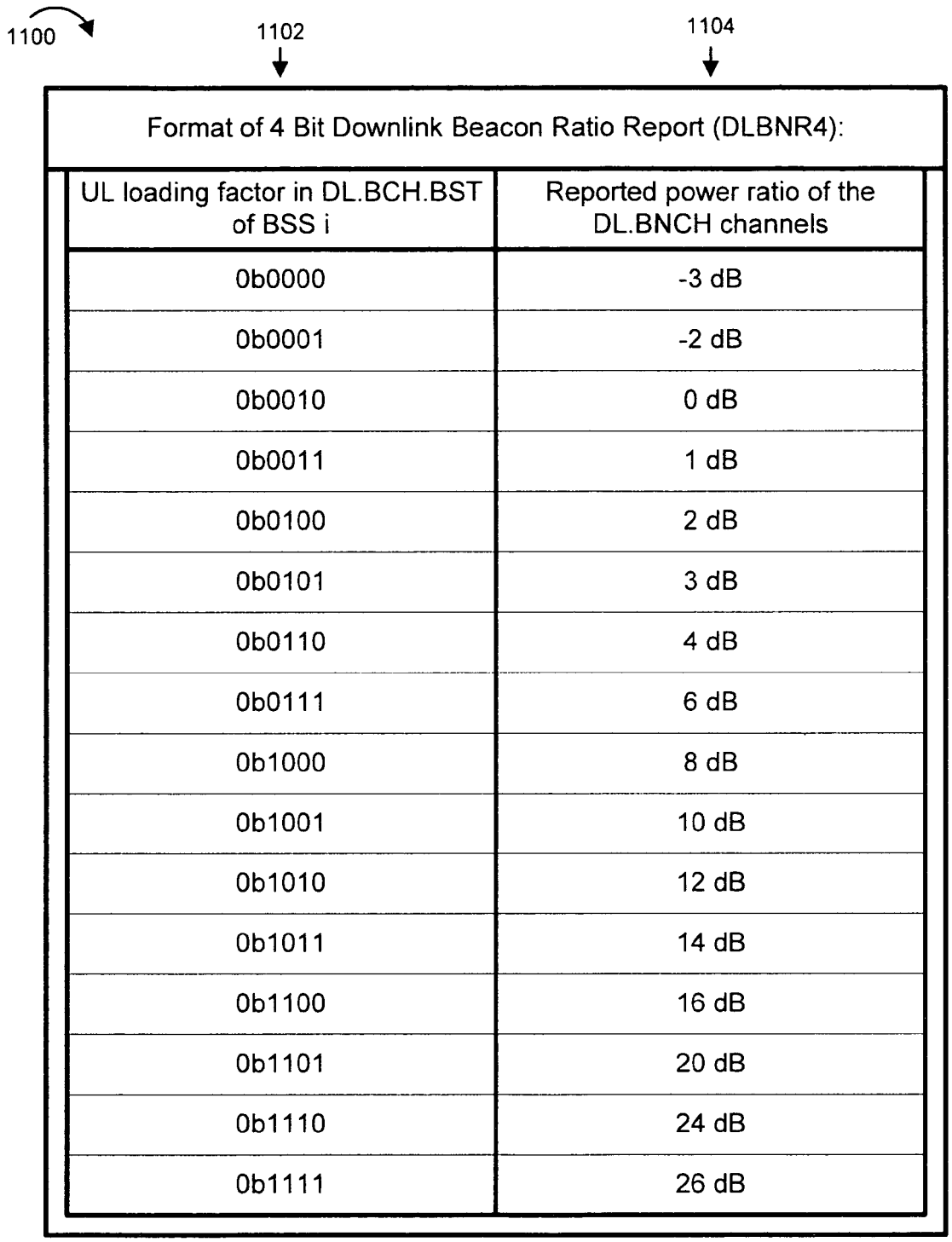
FIG. 11 is a table illustrating an exemplary format for an exemplary interference report, e.g., a beacon ratio report, in accordance with various embodiments.

FIG. 11 is a table 1100 illustrating an exemplary format for a 4 bit downlink beacon ratio report (DLBNR4), in accordance with various embodiments. First column 1102 lists the 16 various bit patterns that the report can convey, while second column 1104 lists the reported power ratio reported corresponding to each bit pattern, e.g., ranging from −3 dB to 26 dBs. The wireless terminal reports the generic and specific beacon ratio reports by selecting and communicating the DLBNR4 table entry that is closed to the determined report value. Although in this exemplary embodiment, the generic and specific beacon ratio reports use the same table for DLBNR4, in some embodiments, different tables may be used.

Figure 12:
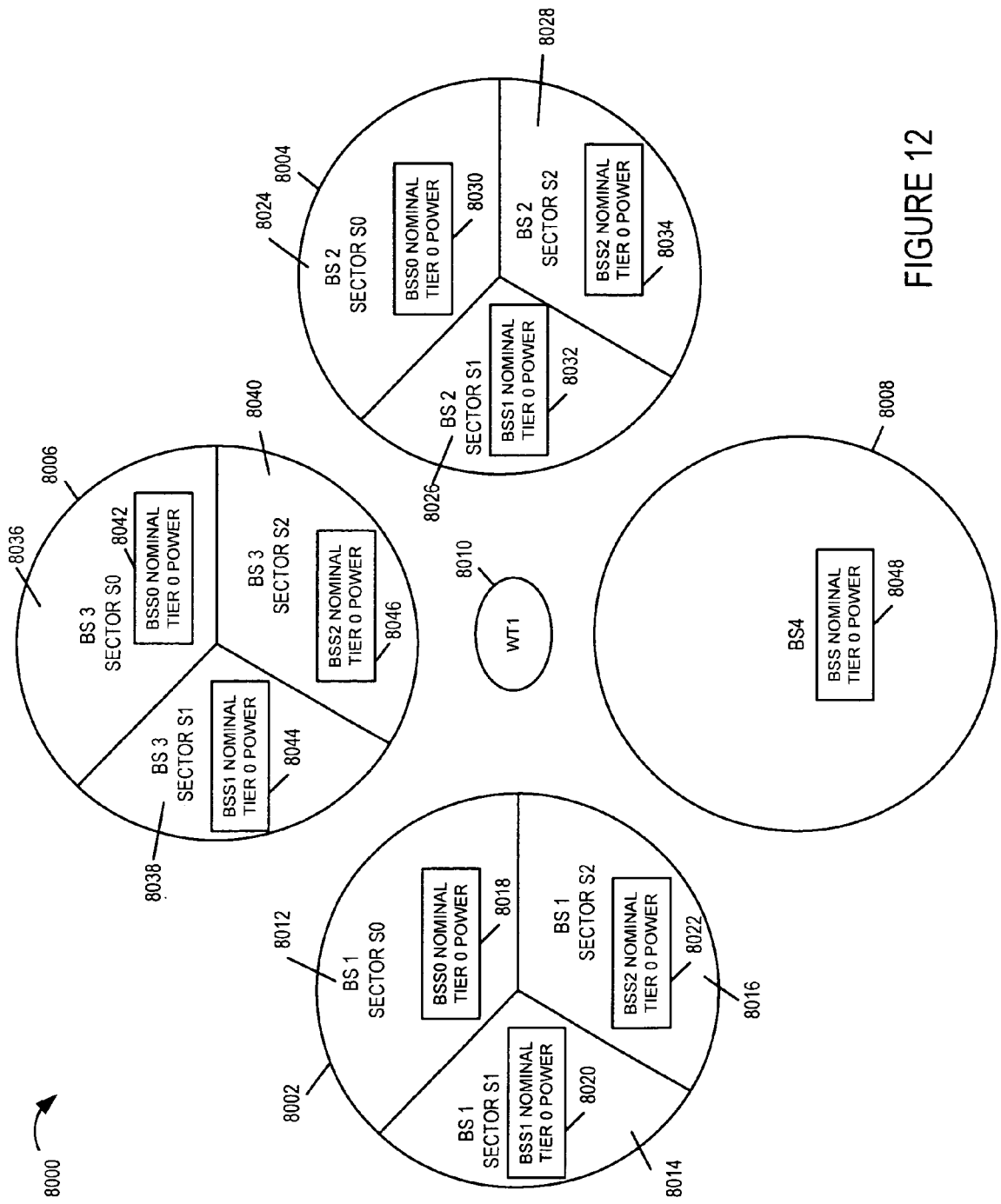
FIG. 12 is a drawing of an exemplary orthogonal frequency division multiplexing (OFDM) wireless communications system, e.g., an OFDM spread spectrum multiple access wireless communications system, implemented in accordance with various embodiments.

FIG. 12 is a drawing of an exemplary orthogonal frequency division multiplexing (OFDM) wireless communications system 8000, e.g., an OFDM spread spectrum multiple access wireless communications system, implemented in accordance with various embodiments. Exemplary wireless communications system 800 includes a plurality of base stations coupled together via a backhaul network and a plurality of wireless terminals, e.g., mobile nodes. Exemplary base stations (base station 1 8002, base station 2 8004, base station 3 8006, base station 4 8008) and exemplary wireless terminal 1 (WT1) 8010 are shown in FIG. 12.

Base station 1 8002 is a three sector base station including a base station sector SO (BSS 0) 8012, a base station sector S1 (BSS 1) 8014, and a base station sector S2 (BSS 2) 8016. Each base station sector (8012, 8014, 8016) has a corresponding nominal tier 0 power level (BSS 0 nominal tier 0 power level 8018, BSS 1 nominal tier 0 power level 8020, BSS 2 nominal tier 0 power level 8022). Base station 2 8004 is a three sector base station including a base station sector S0 (BSS 0) 8024, a base station sector S1 (BSS 1) 8026, and a base station sector S2 (BSS2) 8028. Each base station sector (8024, 8026, 8028) has a corresponding nominal tier 0 power level (BSS 0 nominal tier 0 power level 8030, BSS 1 nominal tier 0 power level 8032, BSS 2 nominal tier 0 power level 8034). Base station 3 8006 is a three sector base station including a base station sector S0 (BSS 0) 8036, a base station sector SI (BSS 1) 8038, and a base station sector S2 (BSS2) 8040. Each base station sector (8036, 8038, 8040) has a corresponding nominal tier 0 power level (BSS 0 nominal tier 0 power level 8042, BSS 1 nominal tier 0 power level 8044, BSS 2 nominal tier 0 power level 8046). Base station 4 8008 is a single sector base station which has a nominal tier 0 power level 8048.

Each nominal tier 0 power level corresponds to a power level associated with one of the downlink tones blocks being used by the corresponding base station sector transmitter. In some embodiments, each downlink tone block is associated with a corresponding uplink tone block. In this exemplary embodiment each base station sector corresponds to one or more physical attachment points, each physical attachment point corresponding to a downlink/uplink tone block pair. For a base station sector transmitter which uses multiple downlink tone blocks, e.g., corresponding to multiple physical attachment points, to communicate downlink user data, the nominal tier 0 power level is associated with the downlink tone block having the highest power level. In addition, the other downlink tone blocks, are referenced in nominal power level with respect to the tier 0 tone block power level, with the nominal power levels of those tone blocks having a lower value. For example, for a given BSS, a tier 1 tone block has a lower power level than a tier 0 tone block, and a tier 2 tone block has a lower power level than a tier 1 tone block.

Figure 13:
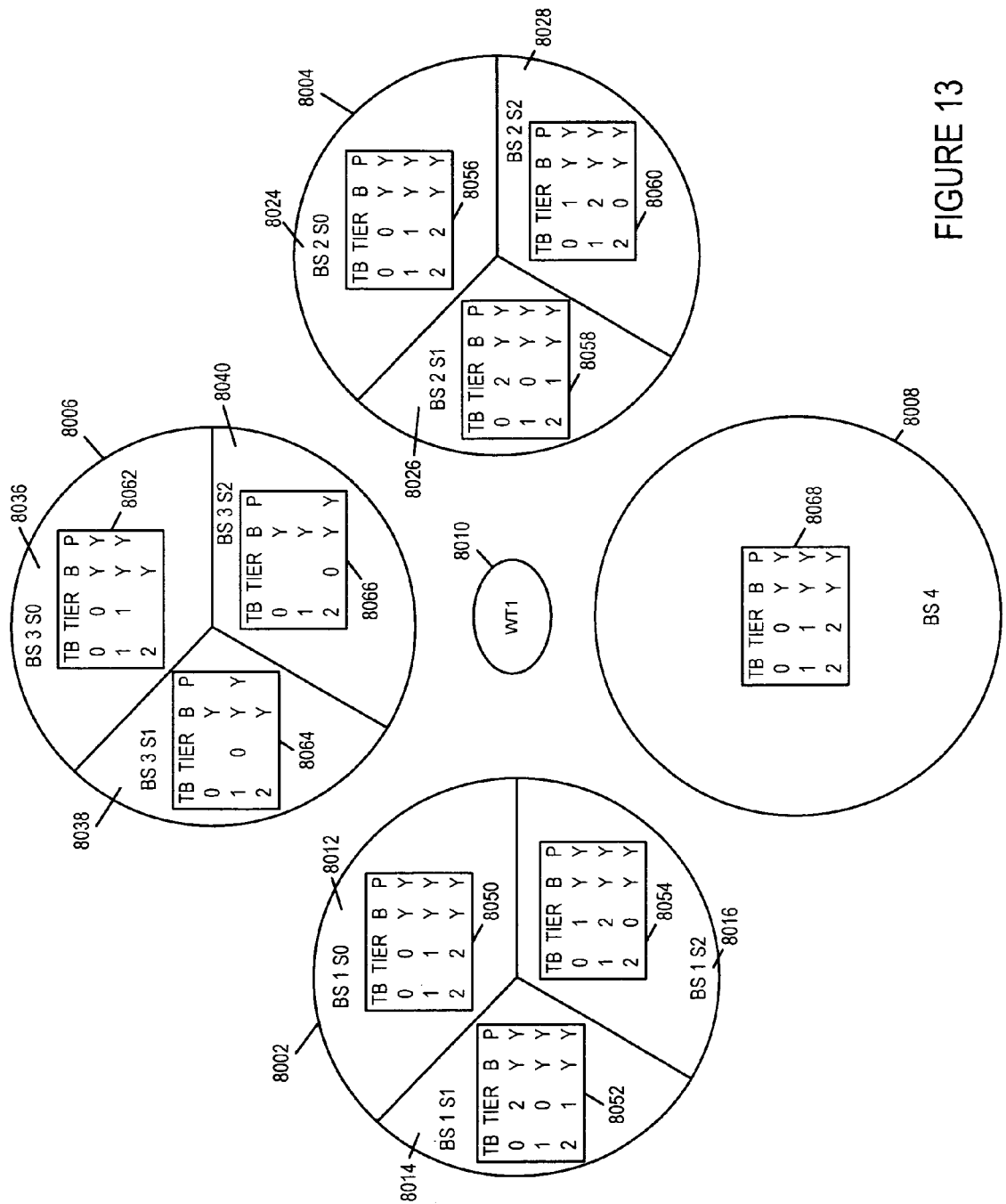
FIG. 13 illustrates the exemplary system of FIG. 12, and provides additional detail corresponding to each of the base station sectors to illustrate various features.

FIG. 13 illustrates the exemplary system 8000 of FIG. 12, and provides additional detail corresponding to each of the base station sectors to illustrate various features. This exemplary embodiment represents a wireless communications system using three non-overlapping downlink tone blocks (tone block 0, tone block 1, and tone block 2). For example, each downlink tone block, in some embodiments, corresponds to 113 OFDM tones, and the combination of the 3 tone blocks corresponds to a 5 MHz system. In this exemplary embodiment, beacon signals are transmitted by a BSS into each tone block and beacons are communicated at a power level with respect to the tier 0 power level; however, pilot signals and user data signals may or may not be transmitted into a given tone block and pilot/user data signals are transmitted by a base station sector at a power level with respect to power tier level of the corresponding tone block. Each base station sector transmits one beacon signal per tone block per beaconslot. In this exemplary embodiment, the sector type determines which tone block is the tier 0 tone block; tier I and tier 2 tone blocks, when used, are also determined by association with a sector type.

Block 8050 indicates that for BSS 0 8012 of base station 1 8002: (i) tone block 0 is associated with tier power level 0 and beacon, pilot and user data signals are communicated in tone block 0, (ii) tone block 1 is associated with tier power level 1 and beacon, pilot and user data signals are communicated in tone block 1, (iii) tone block 2 is associated with tier power level 2 and beacon, pilot and user data signals are communicated in tone block 2. Block 8052 indicates that for BSS 1 8014 of base station 1 8002: (i) tone block 0 is associated with tier power level 2 and beacon, pilot and user data signals are communicated in tone block 0, (ii) tone block 1 is associated with tier power level 0 and beacon, pilot and user data signals are communicated in tone block 1, (iii) tone block 2 is associated with tier power level 1 and beacon, pilot and user data signals are communicated in tone block 2. Block 8054 indicates that for BSS 2 8016 of base station 1 8002: (i) tone block 0 is associated with tier power level 1 and beacon, pilot and user data signals are communicated in tone block 0, (ii) tone block 1 is associated with tier power level 2 and beacon, pilot and user data signals are communicated in tone block 1, (iii) tone block 2 is associated with tier power level 0 and beacon, pilot and user data signals are communicated in tone block 2.

Block 8056 indicates that for BSS 0 8024 of base station 2 8004: (i) tone block 0 is associated with tier power level 0 and beacon, pilot and user data signals are communicated in tone block 0, (ii) tone block I is associated with tier power level 1 and beacon, pilot and user data signals are communicated in tone block 1, (iii) tone block 2 is associated with tier power level 2 and beacon, pilot and user data signals are communicated in tone block 2. Block 8058 indicates that for BSS 1 8026 of base station 2 8004: (i) tone block 0 is associated with tier power level 2 and beacon, pilot and user data signals are communicated in tone block 0, (ii) tone block 1 is associated with tier power level 0 and beacon, pilot and user data signals are communicated in tone block 1, (iii) tone block 2 is associated with tier power level 1 and beacon, pilot and user data signals are communicated in tone block 2. Block 8060 indicates that for BSS 2 8028 of base station 2 8004: (i) tone block 0 is associated with tier power level 1 and beacon, pilot and user data signals are communicated in tone block 0, (ii) tone block 1 is associated with tier power level 2 and beacon, pilot and user data signals are communicated in tone block 1, (iii) tone block 2 is associated with tier power level 0 and beacon, pilot and user data signals are communicated in tone block 2.

Block 8062 indicates that for BSS 0 8036 of base station 3 8006: (i) tone block 0 is associated with tier power level 0 and beacon, pilot and user data signals are communicated in tone block 0, (ii) tone block 1 is associated with tier power level 1 and beacon, pilot and user data signals are communicated in tone block 1, (iii) tone block 2 is used for beacon signaling but not used for pilot and user data signaling. Block 8064 indicates that for BSS 1 8038 of base station 3 8006: (i) tone block 0 is used for beacon signaling but is not used for pilot and user data signaling, (ii) tone block 1 is associated with tier power level 0 and beacon, pilot and user data signals are communicated in tone block 1, (iii) tone block 2 is used for beacon signaling but is not used for pilot and user data signaling. Block 8066 indicates that for BSS 2 8040 of base station 3 8006: (i) tone block 0 is used for beacon signaling but is not used for pilot and user data signaling, (ii) tone block 1 is used for beacon signaling but is not used for pilot and user data signaling, (iii) tone block 2 is associated with tier power level 0 and beacon, pilot and user data signals are communicated in tone block 2.

Block 8068 indicates that for the BSS of base station 4 8008: (i) tone block 0 is associated with tier power level 0 and beacon, pilot and user data signals are communicated in tone block 0, (ii) tone block 1 is associated with tier power level 1 and beacon, pilot and user data signals are communicated in tone block 1, (iii) tone block 2 is associated with tier power level 2 and beacon, pilot and user data signals are communicated in tone block 2.

Figure 14:
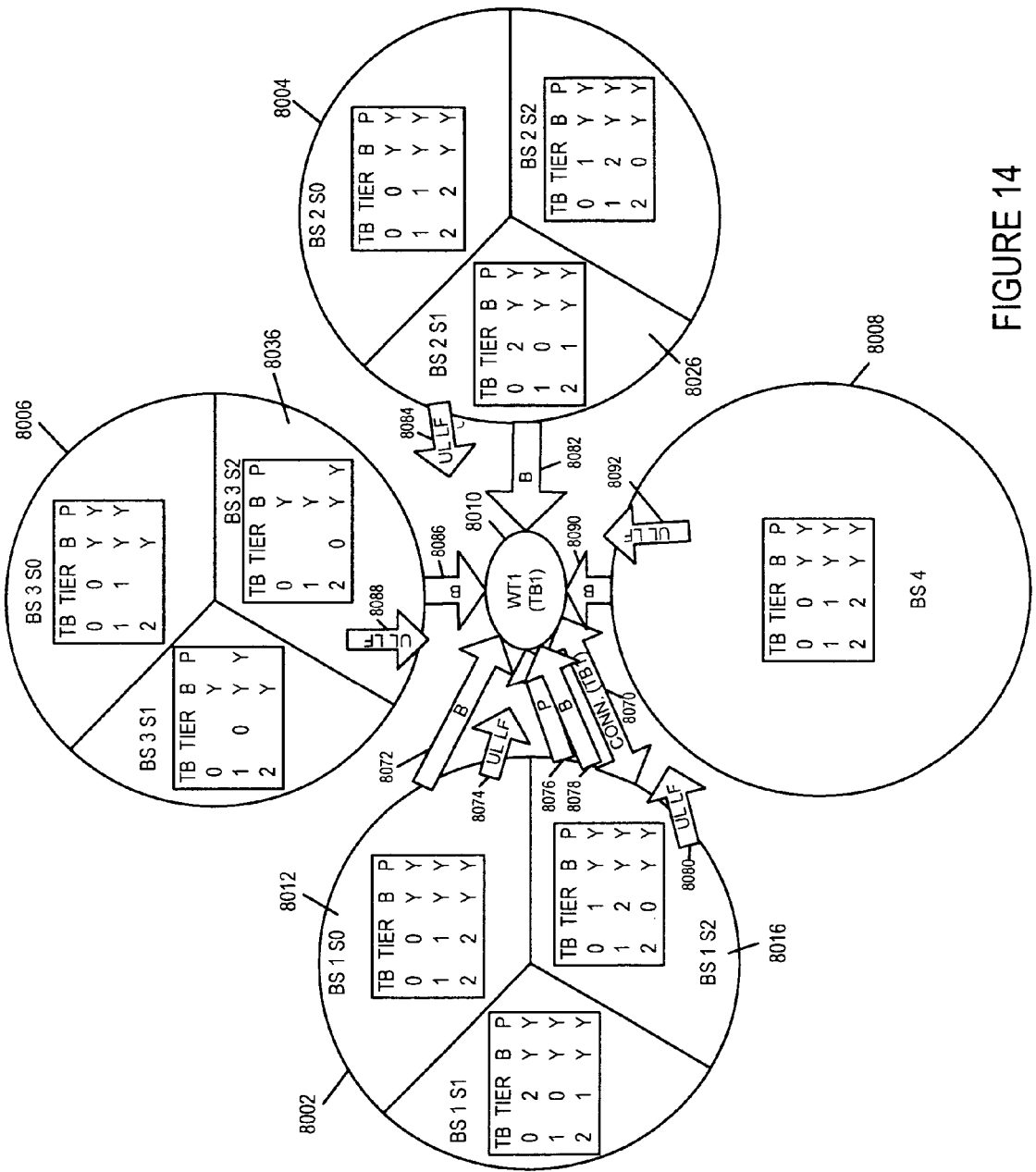
FIG. 14 is a drawing of the exemplary system described in FIGS. 12 and 13, which includes exemplary signaling received and processed by a wireless terminal for the purposes of illustrating exemplary beacon ratio report methods in accordance with various embodiments.

FIG. 14 is a drawing of the exemplary system 8000, described in FIGS. 12 and 13, which includes exemplary signaling received and processed by WT 8010 for the purposes of illustrating exemplary beacon ratio report methods in accordance with various embodiments. In the example of FIG. 14, the wireless terminal 8010 has a wireless connection 8070 with BSS 8016 using tone block 1 physical attachment point. In regard to a beacon ratio report communicated over connection 8070, BSS 8016 is the serving BSS, sometimes denoted as $BSS_0$. In this example from the perspective of WT 8012, BSSs 8012, 8026, 8036, 8008 represent interfering base station sectors, sometimes denoted $BSS_i$s.

From the serving BSS 8016, the wireless terminal receives and processes beacon signals 8078 and pilot tone signal 8076 communicated in tone block 1. Note that WT 1 8010 is timing synchronized with respect to the BSS 8016 tone block 1 attachment point and thus can accurately measure the pilot channel. From each interfering BSS (8012, 8026, 8036, 8008), the wireless terminal 8010 receives and processes beacon signals (8072, 8082, 8086, 8090), respectively, communicated in tone block 1. The beacon signals, e.g., using a single tone transmitted at a relatively high per tone transmit power level in comparison to other downlink broadcast signals such as pilot signals and having a duration of two consecutive OFDM symbol transmission time periods are more easily detectable, e.g., at longer ranges, than pilot signals and do not require precise timing synchronization to be accurately measured. In addition uplink load factor information signals (8080, 8074, 8084, 8088, 8092) are communicated from each of the BSSs (8016, 8012, 8026, 8036, 8008), respectively. These uplink load factor information signals (8080, 8074, 8084, 8088, 8092) are communicated as broadcast signals, but may or may not be successfully recovered, e.g., as their per tone transmission power level is lower than a beacon's. Where an uplink loading factor can not be successfully recovered, a default value, e.g., a value of 1, is used in the beacon ratio report calculation.

Exemplary generic beacon ratio report generation will now be described, the generated generic beacon ratio report being communicated over connection 8070 via a dedicated control channel segment.

The serving BSS, $BSS_0$ is BSS 8016. $PP_0$ is the wireless terminal measured power of received pilot signals 8076. Interfering $BSS_1$ is BSS 8012, and $PB_1$ is the measured power of received beacon signal 8072. Interfering $BSS_2$ is BSS 8026, and $PB_2$ is the measured power of received beacon signal 8082. Interfering $BSS_3$ is BSS 8036, and $PB_3$ is the measured power of received beacon signal 8086. Interfering $BSS_4$ is BSS 8008, and $PB_4$ is the measured power of received beacon signal 8090.1 Uplink loading factors (b0, b1, b2, b3, b4) are recovered, if successfully recovered, from signals (8080, 8074, 8084, 8088, 8092), respectively. The value of each b is greater than or equal to zero and less than or equal to 1. If a given b can not be recovered a default value of 1 is used. Indicator function $I_1=1$ since tone block 1 is used by BSS 8102 for pilot and user data signaling. Indicator function $I_2=1$ since tone block 1 is used by BSS 8026 for pilot and user data signaling. Indicator function $I_3=0$ since tone block 1 is not used by BSS 8036 for pilot and user data signaling. Indicator function $I_4=1$ since tone block 1 is used by BSS 8008 for pilot and user data signaling.

K is the ratio of the per-tone transmission power of the beacon channel to the pilot channel for a tier 0 tone block, which a constant for the system. $Z_0$=bssPowerbackoff02 since tone block 1 of BSS 8016 is a tier 2 tone block. $Z_1$=bssPowerbackoff01 since tone block 1 of BSS 8012 is a tier 1 tone block. $Z_2=1$ since tone block 1 of BSS 8026 is a tier 0 tone block. $Z_3$ is not relevant since $I_3=0$. $Z_4$=bssPowerbackoff01 since tone block 1 of BSS 8008 is a tier I tone block.

In the general case with n interfering base station sectors being considered, a first type of generic beacon ratio report= $(b_0/Z_0)/(G_1b_1/Z_1*I_1+G_2b_2/Z_2*I_2+G_3b_3/Z_3*I_3+G_4b_4/Z_4*I_4+ \ldots G_nb_n/Z_n*I_n)$ and a second type of generic beacon ratio report=$(b_0/Z_0)/(\max(G_1b_1/Z_1*I_1, G_2b_2/Z_2*I_2, G_3b_3/Z_3*I_3, G_4b_4/Z_4*I_4, \ldots, G_nb_n/Z_n*I_n))$ where $G_1=PB_1/PB_0$ or $PB_1/(PP_0*K*Z_0)$.

$G_2=PB_2/PB_0$ or $PB_2/(PP_0*K*Z_0)$.

$G_3=PB_3/PB_0$ or $PB_3/(PP_0*K*Z_0)$.

$G_4=PB_4/PB_0$ or $PB_4/(PP_0*K*Z_0)$.

$G_n=PB_n/PB_0$ or $PB_n/(PP_0*K*Z_0)$.

For the specific case of FIG. 14 with 4 interfering base station sectors being considered, the first type of generic beacon ratio report=$(b_0/Z_0)/(G_1b_1/Z_1*I_1+G_2b_2/Z_2*I_2+G_3b_3/Z_3*I_3+G_4b_4/Z_4*I_4)$ and the second type of generic beacon ratio report= $(b_0/Z_0)/(\max(G_1b_1/Z_1*I_1, G_2b_2/Z_2*I_2, G_3b_3/Z_3*I_3, G_4b_4/Z_4*I_4))$ where $G_1=PB_1/PB_0$ or $PB_1/(PP_0*K*Z_0)$.

$G_2=PB_2/PB_0$ or $PB_2/(PP_0*K*Z_0)$.

$G_3=PB_3/PB_0$ or $PB_3/(PP_0*K*Z_0)$.

$G_4=PB_4/PB_0$ or $PB_4/(PP_0*K*Z_0)$.

In addition since $I_1=1, I_2=1, I_3=0$, and $I_4=1$ the generic beacon ratio report equation is reduced to: first type of generic beacon ratio report=$(b_0/Z_0)/(G_1b_1/Z_1+G_2b_2/Z_2+G_4b_4/Z_4)$ and second type of generic beacon ratio report=$(b_0/Z_0)/(\max(G_1b_1/Z_1, G_2b_2/Z_2, G_4b_4/Z_4))$ where $G_1=PB_1/PB_0$ or $PB_1/(PP_0*K*Z_0)$.

$G_2=PB_2/PB_0$ or $PB_2/(PP_0*K*Z_0)$.

$G_4=PB_4/PB_0$ or $PB_4/(PP_0*K*Z_0)$.

Figure 15:
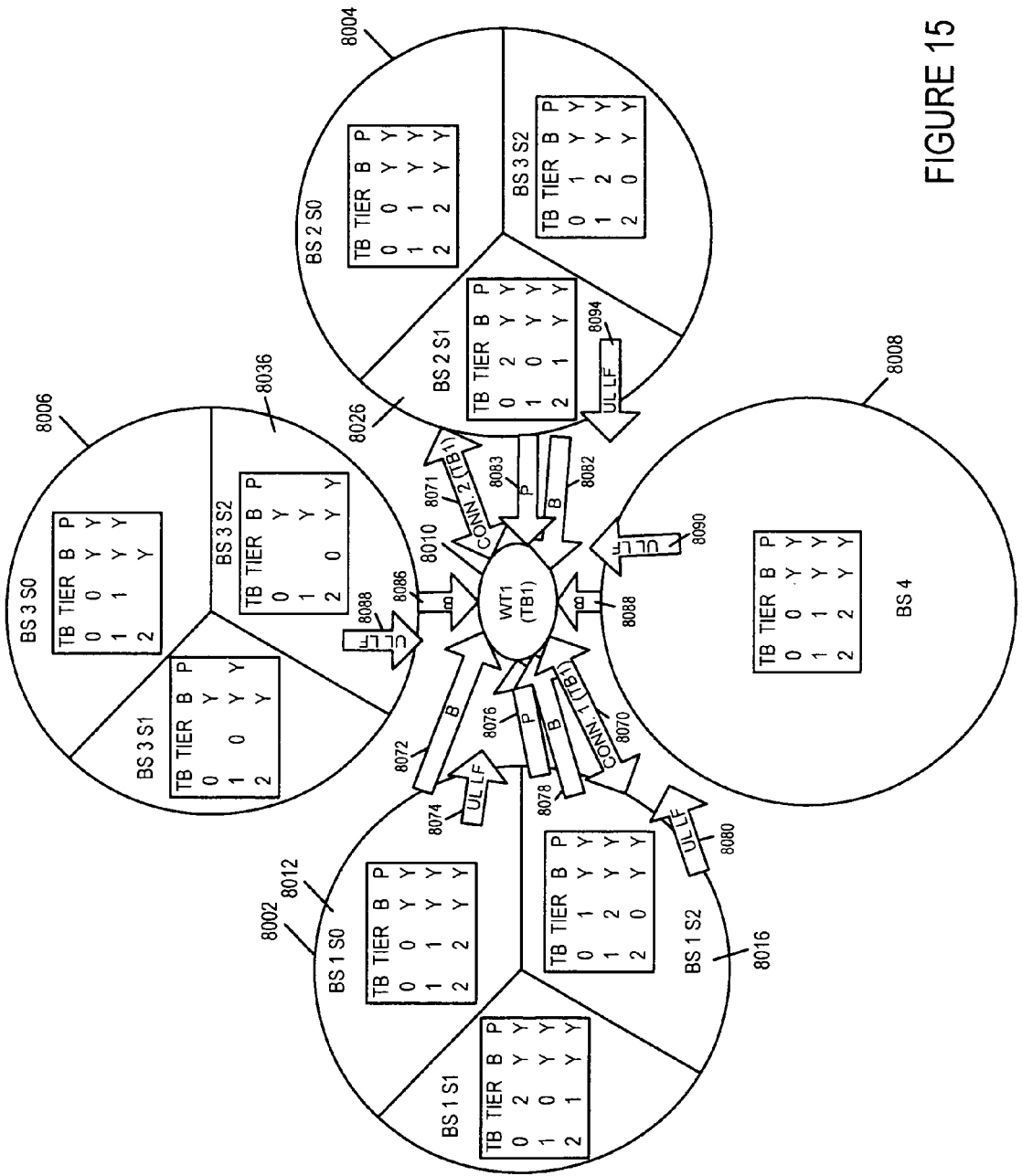
FIG. 15 is a drawing of the exemplary system, described in FIGS. 12 and 13, which includes exemplary signaling received and processed by a wireless terminal for the purposes of illustrating exemplary beacon ratio report methods in accordance with various embodiments.

FIG. 15 is a drawing of the exemplary system 8000, described in FIGS. 12 and 13, which includes exemplary signaling received and processed by WT 8010 for the purposes of illustrating exemplary beacon ratio report methods in accordance with various embodiments. In the example of FIG. 15, the wireless terminal 8010 has two concurrent wireless connections, a first wireless connection 8070 with BSS 8016 using tone block 1 physical attachment point and the second physical connection is with BSS 8026 using tone block 1 physical attachment point. In regard to a beacon ratio report communicated over connection 8070, BSS 8016 is the serving BSS, sometimes denoted as $BSS_0$, and BSSs 8012, 8026, 8036, 8008 represent interfering base station sectors, sometimes denoted $BSS_i$s. In regard to a beacon ratio report communicated over connection 8071, BSS 8026 is the serving BSS, sometimes denoted as $BSS_0$, and BSSs 8012, 8016, 8036, 8008 represent interfering base station sectors, sometimes denoted $BSS_i$s.

The same signals previously described with respect to FIG. 14 can used by WT 8010 in generating a beacon ratio report for connection 8070. In addition, pilot signals 8083 in tone block I from BSS 8026 can be used by WT 8010 in generating a beacon ratio report for connection 8070.

In the general case with n interfering base station sectors being considered, a first type of generic beacon ratio report= $(b_0/Z_0)/(G_1b_1/Z_1*I_1+G_2b_2/Z_2*I_2+G_3b_3/Z_3*I_3+G_4b_4/Z_4*I_4+ \ldots G_nb_n/Z_n*I_n)$ and a second type of generic beacon ratio report=$(b_0/Z_0)/(\max(G_1b_1/Z_1*I_1, G_2b_2/Z_2*I_2, G_3b_3/Z_3*I_3, G_4b_4/Z_4*I_4, \ldots, G_nb_n/Z_n*I_n))$ where $G_1=PB_1/PB_0$ or $PB_1/(PP_0*K*Z_0)$ or $(PP_1*Z_1)/(PP_0*Z_0)$.

$G_2=PB_2/PB_0$ or $PB_2/(PP_0*K*Z_0)$ or $(PP_2*Z_2)/(PP_0*Z_0)$.

$G_3=PB_3/PB_0$ or $PB_3/(PP_0*K*Z_0)$ or $(PP_3*Z_3)/(PP_0*Z_0)$.

$G_4=PB_4/PB_0$ or $PB_4/(PP_0*K*Z_0)$ or $(PP_4*Z_4)/(PP_0*Z_0)$.

.

.

.

$G_n=PB_n/PB_0$ or $PB_n/(PP_0*K*Z_0)$ or $(PP_n*Z_n)/(PP_0*Z_0)$.

For the specific case of FIG. 15 with 4 interfering base station sectors being considered with respect to connection 1 8070, the first type of generic beacon ratio report=$(b_0/Z_0)/(G_1b_1/Z_1*I_1+G_2b_2/Z_2*I_2+G_3b_3/Z_3*I_3+G_4b_4/Z_4*I_4)$ and the second type of generic beacon ratio report=$(b_0/Z_0)/(\max(G_1b_1/Z_1*I_1, G_2b_2/Z_2*I_2, G_3b_3/Z_3*I_3, G_4b_4/Z_4*I_4))$ where where BSS 8016 is $BSS_0$, BSS 8012 is $BSS_1$, BSS 8026 is $BSS_2$, BSS 8036 is $BSS_3$ and BSS 8008 is $BSS_4$, and taking into account the availability of pilot signal information, $G_1=PB_1/PB_0$ or $PB_1/(PP_0*K*Z_0)$.

$G_2=PB_2/PB_0$ or $PB_2/(PP_0*K*Z_0)$ or $(PP_2*Z_2)/(PP_0*Z_0)$.

$G_3=PB_3/PB_0$ or $PB_3/(PP_0*K*Z_0)$.

$G_4=PB_4/PB_0$ or $PB_4/(PP_0*K*Z_0)$.

In addition since $I_1=1, I_2=1, I_3=0$, and $I_4=1$ the generic beacon ratio report equation is reduced to: first type of generic beacon ratio report=$(b_0/Z_0)/(G_1b_1/Z_1+G_2b_2/Z_2+G_4b_4/Z_4)$ and second type of generic beacon ratio report=$(b_0/Z_0)/(\max(G_1b_1/Z_1, G_2b_2/Z_2, G_4b_4/Z_4))$ where $G_1=PB_1/PB_0$ or $PB_1/(PP_0*K*Z_0)$.

$G_2=PB_2/PB_0$ or $PB_2/(PP_0*K*Z_0)$ or $(PP_2*Z_2)/(PP_0*Z_0)$ $G_4=PB_4/PB_0$ or $PB_4/(PP_0*K*Z_0)$.

For the specific case of FIG. 15 with 4 interfering base station sectors being considered with respect to connection 2 8071, the first type of generic beacon ratio report=$(b_0/Z_0)/(G_1b_1/Z_1*I_1+G_2b_2/Z_2*I_2+G_3b_3/Z_3*I_3+G_4b_4/Z_4*I_4))$ and the second type of generic beacon ratio report =$(b_0/Z_0)/(\max(G_1b_1/Z_1*I_1, G_2b_2/Z_2*I_2, G_3b_3/Z_3*I_3, G_4b_4/Z_4*I_4))$ where where BSS 8026 is $BSS_0$, BSS 8016 is $BSS_1$, BSS 8012 is $BSS_2$, BSS 8036 is $BSS_3$ and BSS 8008 is $BSS_4$, and taking into account the availability of pilot signal information, $G_1=PB_1/PB_0$ or $PB_1/(PP_0*K*Z_0)$ or $(PP_1*Z_1)/(PP_0*Z_0)$.

$G_2=PB_2/PB_0$ or $PB_2/(PP_0*K*Z_0)$.

$G_3=PB_3/PB_0$ or $PB_3/(PP_0*K*Z_0)$.

$G_4=PB_4/PB_0$ or $PB_4/(PP_0*K*Z_0)$.

In addition since $I_1=1, I_2=1, I_3=0$, and $I_4=1$ the generic beacon ratio report equation is reduced to: first type of generic beacon ratio report=$(b_0/Z_0)/(G_1b_1/Z_1+G_2b_2/Z_2+G_4b_4/Z_4)$ and second type of generic beacon ratio report=$(b_0/Z_0)/(\max(G_1b_1/Z_1, G_2b_2/Z_2, G_4b_4/Z_4))$ where $G_1=PB_1/PB_0$ or $PB_1/(PP_0*K*Z_0)$ or $(PP_1*Z_1)/(PP_0*Z_0)$.

$G_2=PB_2/PB_0$ or $PB_2/(PP_0*K*Z_0)$ $G_4=PB_4/PB_0$ or $PB_4/(PP_0*K*Z_0)$.

In some embodiments, a wireless terminal attempts to obtain a channel gain ratio, e.g. a $G_i$, using pilot signals if reliable pilot signal information can be recovered from the two sources. If that is not possible, the wireless terminal attempts to obtain a channel gain ratio using pilot signals from the serving base station sector and beacon signals from the other base station sector.

Figure 16:
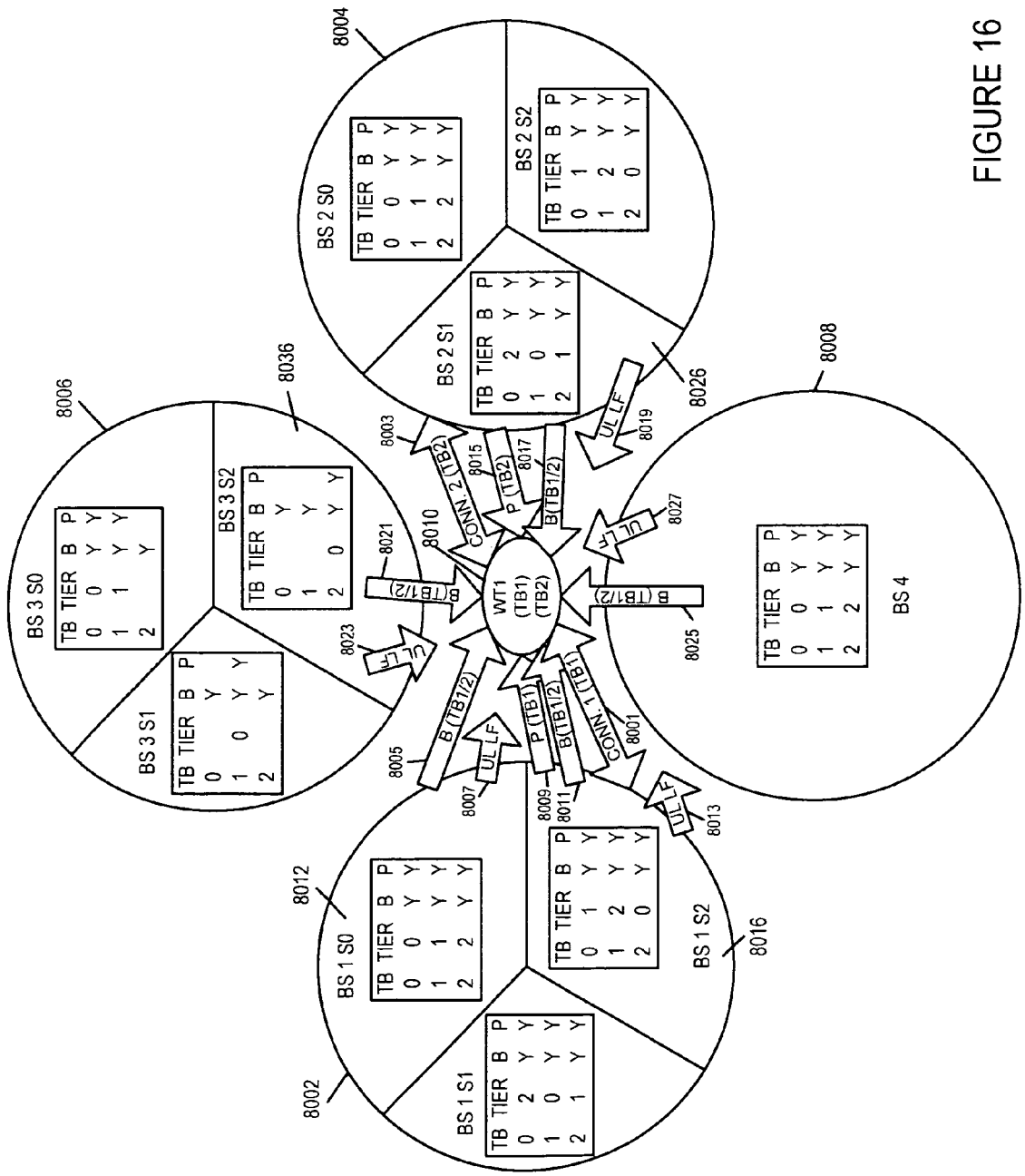
FIG. 16 is a drawing of the exemplary system, described in FIGS. 12 and 13, which includes exemplary signaling received and processed by a wireless terminal for the purposes of illustrating exemplary beacon ratio report methods in accordance with various embodiments.

FIG. 16 is a drawing of the exemplary system 8000, described in FIGS. 12 and 13, which includes exemplary signaling received and processed by WT 8010 for the purposes of illustrating exemplary beacon ratio report methods in accordance with various embodiments. In the example of FIG. 16, the wireless terminal 8010 has a first wireless connection 8001 with BSS 8016 using tone block 1 physical attachment point and a second concurrent wireless connection 8003 with BSS 8026 using tone block 2 physical attachment point. In regard to a beacon ratio report communicated over connection 8001, BSS 8016 is the serving BSS, sometimes denoted as $BSS_0$ and BSSs 8012, 8026, 8036, 8008 represent interfering base station sectors sometimes referred denoted as $BSS_i$s, e.g., $BSS_1, BSS_2, BSS_3, BSS_4$. In regard to a beacon ratio report communicated over connection 8003, BSS 8026 is the serving BSS, sometimes denoted as $BSS_0$, and BSSs 8012, 8016, 8036, 8008 represent interfering base station sectors, sometimes denoted $BSS_i$s, e.g., $BSS_1, BSS_2, BSS_3, BSS_4$.

From BSS 8016, the wireless terminal receives and processes beacon signals 8011 communicated in both tone block 1 and tone block 2 and pilot tone signal 8009 communicated in tone block 1. Note that WT 1 8012 is timing synchronized with respect to the BSS 8016 tone block 1 attachment point and thus can accurately measure the pilot channel. From BSS 8026, the wireless terminal receives and processes beacon signals 8017 communicated in both tone block I and tone block 2 and pilot tone signal 8015l communicated in tone block 2. Note that WT 1 8010 is timing synchronized with respect to the BSS 8026 tone block 2 attachment point and thus can accurately measure the pilot channel. From each interfering BSS (8012, 8036, 8008), the wireless terminal 8010 receives and processes beacon signals (8005, 8021, 8025), respectively, communicated in tone block 1 and tone block 2. In addition uplink load factor information signals (8013, 8007, 8019, 8023, 8027) are communicated from each of the BSSs (8016, 8012, 8026, 8036, 8008), respectively. These uplink load factor information signals (8013, 8007, 8019, 8023, 8027) are communicated as broadcast signal, but may or may not be successfully recovered, e.g., as their per tone transmission power level is lower than a beacon's. Where an uplink loading factor can not be successfully recovered, a default value, e.g., a value of 1, is used in the beacon ratio report calculation.

In the example of FIG. 16, the two connections use different tone blocks. Gain ratios computed for beacon ratio reports to be communicated over connection 1 8001 can use received pilot tone signals 8009 of tone block 1 from base station sector 8016 and received beacon signals from the other base station sectors. Gain ratios computed for beacon ratio reports to be communicated over connection 2 8003 can use received pilot tone signals 8015 of tone block 2 from base station sector 8026 and received beacon signals from the other base station sectors.

In some exemplary embodiments, with respect to a base station sector, the OFDM signals from one tone block are accurately synchronized with respect to the OFDM symbols from another tone block. Consider that the BSS uses a common transmitter and generates a single OFDM symbol corresponding to the three tone blocks, e.g. a single OFDM symbol including 339 tones comprising three tone blocks of 113 tones each. In some such embodiments, gain ratios computed for beacon ratio reports to be communicated over connection 1 8001 can use received pilot tone signals of tone block 1 from base station sector 8016, received pilot tone signal of tone block 1 from BSS 8026 and received beacon signals from the other base station sectors; gain ratios computed for beacon ratio reports to be communicated over connection 2 8003 can use received pilot tone signals of tone block 2 from base station sector 8026, received pilot tone signal of tone block 2 from BSS 8016 and received beacon signals from the other base station sectors.

Figure 17A:
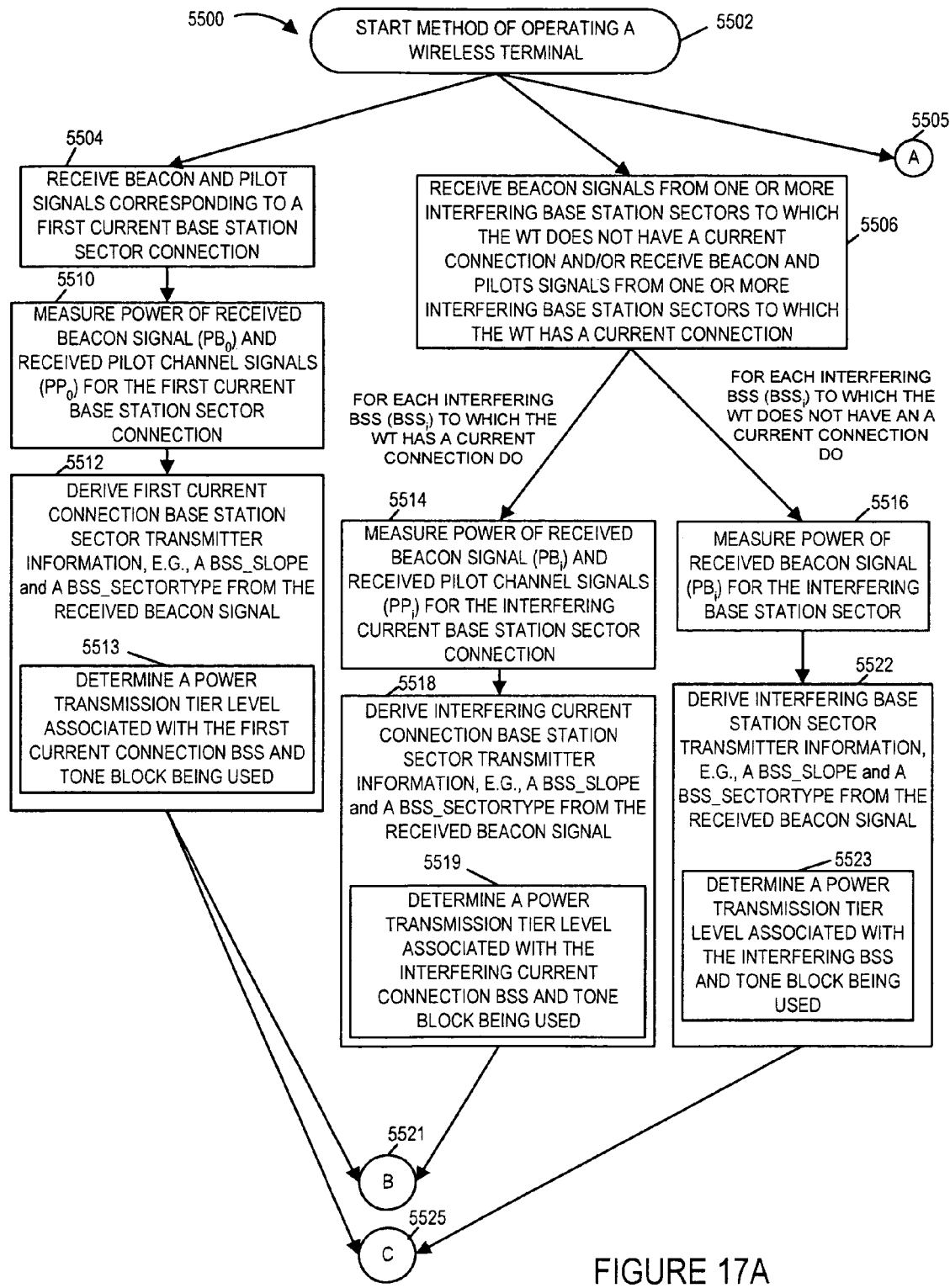
FIG. 17, comprising the combination of FIG. 17A, FIG. 17B, FIG. 17C.
FIG. 17D is a flowchart of an exemplary method of operating a wireless terminal, e.g., mobile node, in accordance with various embodiments.
Figure 17B:
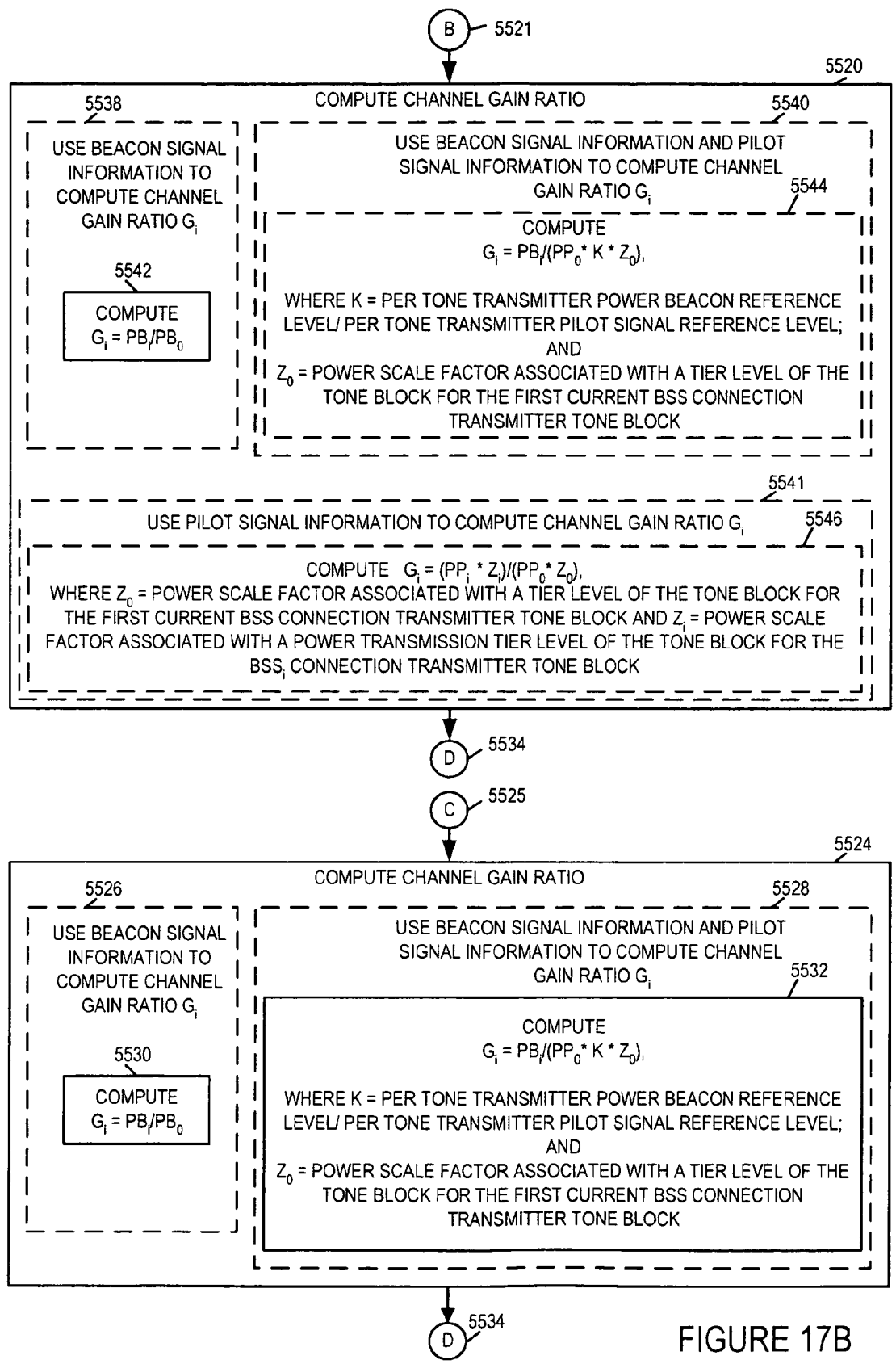
Figure 17C:
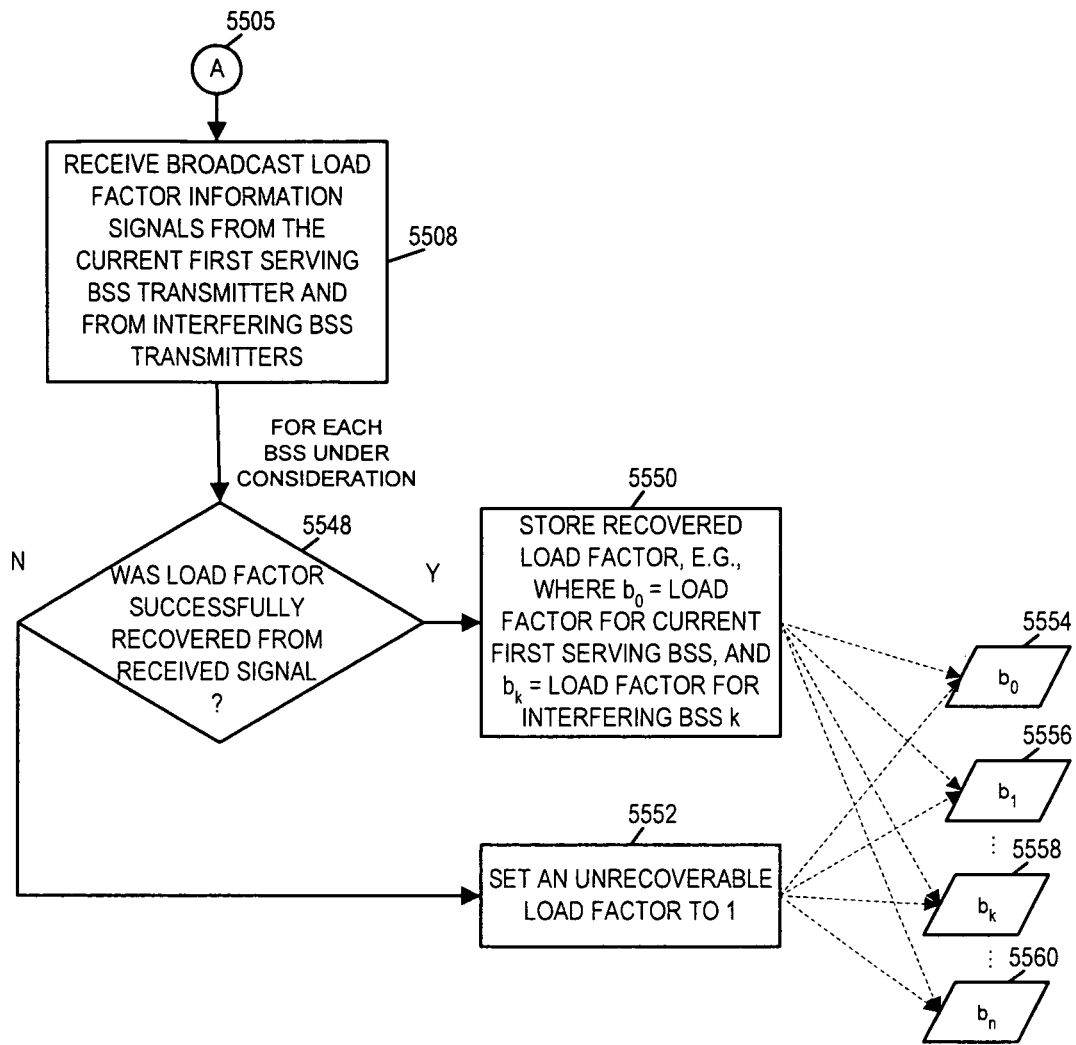
Figure 17:
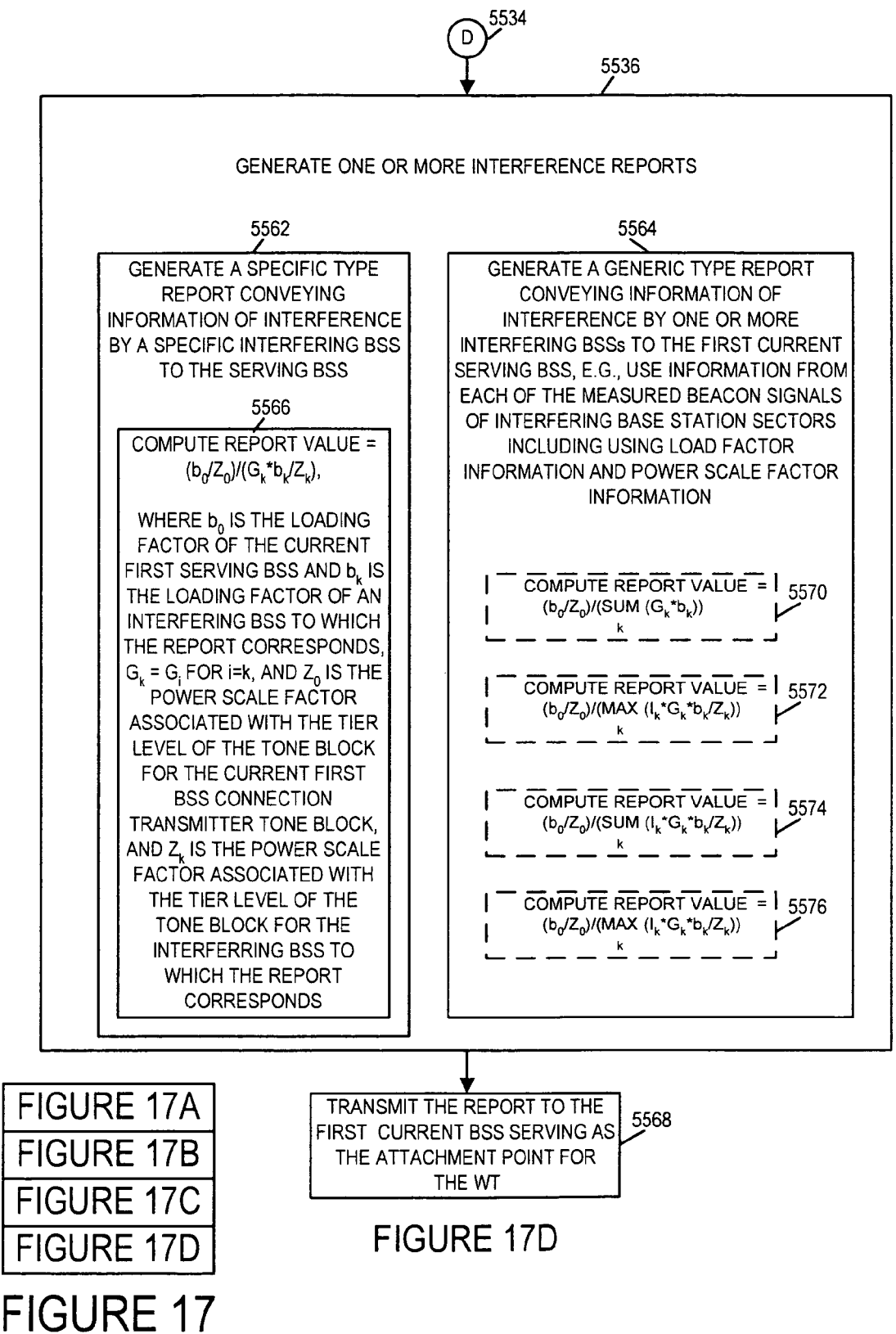

FIG. 17, comprising the combination of FIG. 17A, FIG. 17B, FIG. 17C, and FIG. 17D is a flowchart 5500 of an exemplary method of operating a wireless terminal, e.g., mobile node, in accordance with various embodiments. Operation starts in step 5502, where the wireless terminal is powered on and initialized. Operation proceeds from step 5502 to step 5504, step 5506 and, via connecting node A 5505 to step 5508.

In step 5504, the wireless terminal is operated to receive beacon and pilot signals corresponding to a first current base station connection. Operation proceeds from step 5504 to step 5510. In step 5510, the wireless terminal measures the power of the received beacon signal ($PB_0$) and received pilot channel signals ($PP_0$) for the first current base station sector connection. Operation proceeds from step 5510 to step 5512. In step 5512, the wireless terminal derives first current connection base station sector transmitter information, e.g., a BSS_slope and a BSS_sector type from the received beacon signal. Step 5512 includes sub-step 5513. In sub-step 5513, the wireless terminal determines a power transmission tier level associated with the first current connection base station sector and tone block being used.

In step 5506, the wireless terminal receives beacon signals from one or more interfering base station sectors to which the wireless terminal does not have a current connection and/or receives beacon and pilot signals from one or more interfering base station sectors to which the wireless terminal has a current connection. Operation proceeds from step 5506 to step 5514 for each interfering base station sector ($BSS_i$) to which the wireless terminal has a current connection. Subsequent operations 5514, 5518, 5520 are performed for each such interfering base station sector, e.g., interfering base station sector $_i$ ($BSS_i$). Operation proceeds from step 5506 to step 5516 for each interfering base station sector ($BSS_i$) to which the wireless terminal does not have a current connection. Subsequent operations 5516, 5522, 5524 are performed for each such interfering base station sector, e.g., interfering base station sector $_i$ ($BSS_i$).

In step 5514, the wireless terminal measures the power of the received beacon signal ($PB_i$) and received pilot channel signals ($PP_i$) for the interfering current base station sector connection. Operation proceeds from step 5514 to step 5518. In step 5518, the wireless terminal derives interfering current connection base station sector transmitter information, e.g., a BSS_slope and a BSS_sector type from the received beacon signal. Step 5518 includes sub-step 5519. In sub-step 5519, the wireless terminal determines a power transmission tier level associated with the interfering current connection base station sector and tone block being used.

Operation proceeds from steps 5512 and step 5518 to step 5520 via connecting node B 5521. In step 5520 the wireless terminal computes a channel gain ratio using the method of sub-step 5538 or the method of sub-step 5540 or the method of sub-step 5541. In sub-step 5538, the wireless terminal uses beacon signal information to compute the channel gain ratio, $G_i$. Sub-step 5538 includes sub-step 5542, where the wireless terminal computes $G_i = PB_i/PB_0$.

In sub-step 5540, the wireless terminal uses beacon signal information and pilot signal information to compute the channel gain ratio $G_i$. Sub-step 5540 includes sub-step 5544. In sub-step 5544, the wireless terminal computes $G_i = PB_i/(PP_0 * K * Z_0)$, where K=per tone transmitter power beacon reference level for a tier 0 tone block/per tone transmitter pilot signal reference level for a tier 0 tone block, and $Z_0$=power scale factor associated with the a power transmission tier level of the tone block for the first current base station sector connection transmitter tone block.

In sub-step 5541, the wireless terminal uses pilot signal information to compute the channel gain ratio $G_i$. Sub-step 5541 includes sub-step 5546. In sub-step 5546, the wireless terminal computes $G_i = (PP_i * Z_i)/(PP_0 * Z_0)$, where $Z_0$=power scale factor associated with the power transmission tier level of the tone block for the first current base station sector connection transmitter tone block and $Z_i$=power scale factor associated with the a power transmission tier level of the tone block for the BSS connection transmitter tone block. Operation proceeds from step 5520 via connecting node D 5534 to step 5536, where the wireless terminal generates one or more interference reports.

In step 5516, the wireless terminal measures the power of received beacon signal ($PB_i$) for the interfering base station sector. Operation proceeds from step 5516 to step 5522. In step 5522, the wireless terminal derives interfering base station sector transmitter information, e.g., a BSS_slope and a BSS_sector type from the received beacon signal. Step 5522 includes sub-step 5523. In sub-step 5523, the wireless terminal determines a power transmission tier level associated with an interfering base station sector and tone block being used.

Operation proceeds from steps 5512 and step 5522 to step 5524 via connecting node C 5525. In step 5524 the wireless terminal computes a channel gain ratio using the method of sub-step 5526 or the method of sub-step 5528.

In sub-step 5526, the wireless terminal uses beacon signal information to compute the channel gain ratio, $G_i$. Sub-step 5526 includes sub-step 5530, where the wireless terminal computes $G_i = PB_i/PB_0$.

In sub-step 5528, the wireless terminal uses beacon signal information and pilot signal information to compute the channel gain ratio $G_i$. Sub-step 5528 includes sub-step 5532, where the wireless terminal computes $G_i = PB_i/(PP_0 * K * Z_0)$, where K=per tone transmitter power beacon reference level for a tier 0 tone block/per tone transmitter pilot signal reference level for a tier 0 tone block, and $Z_0$=power scale factor associated with the a power transmission tier level of the tone block for the current base station sector connection transmitter tone block.

Operation proceeds from step 5524 via connecting node D 5534 to step 5536, where the wireless terminal generates one or more interference reports.

Returning to step 5508, in step 5508 the wireless terminal is operated to receive broadcast load factor information signals from the first current serving base station sector transmitter and from interfering base station sector transmitters. For each base station sector under consideration, operation proceeds to step 5548. In step 5548 the wireless terminal determines whether or not the load factor was successfully recovered from the received signal. If the load factor was successfully recovered from the received signal operation proceeds to step 5550, where the wireless terminal stores the load factor. For example load factor $b_0$=the load factor for the current first serving base station sector, and load factor $b_k$=the load factor for interfering base station section k. If the load factor was not successfully recovered from the received signal then operation proceeds to step 5552, where the wireless terminal sets the load factor to 1. Load factors ($b_0$ 5554, $b_1$ 5556, ..., $b_k$ 5558, ... bn 5560) are obtained, with each load factor being sourced from one of steps 5550 and step 5552.

Returning to step 5536, in step 5536 the wireless terminal generates one or more interference reports. Step 5536 includes sub-step 5562 and sub-step 5564. In sub-step 5562, the wireless terminal generates a specific type report conveying interference by a specific interfering base station sector to the first serving base station sector. Step 5562 includes sub-step 5566. In sub-step 5566, the wireless terminal computes the report value=$(b_0/Z_0)/(G_k * b_k/Z_k)$, where $b_0$ is the loading factor of the current serving BSS and $b_k$ is the loading factor if an interfering BSS to which the report corresponds, $G_k=G_i$ for i=k, and $Z_0$ is the power scale factor associated with the power transmission tier level of the tone block for the current first BSS connection transmitter tone block, and $Z_k$ is the power scale factor associated with the power transmission tier level of the tone block for the interfering base station sector to which the report corresponds.

In sub-step 5564, the wireless terminal generates a generic type report conveying information of interference by one or more interfering BSSs to the serving first current BSS, e.g., using information from each of the measured beacon signals of interfering base station sectors including using load factor information and power scale factor information. Four alternative exemplary computations for a generic type report are includes as sub-steps 5570, 5572, 5574, 5576. An exemplary embodiment of a generic type report, e.g., in an exemplary single carrier operation embodiment, is $b_0/(\Sigma_k G_k * b_k)$. The summation is over each of the interfering $BBS_k$ that the wireless terminal can detect for the beacon or pilot signal. Another exemplary embodiment of a generic type report, e.g., in a single carrier operation embodiment, is $b_0/(\max_k (G_k * b_k))$. Another exemplary embodiment of a generic type report, e.g., in a exemplary multi-carrier, e.g., three carrier, operation embodiment, is $(b_0/Z_0)/(\Sigma_k (I_k * G_k * b_k/Z_k))$, where $I_k$ is an indicator function of whether the uplink of the $BSS_k$ is active in the current tone block: $I_k=1$ if the uplink of the $BSS_k$ is active; $I_k=0$ if the $BSS_k$ is inactive in the current tone block. The summation is over each of the interfering $BBS_k$ that the wireless terminal can detect for the beacon or pilot signal. Another exemplary embodiment of a generic type report, e.g., in an exemplary multi-carrier, e.g., three carrier, operation embodiment, is $(b_0/Z_0)/(\max_k (I_k * G_k * b_k/Z_k))$, where $I_k$ is an indicator function of whether the uplink of the $BSS_k$ is active in the current tone block: $I_k=1$ if the uplink of the $BSS_k$ is active; $I_k=0$ if the $BSS_k$ is inactive in the current tone block.

In some embodiments, step 5536 includes quantization. For example, an exemplary beacon ratio report conveys 4 information bits representing one of 16 levels ranging from –4 dBs to 28 dBs. Table 1100 of FIG. 11 for an exemplary 4-bit downlink beacon ratio report (DLBNR4) is such a representation.

Operation proceeds from step 5536 to step 5568 where the wireless terminal is operated to transmit the report to the first current serving base station sector serving as the current attachment point for the wireless terminal. In some embodiments, the transmission of a report is in response to a request from the serving base station sector. In some embodiments, the type of report transmitted, e.g., specific or generic, is in response to received signaling from a base station sector identifying the type of report. In some embodiments, the transmission of a particular specific type report reporting on interference associated with a particular base station sector is in response to a received base station signal identifying the particular base station sector. In various embodiments, interference reports are transmitted periodically in accordance with a reporting schedule being followed by the wireless terminal, e.g., as part of dedicated control channel structure. In some such embodiments, for at least some of the interference reports transmitted, the base station does not signal any report selection information to select the report. In some embodiments, the base station alternates between calculating between two types of generic beacon ratio reports, e.g., a first type using a summation of information from each of the received interfering BSSs, and a second type based on information from the single worst interfering BSS, as a function of current position in a recurring timing structure. For example, the first type of generic beacon ratio report is calculated when the beacon slot index is even within a ultraslot, and the second type of generic beacon ratio report is calculated when the beacon slot index is odd within the ultra slot. In some embodiments, the WT only sends generic beacon ratio reports by default and only sends a specific beacon ratio report when request to do so by the base station.

In some embodiments, the system includes a plurality of power transmission tier levels, e.g., three, with a different power scale factor associated with each tier level. For example, in one exemplary embodiment a power scale factor of 0 dB is associated with a tier level 0 tone block, while a power scale factor of 6 dB is associated with a tier 1 level tone block, and a power scale factor of 12 dB is associated with a tier 2 tone block. In some embodiments, each attachment point corresponds to a base station sector transmitter and a tone block, and each attachment point BSS transmitter tone block may be associated with a power transmission tier level. In some embodiments there are a plurality of downlink tones blocks, e.g., three tone block (tone block 0, tone block 1, tone block 2) each having 113 contiguous evenly spaced tones. In some embodiments, the same tone block, e.g., tone block 0, used different base station sector transmitters, has a different power transmission tier level associated with the different base station sector transmitters. A wireless terminal, identifying a particular attachment point, corresponding to a base station sector transmitter and tone block, e.g., from information conveyed via its beacon signal using tone location and/or time position with a recurring transmission pattern, can used stored information to associate the identified attachment point with a particular power transmission tier level and power scale factor for a particular tone block.

In some embodiments, the loading factor, e.g., $b_k$, is a value greater than or equal to 0 and less than or equal to one. In some embodiments, the value is communicated from a base station sector to a wireless terminal represents one of a plurality of levels, e.g., 0 dB, –1 dB, –2 dB, –3 dB, –4 dB, –6 dB, –9 dB, -infinity dB. Table 950 of FIG. 10 illustrates exemplary uplink loading factor information that may be communicated by a base station sector via a downlink broadcast channel.

In some embodiments, the beacon signals are transmitted at the same power from a base station sector transmitter irrespective of power transmission tier associated with the tone block being used; however, other downlink signals, e.g., pilot signals, are affected by the power transmission tier associated with the tone block for the base station sector transmitter. In some embodiments, the parameter K is at value greater than or equal to 6 dB. For example in one exemplary embodiment the parameter K=23.8 dB –7.2 dB=16.6 dB.

Figure 18:
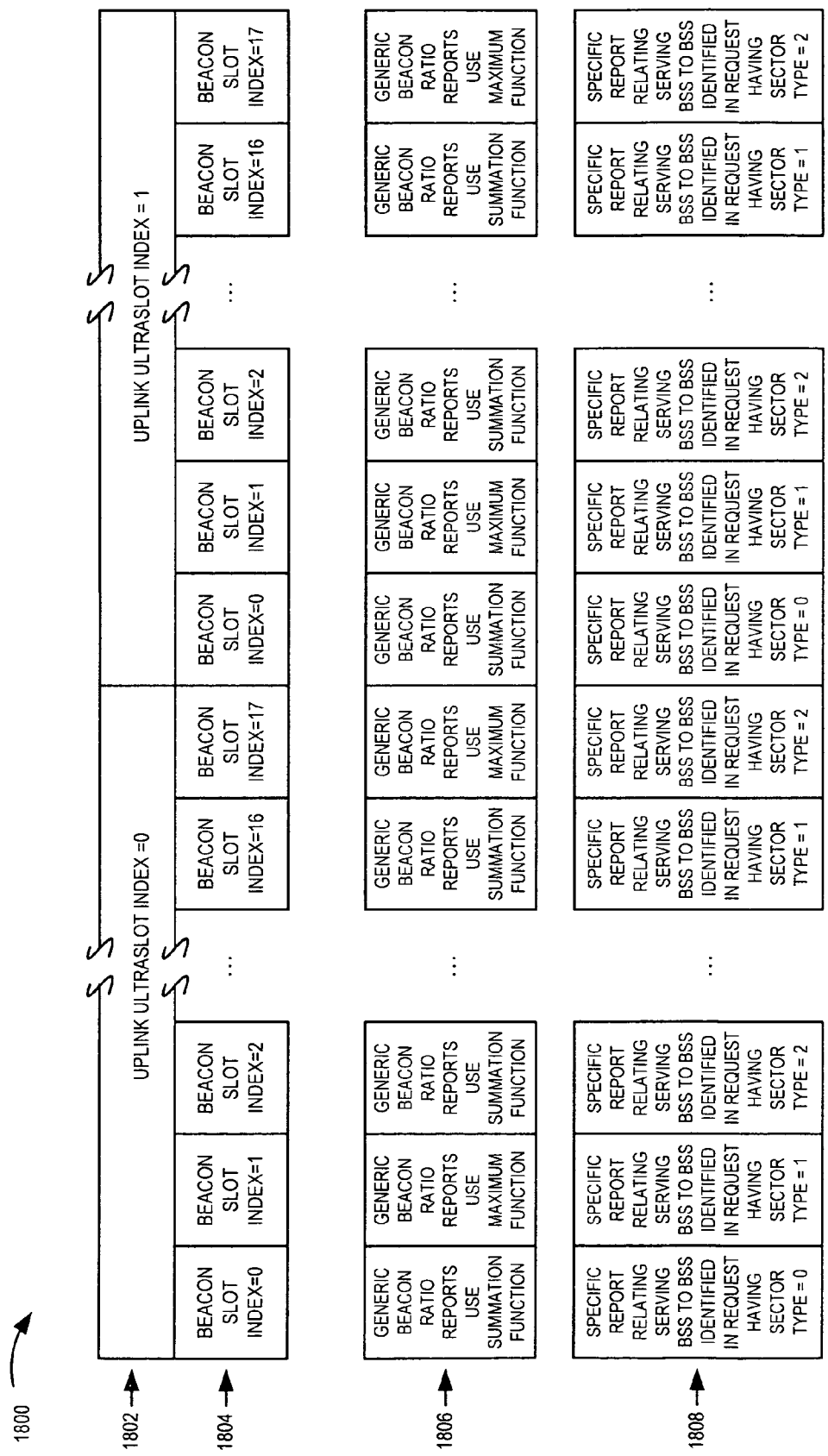
FIG. 18 is a drawing of exemplary timing structure information and corresponding interference reporting information, e.g., beacon ratio report reporting information, for an exemplary embodiment.

FIG. 18 is a drawing 1800 of exemplary timing structure information and corresponding interference reporting information, e.g., beacon ratio report reporting information, for an exemplary embodiment. The exemplary timing structure includes uplink ultraslots as indicated by row 1802 showing uplink ultraslot with index=0 followed by uplink ultraslot with index=1. In the exemplary embodiment, each ultaslot includes 18 indexed beaconslots as indicated by row 1804. Each beaconslot includes, e.g., 912 consecutive OFDM symbol transmission time periods. In this exemplary embodiment, a wireless terminal can report two different types of beacon ratio reports to a serving base station sector, e.g., via dedicated control channel segments, the first type of beacon ratio report being a generic beacon ratio report and the second type of beacon ratio report being a specific beacon ratio report, sometimes referred to as a special beacon ratio report. The first type of beacon ratio report is a generic beacon ratio report and two sub-types of generic beacon ratio reports are used. A first sub-type of generic beacon ratio report determines a report value as a function of the summation of one or more interfering base stations sectors. A second sub-type of generic beacon ratio report determines a report value as a function of a maximum, e.g., the worst case individual base station sector in terms of the interference value. As indicated by row 1806, the sub-type of generic beacon ratio report to use is a function of the beaconslot index. For even values of the beaconslot index (0, 2, 4, 6, 8, 10, 12, 14, 16) a wireless terminal, when transmitting a generic beacon ratio report uses a summation function to determine the report. For odd values of the beaconslot index (1, 3, 5, 7, 9, 11, 13, 15, 17) a wireless terminal, when transmitting a generic beacon ratio report uses a maximum function to determine the report. Row 1808 indicates that a wireless terminal, when transmitting a specific beacon ratio report communicates a report corresponding to a base station sector identified in a request and having a sector type which is a function of the beaconslot index value. For example, consider that three different sector types are used (sector type 0, sector type 1, and sector type 2). A request signal from the serving base station sector requesting specific type of beacon ratio reports may include a cell identifier value, e.g., a slope value, and the uplink timing structure in which the report is communicated may determine the sector type. For example, for beaconslots with index=(0, 3, 6, 9, 12, 15) a wireless terminal, when reporting a specific beacon ratio report, reports a specific beacon ratio report relating the serving base station sector to another base station sector identified by a communicated cell identifier value and having sector type=0. For beaconslots with index=(1, 4, 7, 10, 13, 16) a wireless terminal, when reporting a specific beacon ratio report, reports a specific beacon ratio report relating the serving base station sector to another base station sector identified by a communicated cell identifier value and having sector type=1. For beaconslots with index=(2, 5, 8, 11, 14, 17) a wireless terminal, when reporting a specific beacon ratio report, reports a specific beacon ratio report relating the serving base station sector to another base station sector identified by a communicated cell identifier value and having sector type=2.

It should be observed that by implementing this predetermined timing structure based reporting format, understood by both the base station and the wireless terminal, the system supports a variety of reporting formats while limiting the amount of signaling overhead. In addition, it should be observed that for the specific beacon ratio report, identification of a base station sector of interest is obtained partly by information included in a request signal and partly by position in the uplink timing structure, thus fewer bits are needed for overhead signaling to identify a base station sector of interest.

Figure 19:
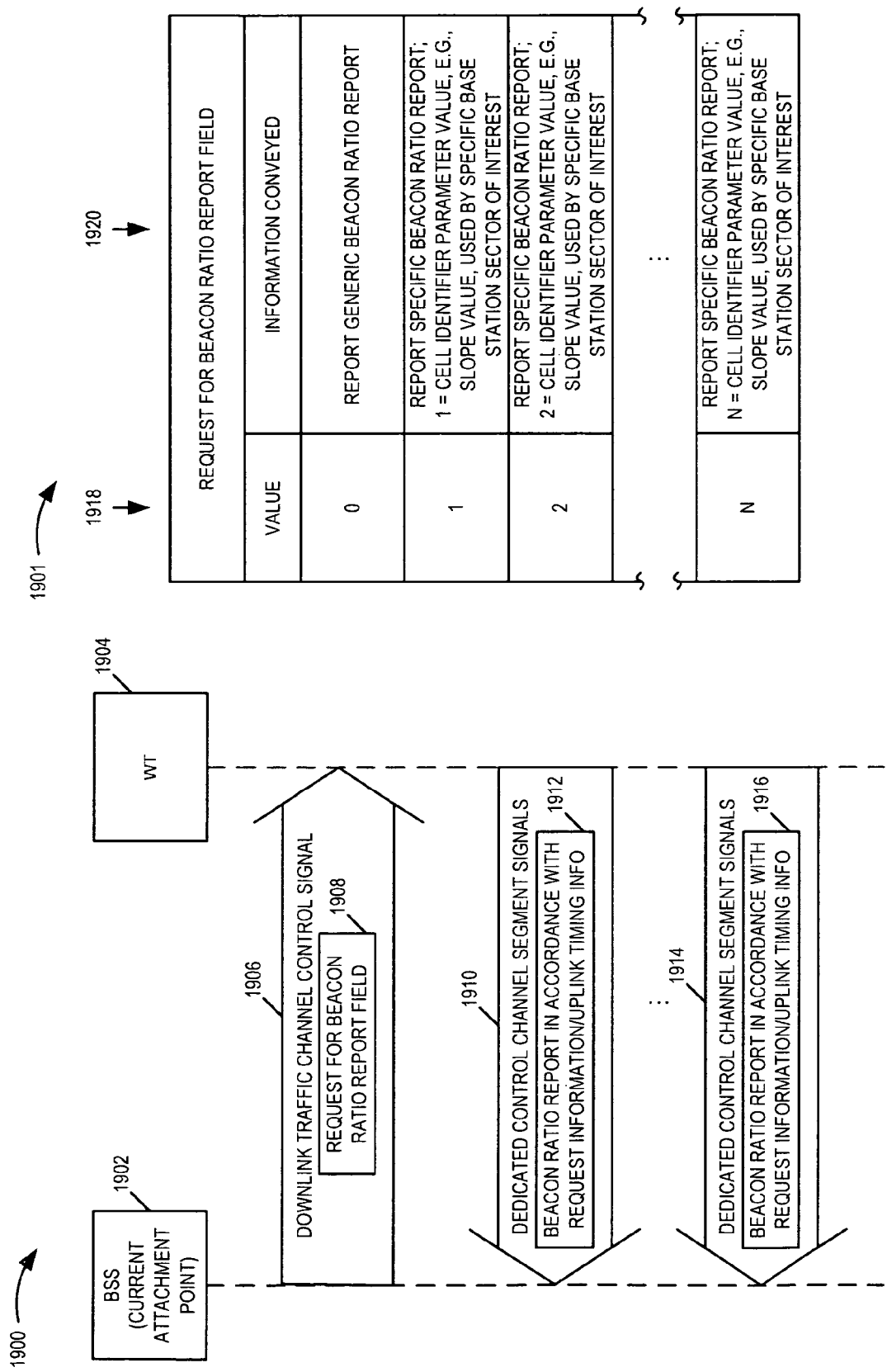
FIG. 19 illustrates in drawing, for an exemplary embodiment, exemplary beacon ratio report request downlink signaling and exemplary uplink beacon ratio report signaling.

FIG. 19 illustrates in drawing 1900, for an exemplary embodiment, exemplary beacon ratio report request downlink signaling and exemplary uplink beacon ratio report signaling. In FIG. 1900, base station sector 1902, a current attachment point for wireless terminal 1904, sends a downlink traffic channel control signal 1906 including information in a request for beacon ratio report field 1908, e.g., as part of downlink traffic control channel flash signal. In some embodiments, the signal including the request for beacon ratio report field is a broadcast signal, e.g., intended for use by multiple wireless terminals. Thus, an individual control signal is broadcast for multiple connected wireless terminals to use thus reducing the level of overhead control signaling that would otherwise be needed if each wireless terminal was individually controlled with respect to the type of interference report to send. In some embodiments, a single request for beacon ratio report downlink signal may correspond to multiple uplink interference reports to be communicated by a wireless terminal. In some embodiments, a single request for beacon ratio report downlink signal corresponds to a single uplink interference report for an individual wireless terminal. In some embodiments, a single request for beacon ratio report downlink signal corresponds to a single interference uplink report for each of a plurality of different wireless terminals. The request for beacon ratio report field includes a value indicating the request. Table 1901 is an exemplary request for beacon ratio report field reporting format that may be used by BSS 1902 and WT 1904. First column 1918 of table 1901 indicates values conveyed by the report; second column 1920 includes the information conveyed by the corresponding value. If the value is a zero, the wireless terminal is to report a generic beacon ratio report. If the value is a non-zero positive integer, the wireless terminal is to report a specific beacon ratio report, and the value corresponds to a cell identifier parameter, e.g., a slope value, used by the base station sector of interest. The slope value is, in some embodiments, a value corresponding to slope of pilot tone signals. However, in some embodiments, multiple base station sectors within the same cell use the same value for slope, and thus uplink timing information is also used to determine the particular base station sector of interest to be used for a particular specific beacon ratio report, e.g., timing information indicated by rows 1808.

In some other embodiments, a wireless terminal transmits a first type of report by default, and a second type of report if a request for beacon ratio report signal is communicated. For example, generic beacon ratio reports may be communicated by default, and if a base station wants specific type beacon ratio reports to be communicated, then the base station communicates a request for beacon ratio report signal including cell identifier information.

Dedicated control channel segment signal 1910 includes a beacon ratio report 1912 in accordance with request information and uplink timing structure information. Dedicated control channel segment signal 1914 includes a beacon ratio report 1916 in accordance with request information and uplink timing structure information. For example, consider that request field 1908 conveyed a value of 0, that report 1912 corresponds to a beacon ratio report communicated during a beaconslot with index=0, and that report 1916 corresponds to a beacon ratio report communicated during a beaconslot with index=1. Beacon ratio report 1912 is a generic beacon ratio report using a summation function to compute the report value, the report relating detected base station sectors of the same tone block to the serving base station sector; beacon ratio report 1916 is a generic beacon ratio report using a maximum function to compute the report value, the report relating detected base station sectors of the same tone block to the serving base station sector. Now consider that request field 1908 conveyed a value of 1, that report 1912 corresponds to a beacon ratio report communicated during a beaconslot with index=0, and that report 1916 corresponds to a beacon ratio report communicated during a beaconslot with index=1. Beacon ratio report 1912 is a specific beacon ratio report relating the current serving base station sector attachment point to a local base station sector identified by slope value=1 and having a sector type=0 and using the same tone block as the serving base station sector; beacon ratio report 1916 is a specific beacon ratio report relating the current serving base station sector attachment point to a local base station sector identified by slope value=1 and having a sector type=1 and using the same tone block as the serving base station sector.

Figure 20:
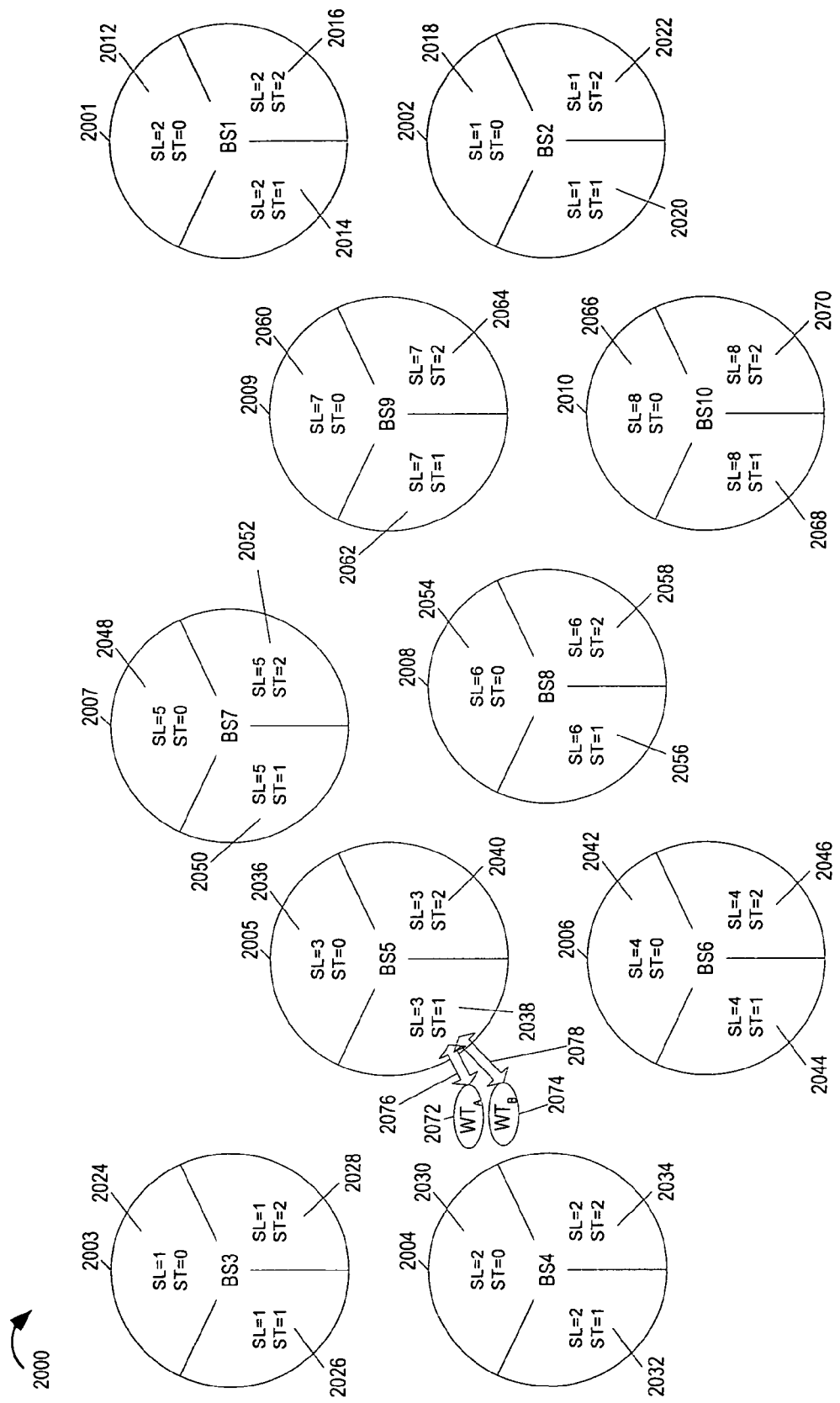
FIG. 20 is a drawing of an exemplary communications system implemented in accordance with various embodiments.

FIG. 20 is a drawing of an exemplary communications system 2000 implemented in accordance with various embodiments. Exemplary communications system 2000 includes a plurality of base stations (BS 1 2001, BS 2 2002, BS 3 2003, BS 4 2004, BS 5 2005, BS 6 2006, BS 7 2007, BS 8 2008, BS 9 2009, BS 10 2010) coupled together via a backhaul network. The BSs (2001, 2002, 2003, 2004, 2005, 2006, 2007, 2008, 2009, 2010) are three sector base stations. BS 1 2001 includes: a first sector 2012 with a slope value=2 and a sector type value=0, a second sector 2014 with a slope value=2 and a sector type value=1, and a third sector 2016 with a slope value=2 and a sector type value=2. BS 2 2002 includes: a first sector 2018 with a slope value=1 and a sector type value=0, a second sector 2020 with a slope value=1 and a sector type value=1, and a third sector 2022 with a slope value=1 and a sector type value=2. BS 3 2003 includes: a first sector 2024 with a slope value=1 and a sector type value=0, a second sector 2026 with a slope value=1 and a sector type value=1, and a third sector 2028 with a slope value=1 and a sector type value=2. BS 4 2004 includes: a first sector 2030 with a slope value=2 and a sector type value=0, a second sector 2032 with a slope value=2 and a sector type value=1, and a third sector 2034 with a slope value=2 and a sector type value=2. BS 5 2005 includes: a first sector 2036 with a slope value=3 and a sector type value=0, a second sector 2038 with a slope value=3 and a sector type value=1, and a third sector 2040 with a slope value=3 and a sector type value=2. BS 6 2006 includes: a first sector 2042 with a slope value=4 and a sector type value=0, a second sector 2044 with a slope value=4 and a sector type value=1, and a third sector 2046 with a slope value=4 and a sector type value=2. BS 7 2007 includes: a first sector 2048 with a slope value=5 and a sector type value=0, a second sector 2050 with a slope value=5 and a sector type value=1, and a third sector 2052 with a slope value=5 and a sector type value=2. BS 8 2008 includes: a first sector 2054 with a slope value=6 and a sector type value=0, a second sector 2056 with a slope value=6 and a sector type value=1, and a third sector 2058 with a slope value=6 and a sector type value=2. BS 9 2009 includes: a first sector 2060 with a slope value=7 and a sector type value=0, a second sector 2062 with a slope value=7 and a sector type value=1, and a third sector 2064 with a slope value=7 and a sector type value=2. BS 10 2010 includes: a first sector 2066 with a slope value=8 and a sector type value=0, a second sector 2068 with a slope value=8 and a sector type value=1, and a third sector 2070 with a slope value=8 and a sector type value=2.

The exemplary communications system 2000 also includes a plurality of wireless terminals. Exemplary WT A 2072 and exemplary WT B 2072 are shown connected to base station 5 2005 second sector 2038 via wireless links (2076, 2078), respectively. Base station sector 5 2005 second sector 2038 attachment point sends broadcast downlink traffic channel control signals including a request for beacon ratio report field value, e.g., as indicated in FIG. 19. WT A 2072 is in an On state of operation, and has been allocated uplink dedicated control channel segments for communicating uplink control reports, some of the uplink reports are to be interference reports, e.g., beacon ratio reports. Similarly WT B 2074 is in an On state of operation, and has been allocated uplink dedicated control channel segments for communicating uplink control reports, some of the uplink reports are to be interference reports, e.g., beacon ratio reports. The WTs (2072, 2074) receive the broadcast request for beacon ratio report information in determining the type of beacon ratio report to be communicated. In some embodiments, the information is used in conjunction with timing structure information in determining the information to be included in an uplink interference report.

It should be observed that the slope value used as a base station identifier is locally unique but is not unique in the system 2000. For example slope value=1 is used as a cell identifier by both BS 1 2001 and BS 3 2003. However, there is no ambiguity between the WT and base station attachment point as to which base station is the intended target. By using a locally unique base station identifier, as opposed to a system unique base station identifier, in control signaling, the number of bits needed to represent the base station is reduced thus allowing control signaling overhead to be reduced in a system utilizing a large number of base stations. The same principle can, and in various embodiments, are used for base stations including a large number of sectors. For example, an exemplary five sector base station may use three different sector types with two of the sector type values being used twice.

Figure 21:
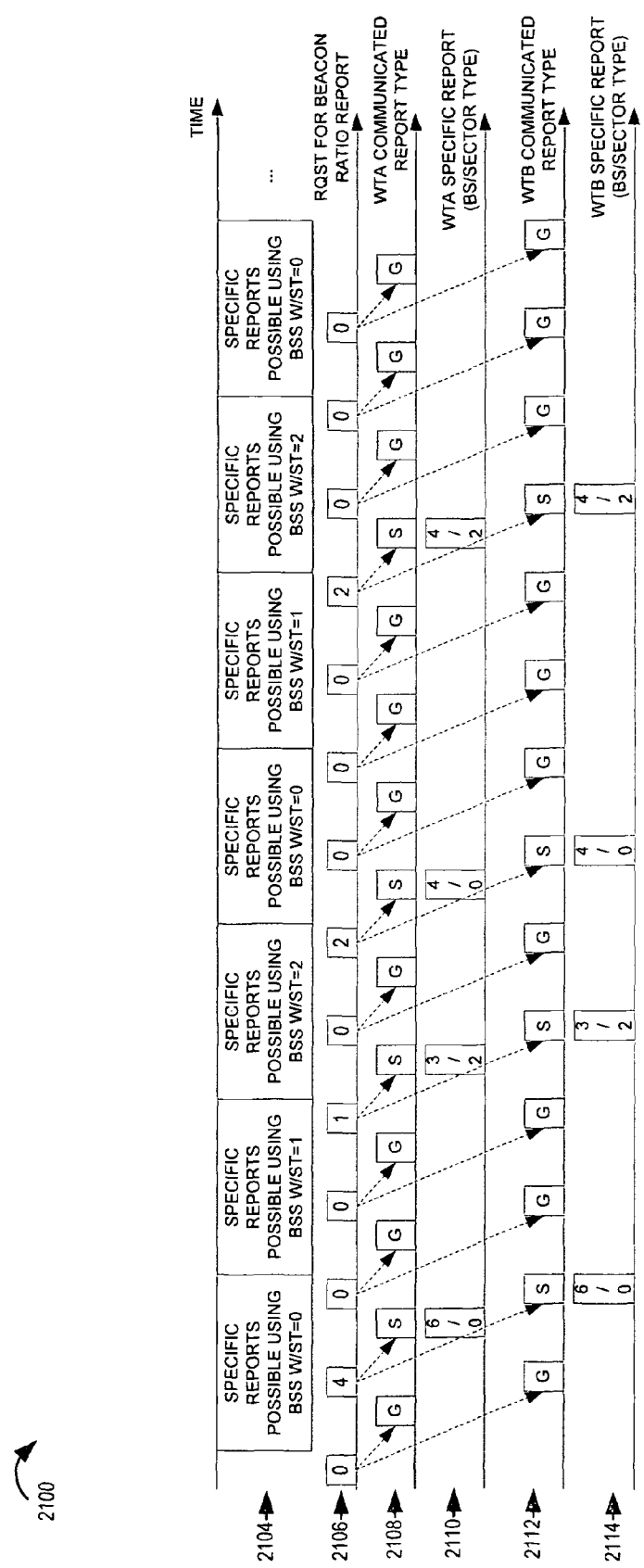
FIG. 21 is a drawing illustrating exemplary downlink control signaling and uplink interference reporting, e.g., beacon ratio reporting, corresponding to the exemplary system of FIG. 20.

FIG. 21 is a drawing 2100 illustrating exemplary downlink control signaling and uplink interference reporting, e.g., beacon ratio reporting, corresponding to system 2000 of FIG. 20. First row 2104 includes a time line indicating when specific reporting of beacon ratio reports is possible corresponding different base station sector types. In this example, there are three different sector types (sector type 0, sector type 1, and sector type 2). In accordance with this embodiment, the reporting structure alternates between the three types, e.g., with each block representing the time interval of a beaconslot (see FIG. 18). Second row 2106 indicates the request for beacon ratio report value included in a broadcast downlink traffic control channel signal (see FIG. 19). Third row 2108 indicates the WT A communicated report type, where G = generic report and S=specific report. Fourth row 2110 indicates, for WT A specific reports, the base station and base station sector type to be used in calculating the specific report. Fifth row 2112 indicates the WT B communicated report type, where G=generic report and S=specific report. Sixth row 2114 indicates, for WT B specific reports, the base station and base station sector type to be used in calculating the specific report.

The first value of row 2106 is a 0 indicating that the corresponding interference reports should be generic type reports. Therefore both WT A and WT B transmit generic uplink beacon ratio reports. The second value of row 2096 is a 4 indicating that the corresponding reports should be specific type reports corresponding to a local base station sector using slope value=4. The time for the corresponding uplink beacon ratio reports is within the beaconslot used for sector type 0. Therefore the WTs transmit specific beacon ratio reports to BS 5 sector 2038 relating base station 6 sector type 0 sector 2042 to base station 5 sector type 1 sector 2038. The third and fourth values of row 2106 are 0, and therefore the corresponding beacon ratio reports are generic beacon ratio reports. The fifth value of row 2106 is a 1 indicating that the corresponding reports should be specific type reports corresponding to a local base station sector using slope value=1. The time for the corresponding uplink beacon ratio reports is within the beaconslot used for sector type 2. Therefore the WTs transmit specific beacon ratio reports to BS 5 sector 2038 relating base station 3 sector type 2 sector 2028 to base station 5 sector 1 2038. The sixth value of row 2106 is 0, and therefore the corresponding beacon ratio reports are generic beacon ratio reports. The seventh value of row 2106 is a 2 indicating that the reports should be specific type reports corresponding to a local base station sector using slope value=2. The time for the corresponding uplink beacon ratio reports is within the beaconslot used for sector type 0. Therefore the WTs transmit specific beacon ratio reports to BS 5 sector 2038 relating base station 4 sector type 0 sector 2030 to base station 5 sector 1 2038. The eight, ninth and tenth values of row 2106 are 0, and therefore the corresponding beacon ratio reports are generic beacon ratio reports. The eleventh value of row 2106 is a 2 indicating that the reports should be specific type reports corresponding to a local base station sector using slope value=2. The time for the corresponding uplink beacon ratio reports is within the beaconslot used for sector type 2. Therefore the WTs transmit specific beacon ratio reports to BS 5 sector 2038 relating base station 4 sector type 2 sector 2034 to base station 5 sector 1 2038. The twelfth, thirteenth and fourteenth values of row 2096 are 0, and therefore the corresponding beacon ratio reports are generic beacon ratio reports.

In this exemplary embodiment, there is a fixed relationship in the timing structure between downlink control channel signals including request for beacon ratio reports and corresponding uplink interference reporting opportunities for the WTs, e.g., as indicatd by the dotted line arrows. This linkage in the timing structure, understood by both base station and wireless terminal, reduces overhead signaling. In this exemplary embodiment, WT A and WT B transmit their uplink beacon ratio reports, corresponding to the same request, at different points in time in the uplink timing structure. For other embodiments and/or for other wireless terminals the reports may be communicated concurrently, e.g., using different tones in the tone block. In addition in some embodiments, the frequency of reporting by one WT may be different than the frequency of reporting by a different wireless terminal, e.g., over a given time interval as one wireless terminal may be in a different reporting mode of operation with respect to the other wireless terminal.

Although illustrated for two exemplary wireless terminals, it is to be understood that, in some embodiments, the same request for beacon ratio report broadcast control signal may be, and sometimes is utilized by many additional wireless terminals using the base station sector attachment point. For example, consider one exemplary embodiment in which a base station sector attachment point can have up to 31 concurrent On state users, and each on the On state users receives a dedicated control channel for transmitting uplink control channel reports including beacon ratio reports, each On-state user can receive and utilize the same broadcast request for beacon ratio report downlink signal.

Figure 22:
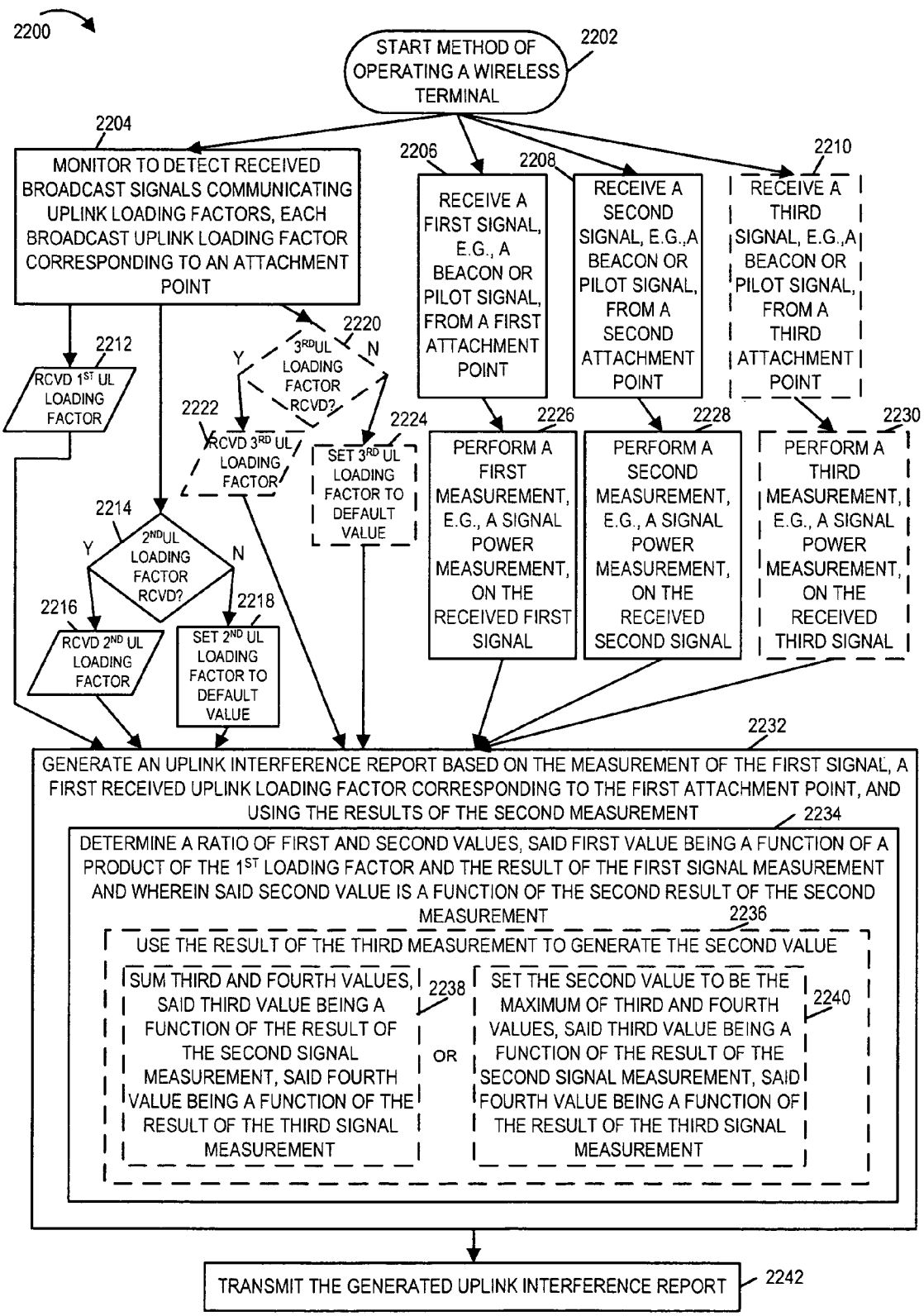
FIG. 22 is a drawing of a flowchart of an exemplary method of operating a wireless terminal in accordance with various embodiments.

FIG. 22 is a drawing of a flowchart 2200 of an exemplary method of operating a wireless terminal in accordance with various embodiments. The exemplary method starts in step 2202 where the wireless terminal is powered on and initialized. Operation proceeds from start step 2202 to steps 2204, 2206, 2208, and in some embodiments, step 2210. In step 2204, the wireless terminal monitors to detect received broadcast signals communicating uplink loading factors, each broadcast uplink loading factor corresponding to an attachment point. In step 2206, the wireless terminal is operated to receive a first signal, e.g., a beacon or pilot signal, from a first attachment point. In step 2208, the wireless terminal is operated to receive a second signal, e.g., a beacon or pilot signal, from a second attachment point. In step 2210, when performed, the wireless terminal is operated to receive a third signal, e.g., a beacon or pilot signal, from a third attachment point.

Operation proceeds from step 2206 to step 2226, where the wireless terminal performs a first measurement, e.g., a signal power measurement, on the received first signal. Operation proceeds from step 2208 to step 2228, where the wireless terminal performs a second measurement, e.g., a signal power measurement, on the received second signal. Operation proceeds from step 2210 to step 2230, where the wireless terminal performs a third measurement, e.g., a signal power measurement, on the received third signal. Operation proceeds form steps 2226, 2228 and 2230 to step 2232.

Returning to step 2204, in step 2204, the wireless outputs received uplink loading factor information which is forwarded to be used in step 2232. Corresponding to the first attachment point, at which the wireless terminal has a connection, the wireless terminal outputs received $1^{st}$ uplink loading factor information 2212. Corresponding to the second attachment point the wireless terminal may or may not have been able to detect and recover an uplink loading factor. In step 2214, if the wireless terminal has detected and recovered an uplink loading factor corresponding to the second attachment point the wireless terminal forwards the received $2^{nd}$ uplink loading factor information 2216 to be used in step 2232. However, if the wireless terminal has not detected and recovered an uplink loading factor corresponding to the second attachment point, the wireless terminal sets the $2^{nd}$ uplink loading factor to a default value, e.g., a value of 1, in step 2218, the default value to be used in step 2232. Corresponding to the third attachment point the wireless terminal may or may not have been able to detect and recover an uplink loading factor. In step 2220, if the wireless terminal has detected and recovered an uplink loading factor corresponding to the third attachment point the wireless terminal forwards the received $3^{rd}$ uplink loading factor information 2222 to be used in step 2232. However, if the wireless terminal has not detected and recovered an uplink loading factor corresponding to the third attachment point, the wireless terminal sets the $3^{rd}$ uplink loading factor to a default value, e.g., a value of 1, in step 2224, the default value to be used in step 2232.

In step 2232, the wireless terminal generates an uplink interference report based on the measurement of the first signal, a first received uplink loading factor corresponding to the first attachment point, and using the results of the second measurement. Step 2232 includes step 2234, in which the wireless terminal determines a ratio of first and second values, said first value being a function of a product of the $1^{st}$ loading factor and the result of the first signal measurement and wherein the second value is a function of the second result of the second measurement. In some embodiments, the second value is also a function of a product of a second loading factor corresponding to the second attachment point and the result of the second signal measurement.

In some embodiments, e.g., some embodiments where three or more received signals from three different attachment points are used in generating an interference report, step 2234 includes step 2236. In step 2236 the wireless terminal uses the result of the third measurement to generate the second value. Step 2236 includes sub-step 2238 and sub-step 2240, one of which is performed to generate an interference report. In some embodiments, at different times different ones of sub-steps 2238 and 2240 are used to generate the interference report. In sub-step 2238, the wireless terminal sums third and fourth values, said third value being a function of the result of the second signal measurement, said fourth value being a function of the result of the third signal measurement. In sub-step 2240, the wireless terminal sets the second value to be the maximum of third and fourth values, said third value being a function of the result of the second signal measurement, said fourth value being a function of the result of the third signal measurement.

Operation proceeds from step 2232 to step 2242. In step 2242, the wireless terminal transmits the generated uplink interference report from step 2232.

In some embodiments the first and second signals are OFDM signals. In some other embodiments, the first and second signals are CDMA signals.

In some embodiments, for at least some interference reports, the first value is generated according to the following equation: $b_0 PB_0$; and the second value is generated according to the following equation: $b_1 PB_1 + b_2 PB_2$; where $b_0$ is the loading factor corresponding to the first attachment point; wherein $PB_0$ is the measured power of a received beacon signal from the first attachment point; wherein $b_1$ is a loading factor corresponding to the second attachment point; wherein $PB_1$ is the measured power of a received beacon signal from the second attachment point; wherein $b_2$ is a loading factor corresponding to the third attachment point; and wherein $PB_2$ is the measured power of a received beacon signal from the third attachment point.

In some embodiments, for at least some interference reports, the first value is generated according to the following equation: $b_0 PB_0$; and the second value is generated according to the following equation: MAX $(b_1 PB_1, b_2 PB_2)$; where $b_0$ is the loading factor corresponding to the first attachment point; wherein $PB_0$ is the measured power of a received beacon signal from the first attachment point; wherein $b_1$ is a loading factor corresponding to the second attachment point; wherein $PB_1$ is the measured power of a received beacon signal from the second attachment point; wherein $b_2$ is a loading factor corresponding to the third attachment point; and wherein $PB_2$ is the measured power of a received beacon signal from the third attachment point.

Figure 23:
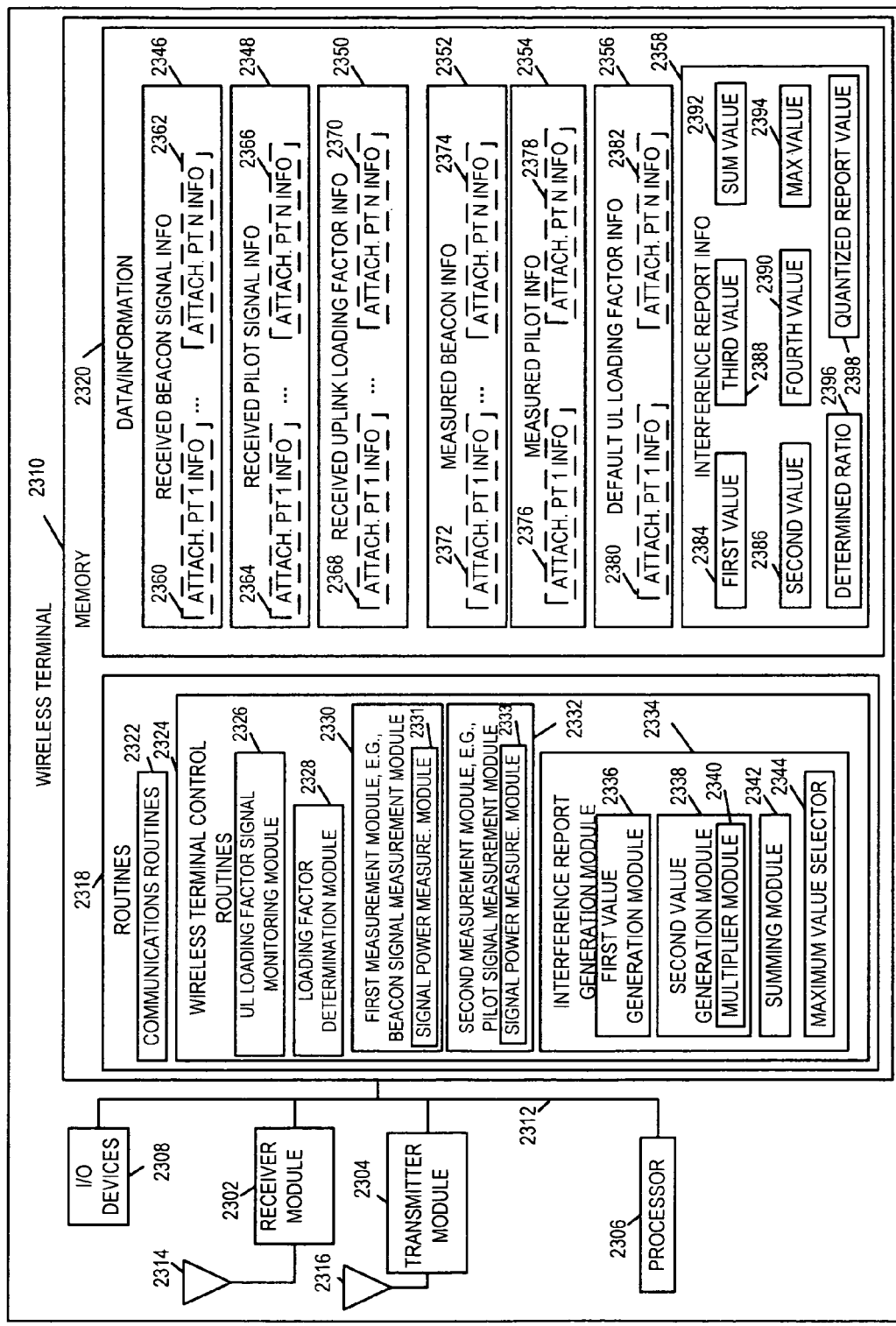
FIG. 23 is a drawing of an exemplary wireless terminal implemented in accordance with various embodiments.

FIG. 23 is a drawing of an exemplary wireless terminal 2300 implemented in accordance with various embodiments. Exemplary wireless terminal 2300 includes a receiver module 2302, a transmitter module 2304, a processor 2306, user I/O devices 2308, and a memory 2310 coupled together via a bus 2312 over which the various elements may interchange data and information. Memory 2310 includes routines 2318 and data/information 2320. The processor 2306, e.g., a CPU, executes the routines 2318 and uses the data/information 2320 in memory 2310 to control the operation of the wireless terminal 2300 and implement methods.

Receiver module 2302, e.g., an OFDM receiver, is coupled to receive antenna 2314 via which the wireless terminal 2300 receives downlink signals from base station attachment points, said downlink signals including broadcast signals conveying uplink attachment point loading factors, beacon signals, and pilot signals. Transmitter module 2304, e.g., an OFDM transmitter, is coupled to transmit antenna 2316 via which the wireless terminal 2300 transmits uplink signals to base station attachment points, said uplink signals including generated interference reports, e.g., beacon ratio reports communicated via dedicated control channel segments. In some embodiments, the same antenna is used for receiver and transmitter, e.g., in conjunction with a duplex module. In some other embodiments, the transmitter module 2304 is a CDMA transmitter and the receiver module 2302 is a CDMA receiver. In some embodiments the transmitter module 2304 and/or receiver module 2302 support both OFDM and CDMA signaling.

I/O devices 2308 include, e.g., microphone, keyboard, keypad, switches, camera, speaker, display, etc. I/O devices 2308 allow a user of WT 2300 to input data/information, access output data/information, control applications, and control at least some functions of the WT 2300, e.g., initiate a communications session.

Routines 2318 include communications routines 2322 and wireless terminal control routines 2324. The communications routines 2322 implement various communications protocols used by the wireless terminal 2300. The wireless terminal control routines 2324 include an uplink loading factor signal monitoring module 2326, a loading factor determination module 2328, a first measurement module 2330, a second measurement module 2332, and an interference report generation module 2334.

The uplink loading factor signal monitoring module 2326 detects received broadcast signals communicating at least one uplink loading factor, each broadcast uplink loading factor corresponding to an attachment point. The first measurement module 2330 measures received signals of a first type, e.g., first measurement module 2330 is a beacon signal measurement module which measures received beacon signals. The first signal measurement module 2330 includes a signal power measurement module 2331 which measures the power of received beacon signals. The second measurement module 2332 measures received signals of a second type, e.g., second measurement module 2332 is a pilot signal measurement module which measures received pilot signals. The second measurement module 2332 includes a signal power measurement module 2333 which measures the power of received pilot signals.

Interference report generation module 2334 generates an uplink interference report based on a measurement of a first received signal, e.g., a received beacon or pilot signal, and a first received uplink loading factor corresponding to a first attachment point. In various embodiments, the interference report generation module uses the measurement of a second signal, e.g., a received beacon or pilot signal, from a second attachment point to generate an uplink interference report. The interference report generation module includes a first value generation module 2336, a second value generation module 2338, a summing module 2342, and a maximum value selector module 2344. The second value generation module 2338 includes a multiplier module 2340.

The first value generation module 2336 generates a first value 2384 as a function of a product of a first loading factor and the result of a first signal measurement. For example, the first loading factor may correspond to the attachment point of the current connection being used by the wireless terminal as it point of attachment, and the first signal may be a received beacon or pilot signal from the attachment point of the current connection.

Second value generation module 2338 generates a second value 2386 as a function of a result of a second measurement, e.g., the result of a measurement of a received beacon or pilot signal from a different attachment point than the one used by the first value generation module. For example, the second signal may be sourced from an attachment point in an adjacent sector and/or adjacent cell to the current serving attachment point.

Multiplier module 2340 is used for generating a product of a second loading factor corresponding to a second attachment point and the result of the second signal measurement.

In some embodiments, the interference report generation module 2334 generates at least one uplink interference report using the result of a third measurement of a third signal from a third attachment point to generate said second value.

Summing module 2342 sums third and fourth values (2388, 2390) said third value being a function of the result of the second signal measurement, said fourth value being a result function of the result of the third signal measurement. In some embodiments, for at least some interference reports, the first value is generated according to the following equation: $b_0 PB_0$; the second value is generated according to the following equation: $b_1 PB_1 + b_2 PB_2$; where $b_0$ is the loading factor corresponding to the first attachment point; wherein $PB_0$ is the measured power of a received beacon signal from the first attachment point; wherein $b_1$ is a loading factor corresponding to the second attachment point; wherein $PB_1$ is the measured power of a received beacon signal from the second attachment point; wherein $b_2$ is a loading factor corresponding to the third attachment point; and wherein $PB_2$ is the measured power of a received beacon signal from the third attachment point.

Maximum value sector module 2344, when utilized, sets the second value to be the maximum of third and fourth values (2388, 2390), said third value being a function of the result of the second signal measurement, said fourth value being a function of the result of the third signal measurement. In some embodiments, for at least some interference reports, the first value is generated according to the following equation: $b_0 PB_0$; and the second value is generated according to the following equation: $MAX(b_1 PB_1, b_2 PB_2)$; where $b_0$ is the loading factor corresponding to the first attachment point; wherein $PB_0$ is the measured power of a received beacon signal from the first attachment point; wherein $b_1$ is a loading factor corresponding to the second attachment point; wherein $PB_1$ is the measured power of a received beacon signal from the second attachment point; wherein $b_2$ is a loading factor corresponding to the third attachment point; and wherein $PB_2$ is the measured power of a received beacon signal from the third attachment point.

In some embodiments, for at least some of the interference reports generated at least some of said first, second and third signal measurements are measurements of pilot channel signals. In some embodiments, scaling factors are used to relate transmission powers of pilot signals to transmission powers of beacon signals and/or transmission powers of pilot signals from one attachment point to transmission powers of pilot signals from a different attachment point.

In some embodiments, the interference report generation module 2344 supports the generation of a variety of different types of reports, e.g., specific reports relating a current serving base station attachment point, to a single identified other base station attachment point, a generic report of a first sub-type relating a current serving base station to one or more, e.g., a plurality, of other base station sectors from which signals, e.g., beacons and/or pilots, are received and using a summation type function in generating the report, and a generic report of a second sub-type relating a current serving base station attachment point to one or more, e.g., a plurality, of other base station sectors from which signals, e.g., beacons and/or pilots, are received and using a summation type function in generating the report.

Loading factor determination module 2328 sets a loading factor to a default value in the absence of a successfully received loading factor corresponding to an attachment point of interest. For example, the loading factor determination module 2328 sets a second loading factor to a default value in the absence of a successfully received second loading factor from a second attachment point.

Data/information 2320 includes received beacon signal information 2346, received pilot signal information 2348, received uplink loading factor information 2350, measured beacon information 2352, measured pilot information 2354, default uplink loading factor information 2356, and interference report information 2358. Received beacon signal information 2346 may include received beacon signal information corresponding to various attachment points (attachment point 1 information 2360, . . . , attachment point N information 2362). Received pilot signal information 2348 may include received pilot signal information corresponding to various attachment points (attachment point 1 information 2364, . . . , attachment point N information 2366). Received uplink loading factor information 2350 may include received uplink loading factor information corresponding to various attachment points (attachment point 1 information 2368, . . . , attachment point N information 2370). Measured beacon signal information 2352 may include measured beacon signal information corresponding to various attachment points (attachment point 1 information 2372, . . . , attachment point N information 2374). Measured pilot signal information 2354 may include measured pilot signal information corresponding to various attachment points (attachment point 1 information 2376, . . . , attachment point N information 2378). Default uplink loading factor information 2356 may include default uplink loading factor information corresponding to various attachment points (attachment point 1 information 2380, . . . , attachment point N information 2382).

At one given time the mixture of information stored and used in generating an uplink interference report may vary from the mixture of information stored at another point in time. For example at one give time, the wireless terminal may include received pilot signal and beacon signal information corresponding to attachment point 1, received beacon signal information corresponding to attachment point 2, received beacon signal information corresponding to attachment point 3, received uplink loading factor information corresponding to attachment point 1, received uplink loading factor information corresponding to attachment point 2, measured pilot signal information corresponding to attachment point 1, measured beacon signal information corresponding to attachment point 1, measured beacon signal information corresponding to attachment point 2, measured beacon signal information corresponding to attachment point 3, and default uplink loading factor information corresponding to attachment point 3. Continuing with the example at another given time, the wireless terminal may include received pilot signal and beacon signal information corresponding to attachment point 1, received beacon signal information corresponding to attachment point 2, received pilot signal and received beacon signal information corresponding to attachment point 3, received uplink loading factor information corresponding to attachment point 1, received uplink loading factor information corresponding to attachment point 3, measured pilot signal information corresponding to attachment point 1, measured beacon signal information corresponding to attachment point 1, measured beacon signal information corresponding to attachment point 2, measured pilot signal information corresponding to attachment point 3, measured beacon signal information corresponding to attachment point 3, and default uplink loading factor information corresponding to attachment point 2.

Interference report information 2358 includes a first value 2384, a second value 2386, a third value 2388, a fourth value 2390, a sum value 2392, a max value 2394, a determined ratio 2396, and a quantized report value 2398. First value 2384 is a result of operations of first value generation module 2366, while second value 2386 is a result of operations of second value generation module 2338. Third and fourth values (2388, 2390) are intermediate processing values used in generating at least some interference reports, e.g., interference reports considering information from three or more different attachment points. Sum value 2392 is a result of an operation by summing module 2342. Max value 2394 is a result of an operation of maximum value sector module 2344. Determined ratio is a determined ratio of first and second values determined by interference report generation module. Quantized report value 2398 is a value which is one of a plurality of quantized levels to be communicated in an interference report to communicate a determined ratio 2396.

Figures 24, 24A:
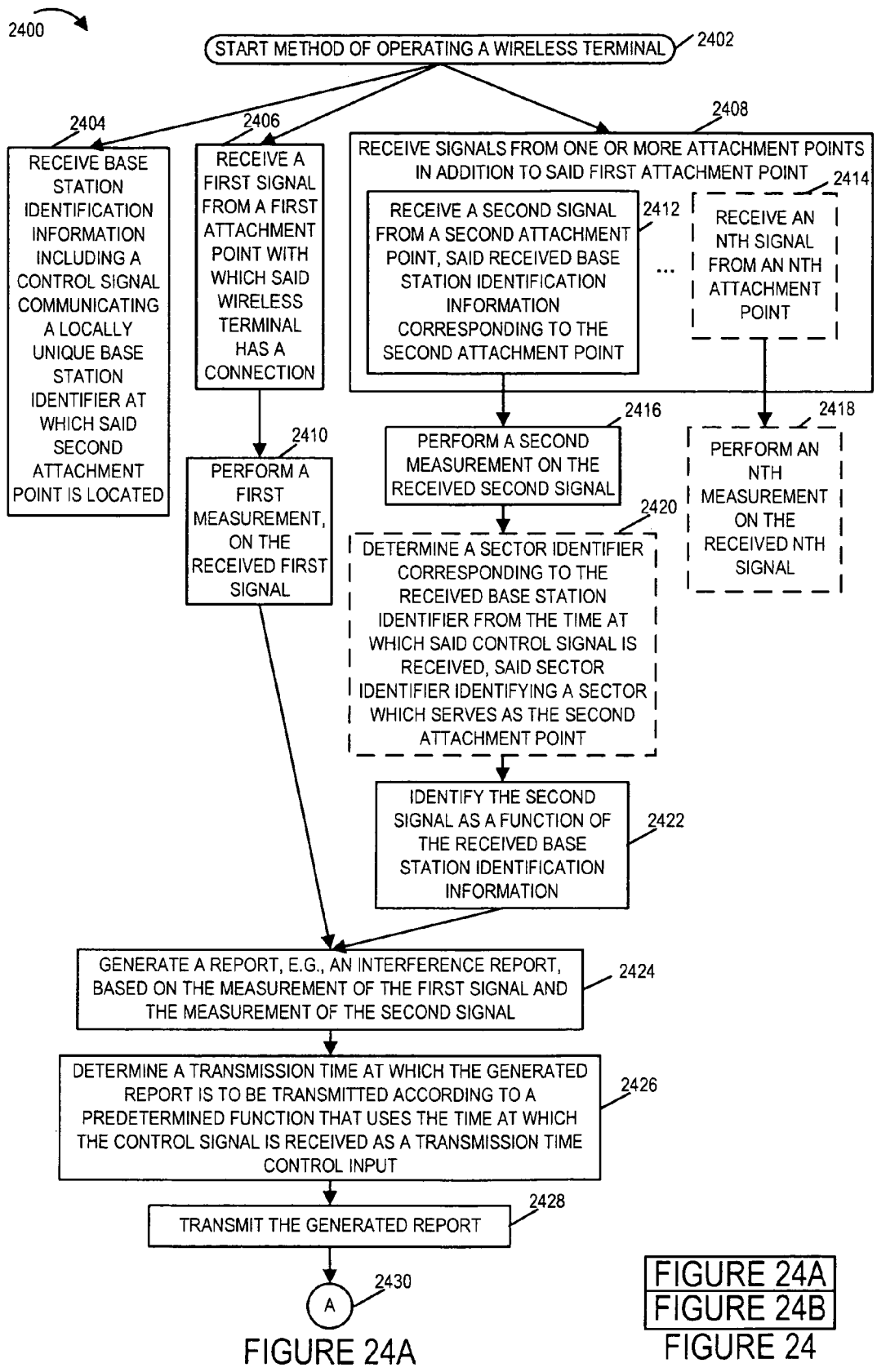
FIG. 24 comprising the combination of FIG. 24A
Figure 24B:
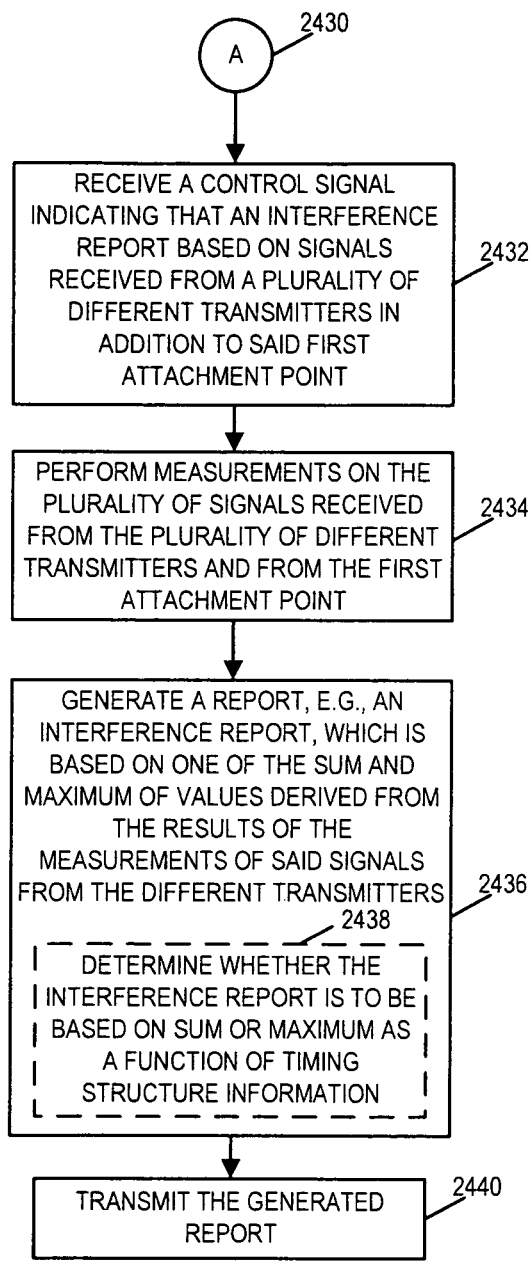
FIG. 24B is a flowchart of an exemplary method of operating a wireless terminal.

FIG. 24 comprising the combination of FIG. 24A and FIG. 24B is a flowchart 2400 of an exemplary method of operating a wireless terminal. The exemplary method starts in step 2402, where the wireless terminal is powered on and initialized. Operation proceeds from start step 2402 to steps 2404, 2406 and 2408.

In step 2404, the wireless terminal receives base station identification information including a control signal communicating a locally unique base station identifier at which a second attachment point is located. In step 2406, the wireless terminal receives a first signal, e.g., a beacon signal or a pilot signal, from a first attachment point with which said wireless terminal has a connection. In step 2408, the wireless terminal receives signals, e.g., beacon and/or pilot signals, from one or more attachment points in addition to said first attachment point. Step 2406 includes sub-step 2412, in which the wireless terminal receives a second signal, e.g., a beacon or pilot signal, from the second attachment point, said received base station identification information, from step 2404, corresponding to the second attachment point. Step 2406, at various times includes one or more additional sub-steps, corresponding to received signals, e.g., received beacon and/or pilot signals, from additional attachment points. For example, in sub-step 2414, the wireless terminal receives an Nth signal, e.g., a beacon or pilot signal, from an Nth attachment point.

Operation proceeds from step 2406 to step 2410. In step 2410 the wireless terminal performs a first measurement on the received first signal, e.g., a power measurement of the received first signal. Operation proceeds from sub-step 2412 to step 2416. In step 2416 the wireless terminal performs a second measurement on the received second signal, e.g., a power measurement of the received first signal. Operation proceeds from sub-step 2414 to step 2418. In step 2418 the wireless terminal performs an Nth measurement on the received Nth signal, e.g., a power measurement of the received Nth signal.

In some embodiments, e.g. some embodiments using multi-sector base stations, operation proceeds from step 2416 to step 2420. In other embodiments, e.g., some embodiments with a single sector base station per cell, operation proceeds from step 2416 to step 2422.

In step 2420, the wireless terminal determines a sector identifier corresponding to the received base station identifier from the time at which said control signal is received, said sector identifier identifying a sector which serves as the second attachment point. In some embodiments, the sector identifier is determined as a function of stored timing structure information and a time slot in the recurring structure to which said received signal time corresponds.

Operation proceeds from step 2420 to step 2422. In step 2422, the wireless terminal identifies the second signal, from among the one or more received signals of step 2408 corresponding to different attachment points, as a function of the received base station identification information. Operation proceeds from step 2422 to step 2424.

In step 2424, the wireless terminal generates a report, e.g., an interference report such as a specific interference report, based on the measurement of the first and second signal. In some embodiments, the report is an interference report which is a ratio of a first value to a second value, the first value being a function of the measured power of the first signal and the second value being a function of the measured power of the second signal. Operation proceeds from step 2424 to step 2426. In step 2426, the wireless terminal determines a transmission time at which the generated report is to be transmitted according to a predetermined function that uses the time at which the control signal is received as a transmission time control input. In some embodiments, the predetermined function determines the transmission time to be at a time corresponding to a fixed predetermined offset from the time at which the control signal is received.

Operation proceeds from step 2426 to step 2428, where the generated report, e.g., the generated specific type interference report relating two attachment points, is transmitted. Operation proceeds from step 2428 via a connecting node A 2430 to step 2432. In step 2432, the wireless terminal receives a control signal indicating that an interference report is to be based on signals received from a plurality of different transmitters in addition to said first attachment point. Operation proceeds from step 2432 to step 2434. In step 2434, the wireless terminal performs measurements on the plurality of signals received from the plurality of different transmitters and from the first attachment point. Operation proceeds from step 2434 to step 2436.

In step 2436, the wireless terminal generates a report, e.g., an interference report which is based on one of the sum and maximum of values derived from the results of said signals from different transmitters. For example, the generated interference report may be a generic type interference report of a first sub-type using a summation function in generating the report. Alternatively, the generated interference report may be a generic interference report of a second sub-type using a maximum function in generating the report. In some embodiments, step 2436 includes sub-step 2438. In sub-step 2438, the wireless terminal determines whether the interference report is to be based on the sum or maximum as a function of timing structure information. Operation proceeds from step 2436 to step 2440, where the wireless terminal transmits the generated report from step 2436.

In some embodiments, the step of receiving base station identification information, step 2404, includes receiving a broadcast signal from the first attachment point, said broadcast signal being used to control multiple wireless terminals. In this way signaling overhead is reduced from the amount that would otherwise be needed to individually signal such base station identification information individually to each of the wireless terminals being serviced by the first attachment point.

Figures 25, 25A:
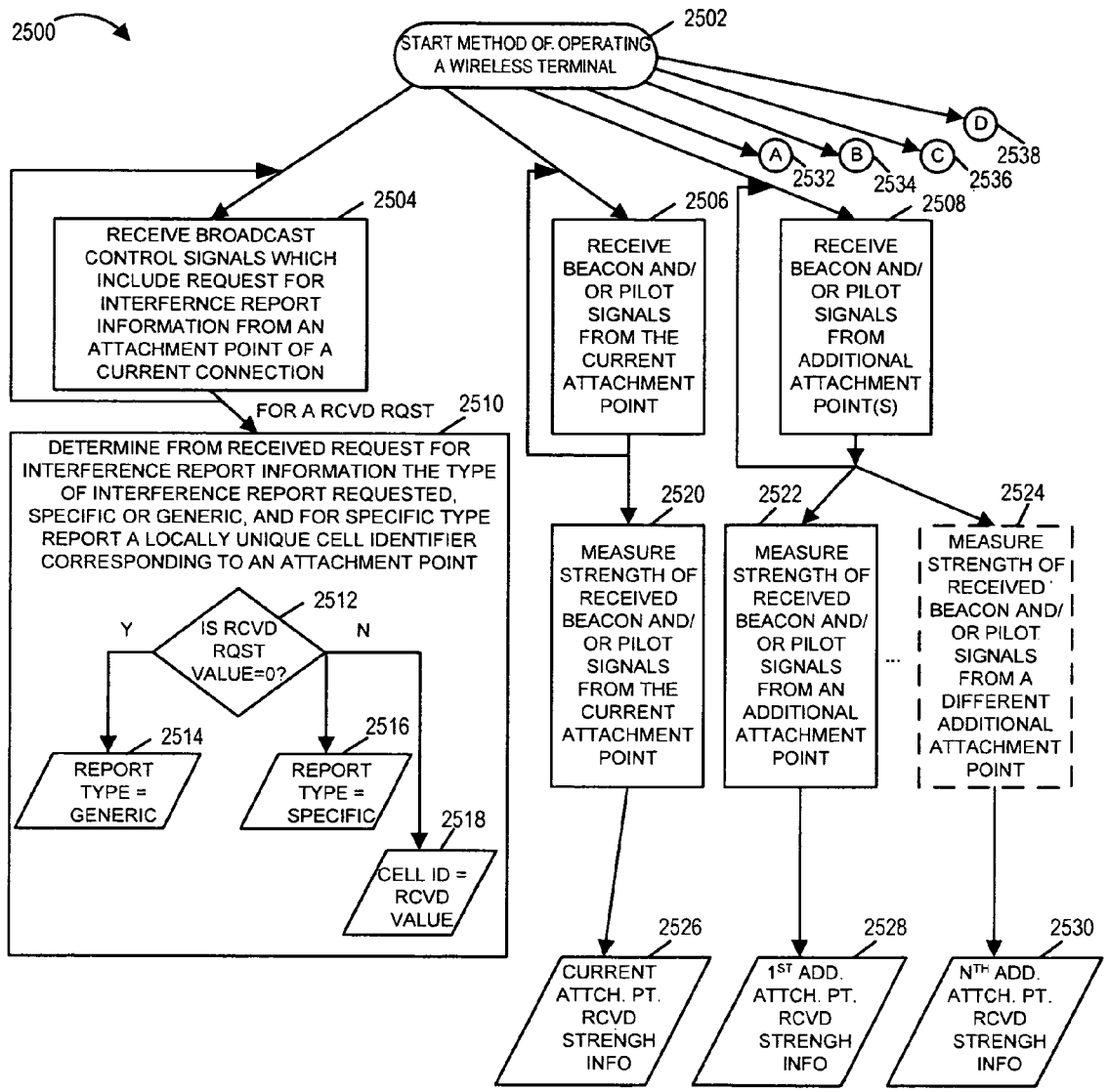
FIG. 25, comprising the combination of FIG. 25A
Figure 25B:
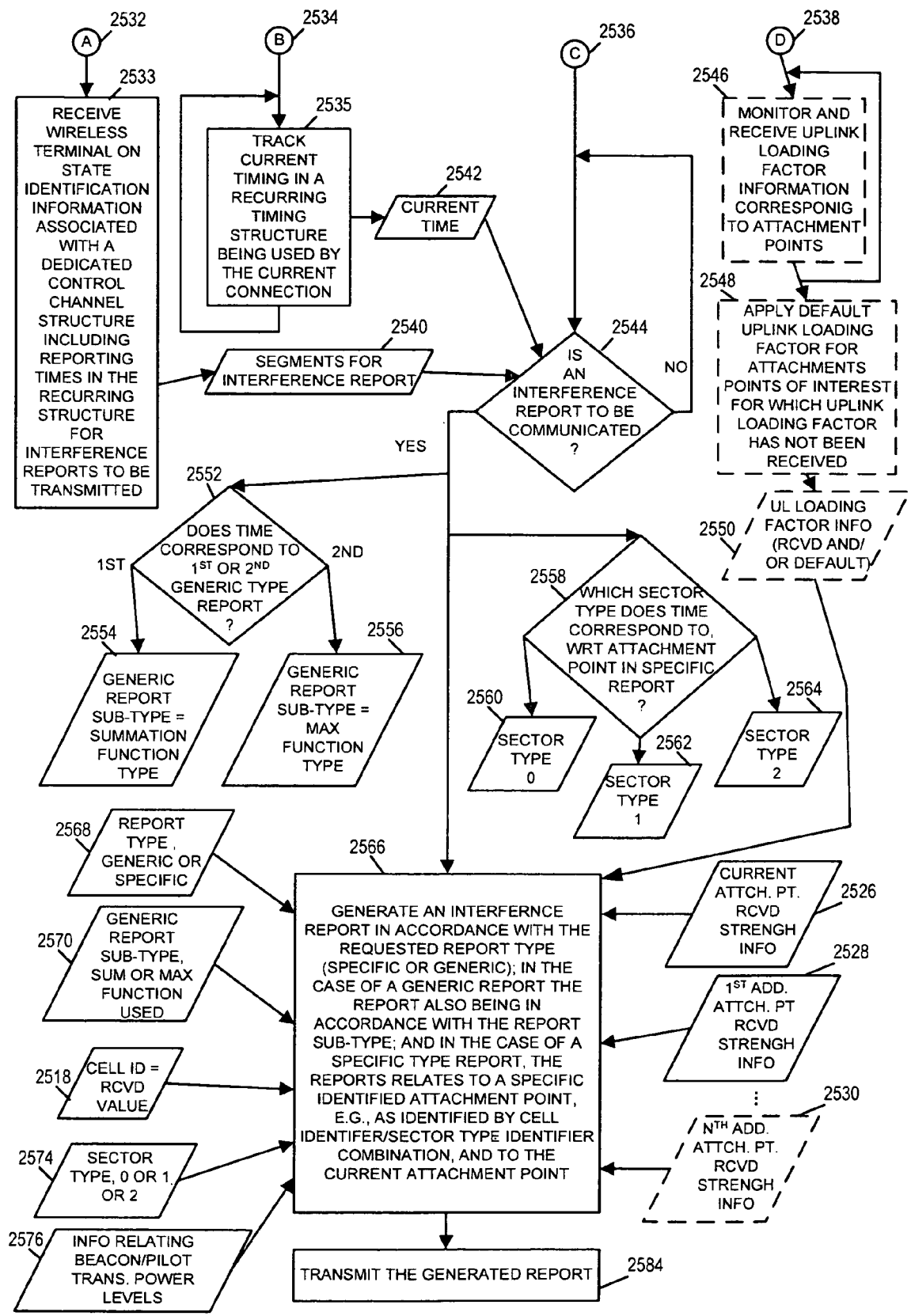
FIG. 25B is a flowchart of an exemplary method of operating a wireless terminal in accordance with various embodiments.

FIG. 25, comprising the combination of FIG. 25A and FIG. 25B is a flowchart 2500 of an exemplary method of operating a wireless terminal in accordance with various embodiments. Operation starts in step 2502, where the wireless terminal is powered on and initialized. Operation proceeds from start step 2502 to: step 2504, step 2506, step 2508, step 2533 via connecting node A 2532, step 2535 via connecting node B 2534, step 2544 via connecting node C 2536, and, in some embodiments, step 2546 via connecting node D 2538.

In step 2504, the wireless terminal receives, on an ongoing basis, broadcast control signals which include request for interface report information from an attachment point of a current connection. For a received request, operation proceeds from step 2504 to step 2510. In step 2510, the wireless terminal determines from received request for interference report information the type of interference report requested, specific or generic, and for a specific type of report a locally unique cell identifier corresponding to an attachment point. Step 2510 includes sub-step 2512. In sub-step 2512, if the received request value is a zero, the wireless terminal determines that the requested report type is a generic report as indicated by report type=generic output 2514. In sub-step 2512, if the received value is non-zero, the wireless terminal determines that the requested report type is a specific report as indicated by report type=specific output 2516. In addition, if the received value is non-zero, the wireless terminal sets the cell identifier equal to the received request value, e.g., the positive request value being one of a potential set of positive integers each different potential positive integer corresponding to a different pilot channel slope value. The output cell identifier value is represented by output 2518.

In step 2506, the wireless terminal receives, on an ongoing basis, beacon and/or pilot signals from the current attachment point. Operation proceeds from step 2506 to step 2520. In step 2520, the wireless terminal measures the strengths of received beacon and/or pilot signals from the current attachment point outputting current attachment point received signal strength information 2526.

In step 2508, the wireless terminal receives, on an ongoing basis, beacon and/or pilot signals from additional attachment point(s). Operation proceeds from step 2508 to step 2522, and at some times to step 2524. In step 2522, the wireless terminal measures the strengths of received beacon and/or pilot signals from an additional attachment point outputting $1^{st}$ additional attachment point received signal strength information 2528. In step 2524, the wireless terminal measures the strengths of received beacon and/or pilot signals from a different additional attachment point outputting $N^{th}$ additional attachment point received signal strength information 2530.

Returning to step 2533, in step 2533 the wireless terminal receives wireless terminal On state identification information associated with a dedicated control channel structure, said dedicated control channel structure including reporting times in the recurring structure for interference reports to be transmitted by the wireless terminal to the current attachment point. Step 2533 outputs information identifying segments to be used for interference reports 2540.

Returning to step 2535, in step 2535 the wireless terminal tracks, on an ongoing basis, timing in a recurring timing structure being used by the current connection and output current time information 2542, e.g., index information in a recurring OFDM timing structure.

Returning to step 2544, in step 2544 the wireless terminal determines, on an ongoing basis, is an interference report to be communicated. Step 2544 uses as input current time information 2542 and information identifying segments for interference reports 2540 as well as timing structure information pertaining to the current connection. If it is determined in step 2544 that an interference report is to communicated, operation proceeds from step 2544 to step 2552, step 2558 and step 2566.

In step 2552, the wireless terminal determines does the time correspond to $1^{st}$ or $2^{nd}$ type generic report. If the time corresponds to a $1^{st}$ type of generic report, generic report sub-type=summation function type as indicated by output 2554; however if the time corresponds to a $2^{nd}$ type generic report, generic report sub-type=max function type as indicated by output 2556.

In step 2558, the wireless terminal determines which sector type the time corresponds to with respect to the attachment point for a specific type report. For example, in one exemplary embodiment, a recurring timing structure is subdivided into beaconslots, there are three different sector types, and the sector type associated with an indexed beaconslot alternates between the three different sector types. (See FIG. 18.) The output of step 2558 is one of sector type=sector type 0 2560, sector type=sector type 1 2562, and sector type=sector type 2 2564.

In some embodiments, the wireless terminal uses uplink loading factor information in calculating an interference report and includes steps 2546 and 2548. In step 2546, the wireless terminal monitors and receives, on an ongoing basis, uplink loading factor information corresponding to attachment points. Operation proceeds from step 2546 to step 2548, in which the wireless terminal applies default uplink loading factor values for attachment points of interest for which uplink loading factor information has not been received. Uplink loading factor information 2550, received and/or default information, is output form steps 2546 and/or 2548.

Returning to step 2556, in step 2556, the wireless terminal generates an interference report in accordance with the requested report type (specific or generic); in the case of a generic report the report also being in accordance with the report sub-type (summation function type or max function type); and in the case of a specific report the report relates to a specific,identified attachment point, e.g., identified by cell identifier/sector type identifier combination, and to the current attachment point. Inputs available to step 2566 include at least some of: report type information 2568, generic report sub-type information 2570, cell identification information 2518, sector type information 2574, information relating beacon to pilot transmission power levels, current attachment point received strength information 2526, $1^{st}$ additional attachment point received strength information 2528, Nth additional attachment point received strength information 2530 and uplink loading factor information 2550. Report type information 2568 identifies whether the report is to be a generic or specific report and is one of outputs 2514 and 2516. Generic report sub-type information 2570 identifies whether the report if it is a generic report is to use a summation function in generating the report or a maximum function in generating the report. Generic report sub-type information 2570 is one of outputs 2554 and 2556. Cell ID information 2518 is the received value from the received report request control signal. Sector type information 2574 is one of the outputs 2560, 2562 and 2564. Information relating beacon/pilot transmission power levels includes power tier level information and other gain information relating the transmission power of a beacon signal to the transmission power of a pilot signal for an attachment point under consideration, as well as information relating transmission power levels between different attachment points.

For a generic report, the wireless terminal uses the received strength information 2526, 2528, . . . , 2530 to generate a interference report, the sub-type of report summation function type or max function type being determined by information 2570. For a specific type report the wireless terminal generates a report relating current attachment point received strength information 2526 to one of ($1^{st}$ additional attachment point received strength information 2528, . . . , Nth additional attachment point received strength information 2530), the one being determined by the identify of the additional attachment point which corresponds to the combination of the cell identifier 2518 and sector type 2574.

Operation proceeds from step 2566 to step 2584, where the wireless terminal transmits the generated interference report to the current attachment point.

Figure 26:
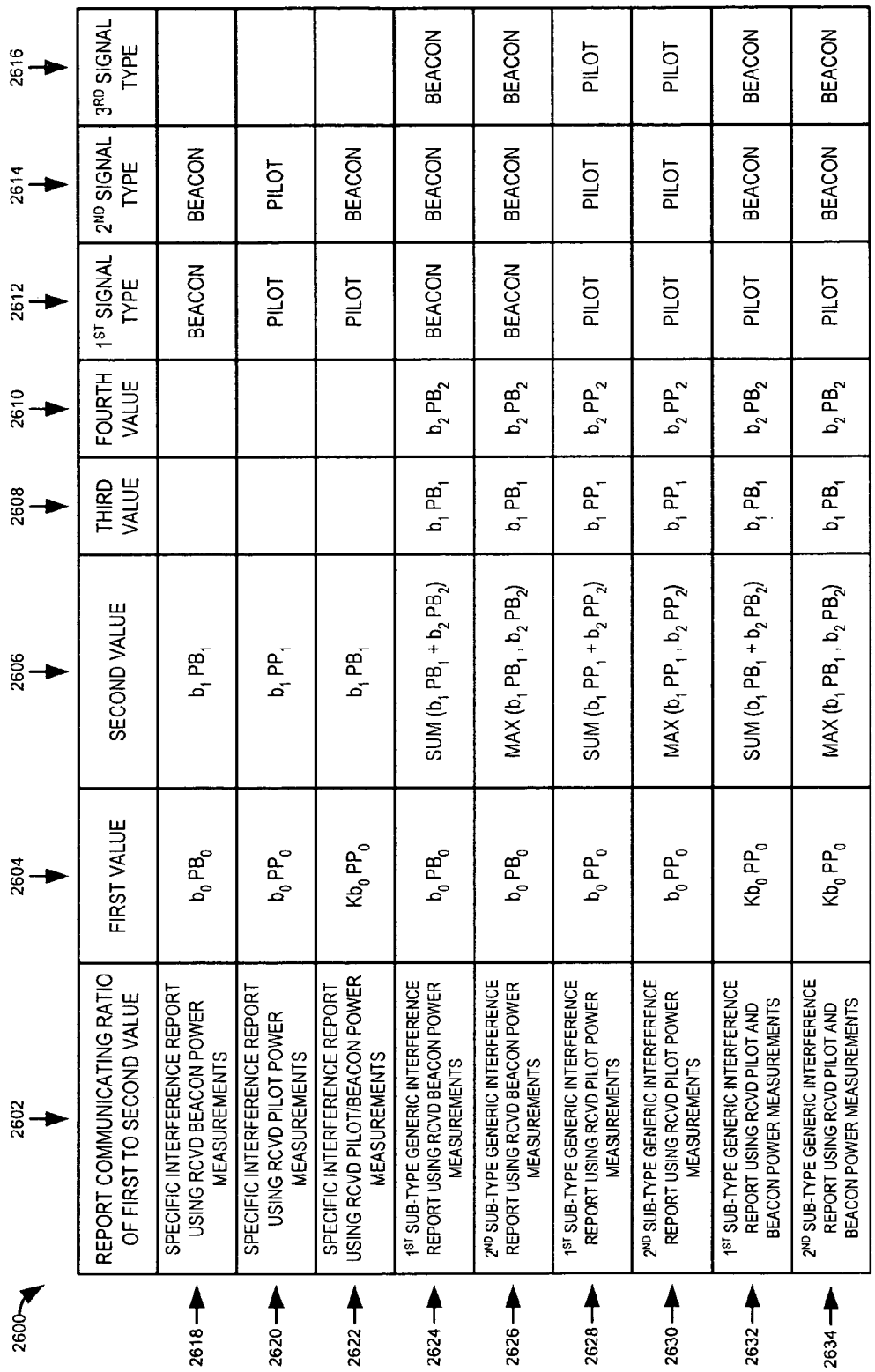
FIG. 26 is a drawing of a table illustrating exemplary interference report signal usage and report computations in accordance with various embodiments.

FIG. 26 is a drawing of a table 2600 illustrating exemplary interference report signal usage and report computations in accordance with various embodiments. First column 2602 lists descriptive information pertaining to an interference report communicating a ratio of a first to a second value. Second column 2504 lists first value; third column 2606 lists second value; fourth column 2608 lists third value; fifth column 2510 lists fourth value; sixth column 2612 lists $1^{st}$ signal type; seventh column 2614 lists $2^{nd}$ signal type; eighth column 2616 lists $3^{rd}$ signal type.

Each row (2618, 2620, 2622, 2624, 2626, 2628, 2630, 2632, 2632 describes a different report. Row 2618 pertains to a specific interference report using received beacon signal power measurements. Row 2620 pertains to a specific interference report using received pilot signal power measurements. Row 2622 pertains to a specific interference report using received pilot and beacon signal power measurements. Row 2624 pertains to a $1^{st}$ sub-type of generic interference report using received beacon signal power measurements. Row 2626 pertains to a $2^{nd}$ sub-type of interference report using received beacon signal power measurements. Row 2628 pertains to a $1^{st}$ sub-type of generic interference report using received pilot signal power measurements. Row 2630 pertains to a $2^{nd}$ sub-type of interference report using received pilot signal power measurements. Row 2632 pertains to a $1^{st}$ sub-type of generic interference report using received pilot and beacon signal power measurements. Row 2630 pertains to a $2^{nd}$ sub-type of interference report using received pilot and beacon signal power measurements.

In table 2600, $b_0$ is the loading factor corresponding to the first attachment point; $PB_0$ is the measured power of a received beacon signal from the first attachment point; $PP_0$ is the measured power of a received pilot signal from the first attachment point; b1 is the loading factor corresponding to the second attachment point; $PB_1$ is the measured power of a received beacon signal from the second attachment point; $PP_1$ is the measured power of a received pilot signal from the second attachment point; $b_2$ is the loading factor corresponding to the third attachment point; $PB_2$ is the measured power of a received beacon signal from the second attachment point; $PP_2$ is the measured power of a received pilot signal from the second attachment point. For example, the first attachment point may correspond to the current serving attachment point to which the interference report is communicated, and the second and third attachment point may correspond to other local attachment points in the system. K is a scaling factor relating the transmission power strength of a beacon signal to the transmission power strength of a pilot signal.

In this example, it may be assumed that the beacon signal are transmitted at the same transmission power level from attachment points 1, 2, and 3; it may be also assumed that the pilot, signal are transmitted at the same transmission power level from attachment points 1, 2, and 3.

In some embodiments, the beacon signals are transmitted at the same transmission power irrespective of the attachment point, while the transmission power level of the pilot signal varies as a function of the attachment point. In some such embodiments, different power tier levels are used for different attachment points and scaling factors relating the power tier levels of the different attachment points may be used in the interference report calculations.

Table 2600 describes exemplary generic reports using information from three different attachment points; the formulas used may be extended to include using received power measurements from additional attachment points.

Figure 27:
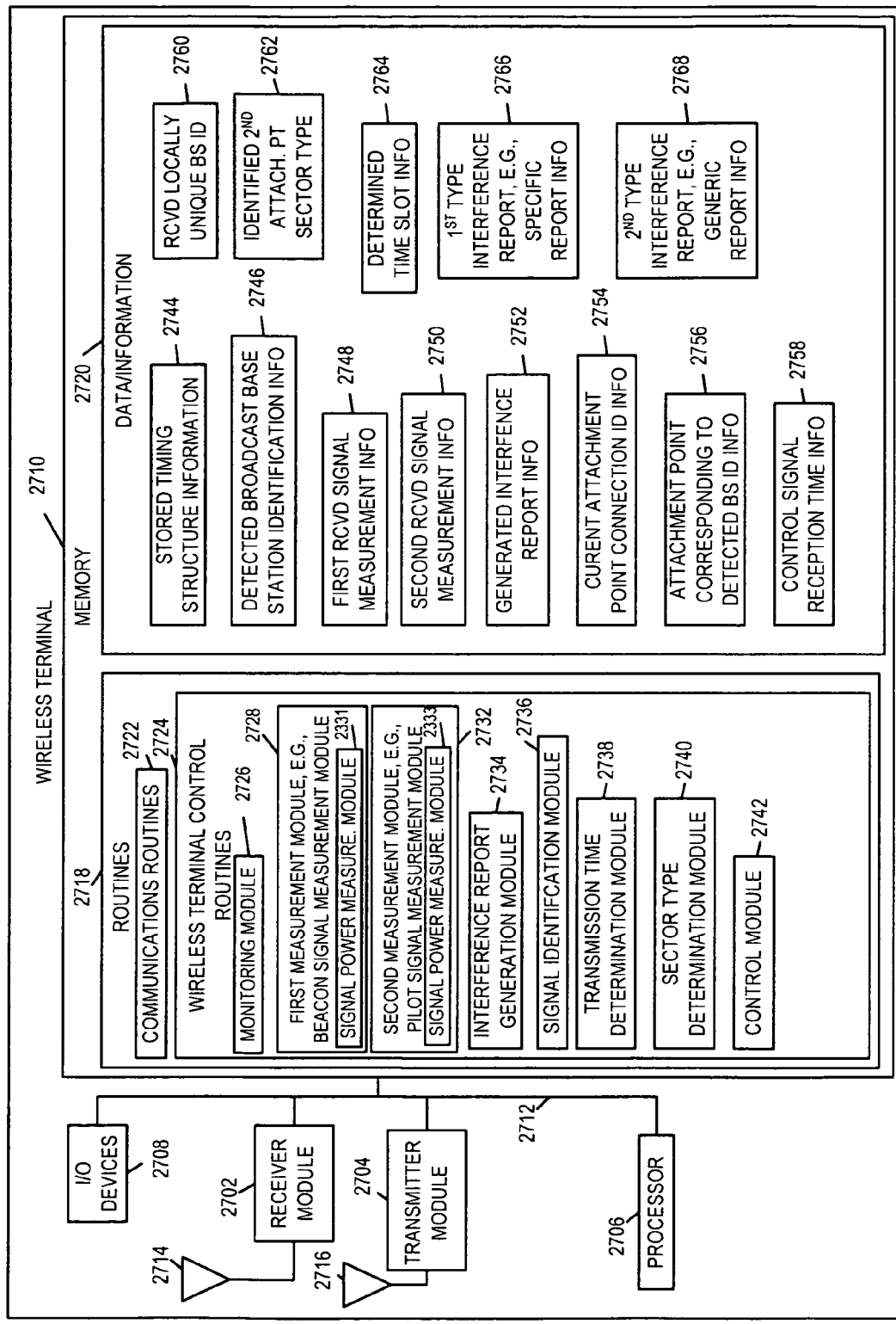
FIG. 27 is a drawing of an exemplary wireless terminal implemented in accordance with various embodiments.

FIG. 27 is a drawing of an exemplary wireless terminal 2700 implemented in accordance with various embodiments. Exemplary wireless terminal 2700 includes a receiver module 2702, a transmitter module 2704, a processor 2706, I/O devices 2708, and memory 2710 coupled together via a bus 2712 over which the various elements may interchange data and information. Memory 2710 includes routines 2718 and data/information 2720. The processor 2706, e.g., a CPU, executes the routines 2718 and uses the data/information 2720 in memory 2710 to control the operation of the wireless terminal 2700 and implement methods of the invention.

The receiver module 2702, e.g., an OFDM receiver, is coupled to receive antenna 2714 via which the wireless terminal receives downlink signals from base station attachment points. The downlink signals include various broadcast signals including beacon signals, pilot signals, and base station identification information, e.g., a locally unique cell identifier corresponding to an attachment point to be used in a specific type report, and request interference report type information, e.g., information distinguishing between a specific type interference report and a generic type interference report. In some embodiments, the locally unique base station identifier is of a sectorized base station at which the second attachment point is located. Receiver module 2702 receives a plurality of signals from multiple attachment points, said plurality of signals including a second signal, e.g., said second signal being a beacon or pilot signal from a second attachment point, said second attachment being in addition to a first attachment point, e.g., a current connection attachment point.

Transmitter module 2704, e.g., an OFDM transmitter, is coupled to transmit antenna 2716 via which the wireless terminal transmits uplink signals including generated interference reports, e.g., a beacon ratio report communicated over a dedicated control channel. In various embodiments, the receiver module 2702 and transmitter module 2704 use the same antenna, e.g., in conjunction with a duplex module.

Routines 2718 include communications routines 2722 and wireless terminal control routines 2724. Wireless terminal control routines 2724 include a monitoring module 2726, a first measurement module 2728, e.g., a beacon signal measurement module, a second measurement module 2732, e.g., a pilot signal measurement module, an interference report generation module 2734, a signal identification module 2736, a transmission time determination module 2738, a sector type determination module 2740, and a control module 2742. The first measurementh module 2728 includes a signal power measurement module 2331. The second measurement module 2732 includes a signal power measurement module 2333.

Communications module 2722 implements various communications protocols used by the wireless terminal 2700. Monitoring module 2726 detects broadcast base station identification information, e.g., a locally unique base station identifier such as a cell slope value corresponding to a base station attachment point from which received signal strength measurements of beacons and/or pilots are to be obtained and used in a specific interference report that is being requested to be communicated over the uplink. First measurement module 2728 measures received signals of a first type, e.g., beacon signals. Second signal measurement module 2732 measures signals of a second type, e.g. pilot signals. Interference report generation module 2732 generates a report based on a measurement of a first received signal and a measurement of a second received signal, said first received signal being from a first attachment point with which said wireless terminal has a connection, said second received signal being from a second attachment point corresponding to base station identification information detected by said monitoring module 2726.

Signal identification module 2736 identifies the second signal from a plurality of signals as a function of detected broadcast base station identification information. Thus signal identification uses information from monitoring module 2726 in identifying the second signal. In some embodiments, the detected broadcast base station identification information is detected in a broadcast signal from the first attachment point, said broadcast signal being used to control multiple wireless terminals.

Transmission time determination module 2738 determines a transmission time at which a generated interference report is to be transmitted according to a predetermined function that uses the time at which a control signal including base station identification information is received as a transmission time control input. In some embodiments, the predetermined function determines the transmission time to be at a time corresponding to a fixed predetermined offset from the time at which the control signal is received.

Sector type determination module 2740 determines a sector identifier corresponding to a received base station identifier from the time at which the control signal is received, said sector identifier identifying a sector which serves as a second attachment point. In some embodiments, the sector identifier is determined as a function of stored timing structure information and a time slot in a recurring structure to which said received signal time corresponds.

Control module 2742 controls the interference report generation module 2734 to generate reports of different types in response to different received control signals, said different types of reports including at least a first type report and a second type report, said first type of report communicating a ratio or first and second values, one of said first and second values corresponding to a measurement of a signal from a current connection attachment point and the other one of said first and second values of an attachment point specified to the wireless terminal by the current connection attachment point, e.g., the current connection attachment point selects which of the other potential attachment points signals are to be used in calculating the interference report. For example, the first type of report may be a specific beacon ratio report and the second type of report may be a generic beacon ratio report. One received control signal, e.g., a value of 0 in a interference report request broadcast signal may signal that a generic report is requested to be communicated; another received control signal, e.g., a positive integer value in an interference report request broadcast signal may signify that a specific type of beacon ratio report is being requested, with the positive integer value being used in identifying the second attachment point.

In some embodiments, the second type of report, e.g., a generic beacon ratio report, is generated using a maximum or summation function in processing signal measurement information corresponding to one or more signals.

In various embodiments, the interference report is an interference report which is a ratio of a first value to a second value, the first value being a function of the measured power of a first signal, e.g., a beacon or pilot signal from a first attachment point which is the current connection, and the second value being a function of the measured power of a second signal, e.g., a beacon or pilot signal from another base station attachment point, e.g., an adjacent cell and/or sector attachment point using the same carrier and/or tone block.

Data/information 2720 includes stored timing structure information 2744, detected broadcast base station identification information 2746, first received signal measurement information 2748, second received signal measurement information 2750, generated interference report information 2752, current attachment point connection ID information 2754, attachment point corresponding to detected base station identification information 2756, control signal reception time information 2758, received locally unique base station identification 2760, identified $2^{nd}$ attachment point sector type 2762, determined time slot information 2764, 1sst type interference report, e.g., specific interference report, information 2766, and $2^{nd}$ type interference report, e.g., generic report, information 2768.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, signal processing, beacon generation, beacon detection, beacon measuring, connection comparisons, connection implementations. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a wireless terminal comprising:
monitoring to detect received broadcast signals communicating at least one uplink loading factor, each broadcast uplink loading factor corresponding to an attachment point;
receiving a first signal from a first attachment point;
performing a first measurement on the received first signal;
receiving a second signal from a second attachment point;
performing a second measurement on the received second signal;
wherein said first and second measurements are signal power measurements;
generating an uplink interference report based on the measurement of the first signal, the measurement of the second signal and a first received uplink loading factor corresponding to said first attachment point, said uplink interference report communicating a ratio of first and second values, said first value being a function of a product of said first loading factor and a result of said first signal measurement and wherein said second value is a function of a result of the second measurement; and transmitting said generated uplink interference report.

2. The method of claim 1,
wherein said first signal is a beacon or pilot signal; and
wherein said second signal is a beacon or pilot signal.

3. The method of claim 1 wherein the first and second signals are OFDM signals.

4. The method of claim 1, wherein said second value is also a function of a product of a second loading factor corresponding to said second attachment point and the result of said second signal measurement.

5. The method of claim 4, further comprising:
receiving said second loading factor prior to generating said uplink interference report.

6. The method of claim 4, further comprising:
setting said second loading factor to default value.

7. The method of claim 1, further comprising:
receiving a third signal from a third attachment point;
performing a third measurement on the received third signal; and
wherein generating an uplink interference report further includes using the result of the third measurement to generate said second value.

8. The method of claim 7, wherein using the result of the third measurement to generate said second value include:
summing third and fourth values, said third value being a function of the result of the second signal measurement, said fourth value being a function of the result of the third signal measurement.

9. The method of claim 8,
wherein said first value is generated according to the following equation: $b_0 PB_0$; and
wherein said second value is generated according to the following equation: $b_1 PB_1 + b_2 PB_2$;
where $b_0$ is the loading factor corresponding to the first attachment point;
wherein $PB_0$ is the measured power of a received beacon signal from the first attachment point;
wherein $b_1$ is a loading factor corresponding to the second attachment point;
wherein $PB_1$ is the measured power of a received beacon signal from the second attachment point;
wherein $b_2$ is a loading factor corresponding to the third attachment point; and
wherein $PB_2$ is the measured power of a received beacon signal from the third attachment point.

10. The method of claim 7, wherein using the result of the third measurement to generate said second value include:
setting the second value to be the maximum of third and fourth values, said third value being a function of the result of the second signal measurement, said fourth value being a function of the result of the third signal measurement.

11. The method of claim 10,
wherein said first value is generated according to the following equation: $b_0 PB_0$; and
wherein said second value is generated according to the following equation: $MAX(b_1 PB_1, b_2 PB_2)$;
where $b_0$ is the loading factor corresponding to the first attachment point;
wherein $PB_0$ is the measured power of a received beacon signal from the first attachment point;

wherein $b_1$ is a loading factor corresponding to the second attachment point;
wherein $PB_1$ is the measured power of a received beacon signal from the second attachment point;
wherein $b_2$ is a loading factor corresponding to the third attachment point; and
wherein $PB_2$ is the measured power of a received beacon signal from the third attachment point.

12. A wireless terminal comprising:
a monitoring module for detecting received broadcast signals communicating at least one uplink loading factor, each broadcast uplink loading factor corresponding to an attachment point;
a first measurement module including a signal power measurement module for measuring power of received signals of a first type from a first attachment point;
a second measurement module including a signal power measurement module for measuring power of received signals of a second type;
a report generation module for generating an uplink interference report based on a power measurement of a first received signal from the first attachment point, a power measurement of a second signal from a second attachment point; and a first received uplink loading factor corresponding to a first attachment point, said uplink interference report communicating a ratio of first and second values, said report generation module including:
  i) a first value generation module for generating said first value as a function of a product of said first loading factor and a result of said power measurement of the first signal; and
  ii) a second value generation module for generating said second value as a function of a result of the power measurement of the second signal from the second attachment point; and
a transmitter for transmitting generated uplink interference reports.

13. The wireless terminal of claim 12,
wherein said first signal is a beacon or pilot signal; and
wherein said second signal is a beacon or pilot signal.

14. The wireless terminal of claim 12, wherein said second value generation module includes a multiplier module for generating a product of a second loading factor corresponding to said second attachment point and the result of said second signal measurement.

15. The wireless terminal of claim 14, further comprising:
a loading factor determination module for setting said second loading factor to a default value in the absence of a successfully received second loading factor from said second attachment point.

16. A wireless terminal comprising:
means for detecting received broadcast signals communicating at least one uplink loading factor, each broadcast uplink loading factor corresponding to an attachment point;
means for measuring power of received signals of a first type from a first attachment point;
means for measuring power of received signals of a second type;
means for generating an uplink interference report based on a power measurement of a first received signal from the first attachment point, a power measurement of a second signal from a second attachment point, and a first received uplink loading factor corresponding to a first attachment point, wherein said up ink interference report communicates a ratio of first and second values, said means for generating an uplink interference report including:
  i) means for generating said first value as a function of a product of said first loading factor and a result of the power measurement of said first signal: and
  ii) means for generating said second value as a function of a result of the power measurement of the second signal; and
means for transmitting generated uplink interference reports.

17. The wireless terminal of claim 16,
wherein said first signal is a beacon or pilot signal; and
wherein said second signal is a beacon or pilot signal.

18. The wireless terminal of claim 16, wherein the first and second signals are CDMA signals.

19. The wireless terminal of claim 16, wherein the first and second signals are OFDM signals.

20. The wireless terminal of claim 16, wherein said means for generating said second value includes means for generating a product of a second loading factor corresponding to said second attachment point and the result of said second signal measurement.

21. The wireless terminal of claim 20, further comprising:
means for setting said second loading factor to a default value in the absence of a successfully received second loading factor from said second attachment point.

22. The wireless terminal of claim 16,
wherein said means for generating an uplink interference report generates at least one uplink interference report using the result of a third measurement from a third attachment point to generate said second value.

23. The wireless of claim 22, wherein said means for generating an uplink interference report includes:
means for summing third and fourth values, said third value being a function of the result of the second signal measurement, said fourth value being a function of the result of the third signal measurement.

24. The wireless terminal of claim 23,
wherein said first value is generated according to the following equation: $b_0 PB_0$; and
wherein said second value is generated according to the following equation: $b_1 PB_1 b_2 PB_2$;
where $b_0$ is the loading factor corresponding to the first attachment point;
wherein $PB_0$ is the measured power of a received beacon signal from the first attachment point;
wherein $b_1$ is a loading factor corresponding to the second attachment point;
wherein $PB_1$ is the measured power of a received beacon signal from the second attachment point;
wherein $b_2$ is a loading factor corresponding to the third attachment point; and
wherein $PB_2$ is the measured power of a received beacon signal from the third attachment point.

25. The wireless terminal of claim 22, wherein said means for generating an uplink interference report includes:
means for setting the second value to be the maximum of third and fourth values, said third value being a function of the result of the second signal measurement, said fourth value being a function of the result of the third signal measurement.

26. The wireless terminal of claim 25,
wherein said first value is generated according to the following equation: $b_0 PB_0$; and
wherein said second value is generated according to the following equation: $MAX(b_1 PB_1, b_2 PB_2)$.

where $b_0$ is the loading factor corresponding to the first attachment point;
wherein $PB_0$ is the measured power of a received beacon signal from the first attachment point;
wherein $b_1$ is a loading factor corresponding to the second attachment point;
wherein $PB_1$ is the measured power of a received beacon signal from the second attachment point;
wherein $b_2$ is a loading factor corresponding to the third attachment point; and
wherein $PB_2$ is the measured power of a received beacon signal from the third attachment point.

27. A non-transitory computer readable medium embodying machine executable instructions for implementing a method of operating a wireless terminal, the method comprising:
monitoring to detect received broadcast signals communicating at least one uplink loading factor, each broadcast uplink loading factor corresponding to an attachment point;
receiving a first signal from a first attachment point;
performing a first measurement on the received first signal;
receiving a second signal from a second attachment point;
performing a second measurement on the received second signal;
wherein said first and second measurements are signal power measurements;
generating an uplink interference report based on the measurement of the first signal, the measurement of the second signal and a first received uplink loading factor corresponding to said first attachment point, said uplink interference report communicating a ratio of first and second values, said first value being a function of a product of said first loading factor and a result of said first signal measurement and wherein said second value is a function of a second result of the second measurement; and
transmitting said generated uplink interference report.

28. The non-transitory computer readable medium of claim 27,
wherein said first signal is a beacon or pilot signal; and
wherein said second signal is a beacon or pilot signal.

29. The non-transitory computer readable medium of claim 27 wherein the first and second signals are OFDM signals.

30. The non-transitory computer readable medium of claim 29, wherein said second value is also a function of a product of a second loading factor corresponding to said second attachment point and the result of said second signal measurement.

31. The non-transitory computer readable medium of claim 30, further embodying machine executable instructions for:
receiving said second loading factor prior to generating said uplink interference report.

32. The non-transitory computer readable medium of claim 30, further embodying machine executable instructions for:
setting said second loading factor to default value.

33. An apparatus operable in a communication system, the apparatus comprising:
a processor configured to:
monitor to detect received broadcast signals communicating at least one uplink loading factor, each broadcast uplink loading factor corresponding to an attachment point;
receive a first signal from a first attachment point;
perform a first measurement on the received first signal;
receive a second signal from a second attachment point;

perform a second measurement on the received second signal, said first and second, measurements being signal power measurements;

generate an uplink interference report based on the measurement of the first signal, the measurement of the second signal and a first received uplink loading factor corresponding to said first attachment point, said uplink interference report communicating a ratio of first and second values, said first value being a function of a product of said first loading factor and a result of said first signal measurement and wherein said second value is a function of a result of the second measurement; and transmit said generated uplink interference report.

34. The apparatus of claim 33, wherein said first signal is a beacon or pilot signal; and wherein said second signal is a beacon or pilot signal.

35. The apparatus of claim 33, wherein said second value is also a function of a product of a second loading factor corresponding to said second attachment point and the result of said second signal measurement.

36. The apparatus of claim 35, wherein the processor is configured to:

receive said second loading factor prior to generating said uplink interference report.

* * * * *